US012790530B2

(12) United States Patent
Yang et al.

(10) Patent No.: US 12,790,530 B2
(45) Date of Patent: Nov. 10, 2026

(54) LOW ELECTRICAL CONDUCTIVITY HEAT TRANSFER FLUIDS

(71) Applicant: PRESTONE PRODUCTS CORPORATION, Danbury, CT (US)

(72) Inventors: Bo Yang, Ridgefield, CT (US); Peter M. Woyciesjes, Woodbury, CT (US)

(73) Assignee: Prestone Products LLC, Wilmington, DE (US)

( * ) Notice: Subject to any disclaimer, the term of this patent is extended or adjusted under 35 U.S.C. 154(b) by 82 days.

(21) Appl. No.: 18/599,027

(22) Filed: Mar. 7, 2024

(65) Prior Publication Data

US 2024/0301268 A1 Sep. 12, 2024

Related U.S. Application Data

(60) Provisional application No. 63/450,506, filed on Mar. 7, 2023.

(51) Int. Cl.
*C09K 5/20* (2006.01)

(52) U.S. Cl.
CPC .................................... *C09K 5/20* (2013.01)

(58) Field of Classification Search
CPC ... C09K 5/20; C09K 5/10; C23F 11/08; C23F 11/10; C23F 11/126; C23F 11/149; C23F 11/1673; C23F 11/1676
See application file for complete search history.

(56) References Cited

U.S. PATENT DOCUMENTS 3,455,704 A * 7/1969 Hopper .................... C09G 1/10 106/11
8,617,416 B1 * 12/2013 Yang .................... C23F 11/184 252/75
8,877,681 B2 11/2014 Berghaus et al.
11,560,505 B2 1/2023 Yang et al.
11,639,457 B2 5/2023 Yang et al.
2007/0152191 A1 * 7/2007 Trahan .................... C09K 5/10 252/388
2010/0116473 A1 * 5/2010 Yang .................... C23F 11/08 252/68
2012/0050916 A1 * 3/2012 Khan .................... H02K 7/088
(Continued)

FOREIGN PATENT DOCUMENTS

CN 104087255 10/2014
EP 4117085 1/2023
(Continued)

OTHER PUBLICATIONS

Search Report & Written Opinion issued in PCT/US2024/018918 (Jun. 21, 2024).

*Primary Examiner* — Emmanuel E Duke
(74) *Attorney, Agent, or Firm* — Barnes & Thornburg LLP; G. Peter Nichols

(57) ABSTRACT

A heat transfer fluid or thermal management system fluid that includes a freezing point depressant; water having an electrical conductivity less than 5 μS/cm; and a corrosion inhibitor composition that includes one or more electrically non-conductive, low electrical conductivity corrosion inhibitors, or a combination of one or more organic acid and one or more organic base; wherein a conductivity of the heat transfer fluid is less than or equal to about 500 μS/cm.

28 Claims, 9 Drawing Sheets
(8 of 9 Drawing Sheet(s) Filed in Color)

TOMADOL™ ETHOXYLATED ALCOHOLS

Tomah produces a variety of ethoxylated linear alcohol nonionic surfactants. The Tomadol ethoxylates vary in both alcohol and ethylene oxide chain lengths. By varying the alcohol chain length and the amount of ethylene oxide reacted with the linear alcohol, a wide range of physical and nonionic surfactant properties are available. The Tomadol ethoxylates are 100% active, colorless and range from liquids to low melting point solids of pasty consistency. They are excellent wetting agents, emulsifiers, and detergents. Tomadol ethoxylates are moderate foamers. They are represented by the formula below where R is the linear primary alcohol and n is the total number of moles of ethylene oxide.

$$RO(CH_2CH_2O)_nH$$

| Tomadol Series | R Equals | Description |
|---|---|---|
| 91-2.5; 91-6; 91-8 | Linear $C_9/C_{10}/C_{11}$ | poly (2.5) or (6) or (8) oxyethylene $C_{9-11}$ alcohol |
| 1-3; 1-5; 1-7; 1-9 | Linear $C_{11}$ | poly (3) or (5) or (7) or (9) oxyethylene $C_{11}$ alcohol |
| 23-1; 23-3; 23-5; 23-6.5 | Linear $C_{12}/C_{13}$ | poly (1) or (3) or (5) or (6.5) oxyethylene $C_{12-13}$ alcohol |
| 25-3; 25-7; 25-9; 25-12 | Linear $C_{12}/C_{13}$ $C_{14}/C_{15}$ | poly (3) or (7) or (9) or (12) oxyethylene $C_{12-15}$ alcohol |
| 45-2.5; 45-7; 45-13 | Linear $C_{14}/C_{15}$ | poly (2.5) or (7) or (13) oxyethylene $C_{14-15}$ alcohol |

| Tomadol Series | EO Groups/Avg. | Molecular Weight | EO Content Wt.% | Melting range oC | Color (APHA) | Sp. Gravity @ 25oC | Viscosity,cSt @100oF | Hydroxyl No. mgKOH/g | Surface Tension (0.1wt.%) | Flash pt. oC | Cloud pt. oC | Pour pt. oC | HLB |
|---|---|---|---|---|---|---|---|---|---|---|---|---|---|
| 91-2.5 | 2.7 | 281 | 42.3 | -25 to -17 | 5-10 | 0.925 | 12 | 200 | - | 124 | - | -13 | 8.5 |
| 91-6 | 6 | 425 | 62.1 | -5 to 15 | 5-10 | 0.984 | 23 | 132 | 28 | 143 | 52 | 8 | 12.4 |
| 91-8 | 8.3 | 524 | 69.7 | 7 to 24 | 5-10 | 1.008 | 39 | 107 | 30 | 159 | 80 | 15 | 13.9 |
| 1-3 | 3 | 365 | 43.3 | -15 to 4 | 5-10 | 0.926 | 16 | 184 | - | 142 | - | -7 | 8.7 |
| 1-5 | 5 | 392 | 66.1 | -4 to 17 | 5-10 | 0.966 | 21 | 143 | 25 | 148 | - | 6 | 11.2 |
| 1-7 | 7 | 479 | 64.3 | 4 to 20 | 5-10 | 0.996 | 28 | 117 | 28 | 165 | 58 | 13 | 12.9 |
| 1-9 | 9 | 563 | 69.8 | 13 to 26 | 5-10 | 1.011 | 31 | 99 | 31 | 176 | 74 | 18 | 13.9 |
| 23-1 | 1 | 228 | 18.5 | 2 to 11 | 5-10 | 0.873 | 13 | 236 | - | 143 | - | 5 | 3.7 |
| 23-3 | 2.9 | 322 | 39.6 | -4 to 8 | 5-10 | 0.922 | 14 | 174 | - | 152 | - | 1 | 7.9 |
| 23-5 | 5 | 413 | 53.3 | -3 to 23 | 5-10 | 0.966 | 23 | 136 | 26 | 157 | - | 7 | 10.7 |
| 23-6.5 | 6.5 | 484 | 60 | 11 to 25 | 5-10 | 0.984 | 25 | 116 | 26 | 166 | 43 | 15 | 12 |
| 25-3 | 2.8 | 335 | 37.3 | 2 to 11 | 5-10 | 0.921 | 19 | 170 | - | 157 | - | 3 | 7.5 |
| 25-7 | 7.3 | 524 | 61.3 | 2 to 26 | 5-10 | 0.965 | 34 | 107 | 30 | 186 | 56 | 19 | 12.3 |
| 25-9 | 8.9 | 597 | 65.6 | 14 to 30 | 5-10 | 0.982 | 41 | 94 | 30 | 188 | 74 | 21 | 13.1 |
| 25-12 | 11.9 | 728 | 71.8 | 20 to 34 | 5-10 | 0.999 | 52 | 77 | 34 | 223 | 78 | 27 | 14.4 |
| 45-2.5 | 2.23 | 318 | 30.9 | 9 to 22 | 5-10 | 0.903 | 18 | 176 | - | 169 | - | 15 | 6.2 |
| 45-7 | 7 | 529 | 58.2 | 8 to 31 | 5-10 | 0.959 | 35 | 106 | 29 | 185 | 45 | 19 | 11.6 |
| 45-13 | 12.9 | 790 | 71.8 | 25 to 37 | 5-10 | 1.003 | 55 | 71 | 34 | 249 | 80 | 30 | 14.4 |

(56) References Cited

U.S. PATENT DOCUMENTS

| | | | | |
|---|---|---|---|---|
| 2012/0270129 | A1 | 10/2012 | Marinho et al. | |
| 2016/0017200 | A1* | 1/2016 | Yang | C23F 11/08 252/75 |
| 2017/0009120 | A1* | 1/2017 | Yang | C09K 5/10 |
| 2019/0225855 | A1* | 7/2019 | Yang | C09K 5/10 |
| 2022/0169906 | A1* | 6/2022 | Yang | H01M 8/04701 |

FOREIGN PATENT DOCUMENTS

| | | | | | |
|---|---|---|---|---|---|
| JP | 2006169441 | A | * | 6/2006 | |
| JP | 2010280825 | A | * | 12/2010 | |
| RU | 2771525 | C2 | * | 5/2022 | C23F 11/185 |
| WO | 2020/185611 | | | 9/2020 | |
| WO | WO-2020185611 | A1 | * | 9/2020 | C23F 11/149 |
| WO | 2022/043303 | | | 3/2022 | |

* cited by examiner

TOMADOL™ ETHOXYLATED ALCOHOLS

Tomah produces a variety of ethoxylated linear alcohol nonionic surfactants. The Tomadol ethoxylates vary in both alcohol and ethylene oxide chain lengths. By varying the alcohol chain length and the amount of ethylene oxide reacted with the linear alcohol, a wide range of physical and nonionic surfactant properties are available. The Tomadol ethoxylates are 100% active, colorless and range from liquids to low melting point solids of pasty consistency. They are excellent wetting agents, emulsifiers, and detergents. Tomadol ethoxylates are moderate foamers. They are represented by the formula below where R is the linear primary alcohol and n is the total number of moles of ethylene oxide.

$$RO(CH_2\,CH_2\,O)_nH$$

| Tomadol Series | R Equals | Description |
|---|---|---|
| 91-2.5; 91-6; 91-8 | Linear $C_9/C_{10}/C_{11}$ | poly (2.5) or (6) or (8) oxyethylene $C_{9-11}$ alcohol |
| 1-3; 1-5; 1-7; 1-9 | Linear $C_{11}$ | poly (3) or (5) or (7) or (9) oxyethylene $C_{11}$ alcohol |
| 23-1; 23-3; 23-5; 23-6.5 | Linear $C_{12}/C_{13}$ | poly (1) or (3) or (5) or (6.5) oxyethylene $C_{12-13}$ alcohol |
| 25-3; 25-7; 25-9; 25-12 | Linear $C_{12}/C_{13}$ $C_{14}/$ $C_{15}$ | poly (3) or (7) or (9) or (12) oxyethylene $C_{12-15}$ alcohol |
| 45-2.5; 45-7; 45-13 | Linear $C_{14}/$ $C_{15}$ | poly (2.5) or (7) or (13) oxyethylene $C_{14-15}$ alcohol |

| Tomadol Series | EO Groups/Avg. | Molecular Weight | EO Content, Wt.% | Melting range oC | Color (APHA) | Sp. Gravity @ 25oC | Viscosity,cSt @100oF | Hydroxyl No., mg/KOH/g | Surface Tension (0.1wt.%) | Flash pt. oC | Cloud pt. oC | Pour pt. oC | HLB |
|---|---|---|---|---|---|---|---|---|---|---|---|---|---|
| 91-2.5 | 2.7 | 281 | 42.3 | -25 to -17 | 5-10 | 0.925 | 12 | 200 | - | 124 | - | -13 | 8.5 |
| 91-6 | 6 | 425 | 62.1 | -5 to 15 | 5-10 | 0.984 | 23 | 132 | 29 | 143 | 52 | 6 | 12.4 |
| 91-8 | 8.3 | 524 | 69.7 | 7 to 24 | 5-10 | 1.008 | 39 | 107 | 30 | 159 | 80 | 15 | 13.9 |
| 1-3 | 3 | 305 | 43.3 | -15 to 4 | 5-10 | 0.936 | 10 | 184 | - | 142 | - | -7 | 8.7 |
| 1-5 | 5 | 392 | 56.1 | -4 to 17 | 5-10 | 0.968 | 21 | 143 | 25 | 148 | - | 6 | 11.2 |
| 1-7 | 7 | 479 | 64.3 | 4 to 20 | 5-10 | 0.996 | 28 | 117 | 28 | 165 | 58 | 13 | 12.9 |
| 1-9 | 9 | 569 | 69.6 | 15 to 28 | 5-10 | 1.011 | 31 | 99 | 31 | 176 | 74 | 18 | 13.9 |
| 23-1 | 1 | 238 | 18.5 | 2 to 11 | 5-10 | 0.873 | 13 | 236 | - | 143 | - | 5 | 3.7 |
| 23-3 | 2.9 | 322 | 39.6 | -4 to 6 | 5-10 | 0.922 | 14 | 174 | - | 152 | - | 1 | 7.9 |
| 23-5 | 5 | 413 | 53.3 | -3 to 23 | 5-10 | 0.965 | 23 | 136 | 26 | 157 | - | 7 | 10.7 |
| 23-6.5 | 6.6 | 484 | 60 | 11 to 25 | 5-10 | 0.984 | 29 | 116 | 28 | 168 | 43 | 15 | 12 |
| 25-3 | 2.8 | 330 | 37.3 | 2 to 11 | 5-10 | 0.921 | 19 | 170 | - | 157 | - | 3 | 7.5 |
| 25-7 | 7.3 | 524 | 61.3 | 2 to 26 | 5-10 | 0.965 | 34 | 107 | 30 | 186 | 50 | 19 | 12.3 |
| 25-9 | 8.9 | 597 | 65.6 | 14 to 30 | 5-10 | 0.982 | 41 | 94 | 30 | 188 | 74 | 21 | 13.1 |
| 25-12 | 11.9 | 729 | 71.8 | 20 to 34 | 5-10 | 0.999 | 53 | 77 | 34 | 223 | 78 | 27 | 14.4 |
| 45-2.5 | 2.23 | 319 | 30.8 | 9 to 22 | 5-10 | 0.903 | 19 | 176 | - | 169 | - | 15 | 6.2 |
| 45-7 | 7 | 529 | 58.2 | 9 to 31 | 5-10 | 0.959 | 35 | 106 | 29 | 185 | 45 | 19 | 11.6 |
| 45-13 | 12.9 | 790 | 71.8 | 25 to 37 | 5-10 | 1.003 | 59 | 71 | 34 | 249 | 80 | 30 | 14.4 |

Fig. 1

Copper ASTM Solder Brass Steel Cast Fe Cast Al

Copper ASTM Solder Brass Steel Cast Fe Cast Al

Copper ASTM Solder Brass Steel Cast Fe Cast Al

LOW ELECTRICAL CONDUCTIVITY HEAT TRANSFER FLUIDS

This application claims priority from U.S. Patent Application No. 63/450,506 filed Mar. 7, 2023, the entire contents of which are incorporated herein by reference.

Effective heat transfer fluids for use as a thermal management fluid in electric vehicles are described.

BACKGROUND

Heat transfer fluids are essential to the normal operation of automotive vehicles. In traditional automotive vehicles powered by internal combustion engines (ICE), glycol-water based heat transfer fluids are used in the cooling systems to provide long-lasting, year-round protection. Some requirements of heat transfer fluids are that they provide efficient heat transfer to control and maintain engine temperature for efficient fuel economy and lubrication, and prevent engine failures due to freeze-up, boil-over, or over-heating, as well as provide effective heat transfer to meet cabin climate control and windshield defrosting requirements. An additional desired requirement of a heat transfer fluid is that it provides effective corrosion protection of all cooling system metals over a wide range of temperature and operating conditions to ensure that it will fulfill all its design functions. An ideal heat transfer fluid for use in the automotive vehicle cooling system powered by an internal combustion engine typically has the following desired characteristics or properties.

1. High heat capacity (or high specific heat) and high thermal conductivity
2. Fluidity within the temperature of use
3. Low viscosity
4. Low freezing point
5. High boiling point
6. Compatible with the materials used in the cooling system so that it is capable of providing good corrosion protection to metals used in the system and will not cause degradation of non-metals
7. Chemically stable over the temperature range and condition of use
8. Low foaming tendency
9. Low flammability; high flash point
10. Non-toxic or low toxicity; no unpleasant odor
11. Cost effective and have adequate supply In addition, it is desirable if the heat transfer fluids have a distinct color to provide identity and prevent confusion between different heat transfer fluid technology products and other functional fluids used in automobiles. Such coloring is also intended to provide information as to the concentration of the heat transfer fluid and to allow the heat transfer fluid to be recognized during and after use in the cooling system.

A single material that possess the best available values for all the desirable properties for use as heat transfer fluid in the cooling systems of automotive vehicles has not yet been identified. Despite that, since the early 1960's, 50% ethylene glycol-50% water based engine coolants have been adopted by automakers as factory fill year-round heat transfer fluids in engine cooling systems in the US for ICEs. Automakers use 50% ethylene glycol-50% water based engine coolants as factory fill fluids because they provide an acceptable available balance of performance properties in terms of heat transfer, freeze and boil protection, flammability, toxicity, availability, corrosion protection of metals, and compatibility with other materials used in the cooling systems.

Recently, electric vehicles have increasingly attracted consumer's and manufacturer's attention due to the need to reduce emissions during vehicle operation, to improve energy efficiency, and to reduce the dependency on oil. Generally, there are four types of electric vehicles available on the market. They are as follows.

1. Battery electric vehicles (BEVs)-Propelled only by electric drive. The energy required to run the vehicle is supplied by a high voltage battery that is externally recharged.
2. Hybrid electric vehicles (HEVs)-Propelled by a combination of an internal combustion engine and electric drive. The electric motor runs off a high voltage battery that it is charged in the vehicle via e.g., regenerative braking for greater efficiency. The batteries of an HEV cannot be recharged from an external power source.
3. Plug-in hybrid electric vehicles (PHEVs)-Plug-in hybrids also use high voltage battery to power an electric motor to drive the vehicle and can be recharged from an external power source, but they incorporate a smaller internal combustion engine that can recharge the battery (or in some models, directly power the wheels) to allow for longer driving ranges.
4. Fuel cell electric vehicles (FCEVs)—Propelled only by electric drive. FCEVs generate electricity to power the electric motor via a highly efficient electrochemical process in the fuel cell stack. In the fuel cell stack, the oxidation reaction of hydrogen (i.e., the fuel) takes places at the anodes, and the reduction reaction of oxygen (supplied by the air) take places at the cathodes.

Key components of electric vehicle drive systems include the following:

1. High voltage battery with a control unit for battery regulation and charger;
2. Electric motor/generator with electronic control (power electronics) and cooling system;
3. Transmission including differential;
4. Brake system (including regenerative braking); and
5. High voltage air conditioning for vehicle interior climate control In comparison with battery powered EVs, fuel cell powered electric vehicles also have additional components such as a fuel cell stack and a high-pressure hydrogen storage tank.

Generally, electric vehicles may have the following drive combinations.

Electric Vehicle Drive Combinations

| Drive Train Key Components | Full Hybrid Drive HEV | Plug-in Hybrid Drive PHEV | Battery Electric Drive BEV | Range Extender Electric Drive RXBEV | Fuel Cell Electric Drive FBCEV |
|---|---|---|---|---|---|
| Internal Combustion Engine | Yes | Yes | No | Yes | No |

-continued

| Electric Vehicle Drive Combinations | | | | | |
|---|---|---|---|---|---|
| Drive Train Key Components | Full Hybrid Drive HEV | Plug-in Hybrid Drive PHEV | Battery Electric Drive BEV | Range Extender Electric Drive RXBEV | Fuel Cell Electric Drive FBCEV |
| Electric Motors | Yes | Yes | Yes | Yes | Yes |
| Power Electronics | Yes | Yes | Yes | Yes | Yes |
| High Voltage Battery | Yes | Yes | Yes | Yes | Yes |
| Charging Contact for External Charging | No | Yes | Yes | Yes | No |
| Fuel Cell Stack | No | No | No | No | Yes |

Note:
"Yes" indicates that the component is present in the vehicle drive system.
"No" indicates that the component is not present in the vehicle drive system.

The common components of the various drive combinations for electric vehicles are electric motors, power electronics, and high voltage battery. The thermal management requirements of the system components are often quite different. For example, lithium-ion batteries are commonly used in electric vehicles. At low temperatures (e.g., below zero degree Celsius), the performance and the driving range drop significantly due to slower chemical reactions taking place in the battery. At high temperatures (e.g., at above ~40 degree Celsius), the battery rapidly deteriorates. On the other hand, power electronics cannot operate at temperatures higher than 70-80 degree Celsius for a long period of time without significantly reducing service life.

In addition, for various electric vehicle (EV) drive system components, the preferred coolant operating temperatures differ, as listed below.

1. High Voltage Lithium Ion Traction Battery: 25° C. to 35° C. or ambient temperature
2. Power Electronics: 60° C. to 80° C.
3. Electric Motor: up to 100° C.
4. Fuel Cell Stack: ~ 80° C.
5. Internal Combustion Engines: 95° C. to 120° C.

Due to the differing operating temperature requirements of the various components, more than one thermal management fluid circuit is typically required by an electric vehicle.

Effective thermal management of the lithium-ion battery (commonly used in EVs as traction or propulsion high voltage battery) is especially important since it not only impacts the driving range of the EVs, but it also plays a critical role in how quickly that the battery can be recharged at the charging stations. In addition, effective thermal management also helps to increase the service life of the lithium-ion battery.

The majority of electric vehicles on the road today use ethylene glycol-water-based heat transfer fluids to meet the thermal management needs. Some EV models, such as the Nissan Leaf also use air cooling for its high-voltage lithium-ion traction battery system. Using air as heat transfer fluid can simplify the construction of cooling system. However, due to the low heat capacity and low thermal conductivity of air, air cooling is not an effective solution as compared to liquid cooling. Air cooling requires typically two to three times more energy to remove heat compared to liquid cooling. Providing uniform and effective cooling of every cell in the battery pack in an EV that may contain many individual cells is very challenging by using air as the heat transfer media.

On the other hand, most of the ethylene glycol-water based heat transfer fluids currently used as thermal management fluids contain corrosion inhibitors and other components that may ionize in aqueous solutions. Hence, these ethylene glycol-water based heat transfer fluids typical have a high electrical conductivity, in the range of a few thousand μS/cm. These heat transfer fluids are designed to be circulating inside cooling plates located adjacent to or next to lithium-ion battery cells but are electrically isolated from the high-voltage battery, under normal operating conditions.

Fuel cells are a clean and efficient power source. They have been proposed for use in many applications, including as a replacement for internal combustion engines currently in use in automobiles. A fuel cell assembly includes an anode (a negatively charged electrode where the oxidation reaction of a fuel takes place), a cathode (a positively charged electrode where the reduction reaction of an oxidant, e.g., oxygen, takes place), and an electrolyte in between the two electrodes. To produce sufficient power for use as a vehicle engine, the fuel cell based engine needs to have many cells connected in series together to form a fuel cell stack. Each single cell will operate at a voltage of approximately 0.6-1.0 V DC. The proposed fuel cell stack for use in vehicles often has more than 100 cells connected in series. Hence, the DC electrical voltage across the fuel cell stack can be very high. The typical reported cell voltage generally ranges from about 125 V DC to 450 V DC in automotive fuel cell stacks.

In the fuel cell stack cooling systems of fuel cell powdered vehicles, a DC voltage up to few volts per centimeter can be experienced by coolant in the fuel cell stack flow channels. To minimize stray current corrosion and to prevent short-circuiting of electric current, electrically non-conductive ethylene glycol-water heat transfer fluids are specified for use in the fuel cell stack cooling systems. In addition, an ion exchanger filter containing mixed bed ion exchange resin is often installed in the flow loop of the fuel cell stack cooling system to remove ionic species from the coolant and to keep the electrical conductivity of the coolant from rising above the maximum allowable limit due glycol degradation and leaching of ionic species from the surfaces of coolant wetted cooling system components.

In addition to generating electric power, a fuel cell assembly also generates heat due to the exothermic nature of the electrochemical reactions involved and the flow of electrical current. Thus, a fuel cell stack contains coolant channels for the circulation of coolant to remove heat from the stack. In circulating a coolant through the coolant channels, the temperature of the fuel cell stack may be controlled at the desirable range for optimal operating conditions.

The cooling system surrounding the fuel cell stack, however, is exposed to the same electrical voltage as the fuel cell stack itself. To prevent or minimize electrical shock hazard, it is desirable to provide a coolant having a low conductivity. For example, the upper limit for coolant conductivity may be set to less than 5 μS/cm. A low electrical conductivity for a fuel cell coolant is desirable for the reduction of shunt current in the coolant system and the minimization of system efficiency reduction.

In addition, fuel cell coolant systems have many metallic components. Stainless steel, aluminum, brass and braze alloy and other ferrous or non-ferrous alloys are some of the metals likely to be included in the fuel cell coolant systems. Among the available common engineering alloys, magnesium alloys have the highest strength-to-weight ratio. Use of magnesium alloys in automobiles has increased due to the need for increased fuel economy, reduced pollution and lessening our dependence on petroleum. Recently, several new applications in various parts of vehicles have been developed, including an oil pan in certain Honda models, a gearbox housing in the VW Passat and a radiator support assembly in the 2004 new models of Ford F150 truck. However, use of Mg alloys for vehicle powertrain systems, such as an engine block, has been quite limited so far. One reason that limits the application of Mg alloys in powertrain systems is their poor corrosion resistance, especially when they are in contact with water/glycol based coolants commonly used in vehicle cooling systems. Galvanic corrosion between magnesium alloys and other less reactive (or more noble) alloys is a major cause of excessive corrosion of magnesium alloys in vehicle cooling systems.

Magnesium and the other metals noted above may corrode under typical operating conditions. Thus, there is a need to use corrosion inhibitors in the fuel cell coolant to minimize corrosion and increase system service life. However, most of the known corrosion inhibitors are ionic species (e.g., silicates, nitrite, molybdates, nitrate, carboxylates, phosphates, and borates, etc.), and their presence at the sufficiently high concentrations normally used to provide corrosion protection in engine cooling systems will cause the fuel cell coolant conductivity limits to be greatly exceeded. Thus, providing effective corrosion protection in fuel cell coolant systems for metals, especially for the more corrosion prone metals, such as carbon steel, aluminum alloys, magnesium alloys, and yellow metals, has been a major challenge. The ability to protect corrosion of these metals in the cooling systems of a fuel cell powered vehicle will enable the use of lower cost materials in the systems, and help reduce the cost of making a fuel cell powered vehicle.

The corrosion inhibitor formulations currently used in water/glycol based coolants for the majority of hybrid and BEV vehicle cooling (or thermal management) systems contain high concentrations of ionic species, such as silicates, carboxylates (such as $C_4$-$C_{18}$ mono or di-carboxylates, benzoates), molybdates, nitrates, phosphates, phosphonates, borates, etc. to provide corrosion protections for various metals in the cooling systems. Although many these inhibited coolants can provide satisfactory corrosion protection for the metallic (including aluminum, cast iron, steel, copper, brass, solder, etc.) components used in vehicle cooling systems, including most of the electric vehicle thermal management systems, the electrical conductivity of these water/glycol based coolants typically are quite high, generally in the range of >1500 S/cm for most of the ready-to-use prediluted (e.g., 50 vol % coolant+50 v % water) coolant products.

To reduce the risks of a lithium-ion battery fire due to coolant leak because of an accident (or other reason), some original equipment manufacturers (OEMs) started to use a prediluted, ready-to-use low electrical conductivity (i.e., less than 150 μS/cm) ethylene glycol water-based coolant for use in the battery pack cooling system and other cooling systems of the electric vehicles in some models of battery powered EVs. However, the corrosion protection performance of these low electrical conductivity ethylene glycol water-based coolant products or thermal system management fluids generally has substantial room for improvement, particularly with respect to corrosion protection of corrosion prone metals that have been commonly used in many vehicle cooling systems, such as aluminum alloys, carbon steel, and cast iron. In addition, corrosion protection performance of the aluminum alloy surfaces of the automotive heat exchangers manufactured by the controlled atmosphere brazing process by these ethylene glycol water-based coolant products under electric vehicle thermal management system operating conditions has substantial room for improvement.

In addition to providing effective corrosion protection, a heat transfer fluid must have a number of other properties to fulfill its design functions. Such desirable properties include, but may not be limited to, high heat transfer ability, freeze protection, boil-over protection, corrosion protection and antifoaming protection.

SUMMARY

After considerable study, the inventors have discovered novel glycol-water based heat transfer fluids or thermal management fluid compositions that have a low electrical conductivity, are capable of meeting the requirements of effective heat transfer, have excellent protection against corrosion of metals used in cooling systems, protect against freezing and boil-over, and have low foam tendency.

The described heat transfer fluids or thermal management fluid compositions may be provided as a concentrate that may subsequently be diluted for use or may be provided as a prediluted ready-to-use heat transfer or thermal management fluid. When provided as a concentrate, the heat transfer or thermal management fluid contains a freezing point depressing agent, de-ionized water having an electrical conductivity less than 5 μS/cm, and a synergistic corrosion inhibitor formulation with low electrical conductivity that can provide effective corrosion protection of aluminum alloy surfaces in the presence of potassium fluoroaluminate flux residues under electric vehicle thermal management system operating conditions. The electrical conductivity of the heat transfer fluid concentrate is less than about 500 μS/cm. When the heat transfer or thermal management fluid is provided as a ready-to-use product, the electrical conductivity of the 50 vol. % ready-to-use heat transfer fluid produced by adding deionized water to the heat transfer fluid concentrate is also less than about 500 S/cm. The low electrical conductivity of the described heat transfer fluids or thermal management fluids reduce galvanic corrosion tendency for metals used in the systems, including magnesium alloys.

A method in accordance with the present teachings for preventing corrosion in a heat transfer system includes contacting at least a portion of the heat transfer system with the described heat transfer fluid.

In some embodiments, the described heat transfer fluids are free of silicates, nitrite, nitrate, molybdates, carboxylates (such as, but not limited to $C_4$-$C_{18}$ mono or di-carboxylates, benzoates), phosphates, phosphonates, and borates.

As used in this description, reference to a heat transfer fluid may likewise refer to thermal management system fluids whether it is explicitly stated or not. In other words, the absence of an explicit mention of thermal management system fluid, when mentioning heat transfer fluid, is not meant to convey that the described composition is suitable only for heat transfer fluids. The skilled artisan will appreciate that the described compositions may be suitable for both heat transfer fluid and thermal management system fluids unless specifically noted otherwise.

Throughout this description and in the appended claims, the following definitions are to be understood:

The term "heteroatom" refers to any atom other than carbon and hydrogen. Representative examples of heteroatoms in accordance with the present teachings include but are not limited to nitrogen, oxygen, sulfur, and the like.

The term "alkyl" refers to a substituted or unsubstituted, straight, branched or cyclic hydrocarbon chain containing, in some embodiments, from 1 to 24 carbon atoms. Representative examples of unsubstituted alkyl groups in accordance with the present teachings include but are not limited to methyl, ethyl, propyl, iso-propyl, cyclopropyl, butyl, isobutyl, tert-butyl, sec-butyl, cyclobutyl, pentyl, cyclopentyl, hexyl, cyclohexyl, and the like.

The term "alkenyl" refers to a substituted or unsubstituted, straight, branched or cyclic, unsaturated hydrocarbon chain that contains at least one double bond and, in some embodiments, from 2 to 24 carbon atoms. Representative unsubstituted alkenyl groups in accordance with the present teachings include but are not limited to ethenyl or vinyl (—CH═CH2), 1-propenyl, 2-propenyl or allyl (—CH2-CH═CH2), 1,3-butadienyl (—CH—CHCH═CH2), 1-butenyl (—CH═CHCH2CH3), hexenyl, pentenyl, 1, 3, 5-hexatrienyl, and the like. In some embodiments, cycloalkenyl groups have from five to eight carbon atoms and at least one double bond. Representative cycloalkenyl groups in accordance with the present teachings include but are not limited to cyclohexadienyl, cyclohexenyl, cyclopentenyl, cycloheptenyl, cyclooctenyl, cyclohexadienyl, cycloheptadienyl, cyclooctatrienyl, and the like.

The term "alkoxy" refers to a substituted or unsubstituted-O-alkyl group. Representative unsubstituted alkoxy groups in accordance with the present teachings include but are not limited to methoxy, ethoxy, n-propoxy, iso-propoxy, n-butoxy, tert-butoxy, and the like.

The terms "siloxy" and "silyloxy" refer to silicon substituted oxygen groups. The silicon-containing portion of the siloxy group may be substituted or unsubstituted. Representative siloxy groups in accordance with the present teachings include but are not limited to trimethylsilyloxy ($—OSi(CH_3)_3$), triethylsilyloxy ($—OSi(CH_2CH_3)_3$), triisopropylsiloxy ($—OSi(i\text{-}Pr)_3$), tert-butyidimethylsilyloxy ($—OSi(tert\text{-}Bu)(CH_3)_2$), and the like.

The term "alkynyl" refers to a substituted or unsubstituted, straight, branched or cyclic unsaturated hydrocarbon chain containing at least one triple bond and, in some embodiments, from 2 to 20 carbon atoms.

The term "aryl" refers to a substituted or unsubstituted mono-, bi-, or poly-cyclic aromatic ring system of 4-20 carbon atoms. Representative aryl groups in accordance with the present teachings include but are not limited to benzene, substituted benzene (e.g., toluene, xylenes, styrene), naphthalene, anthracene, biphenyl, and the like.

The term "amino" refers to an unsubstituted or substituted amino ($—NH_2$) group. The amine may be primary ($—NH_2$), secondary ($—NHR_a$) or tertiary ($—NR_aR_b$, wherein $R_a$ and $R_b$ are the same or different). Representative substituted amino groups in accordance with the present teachings include but are not limited to methylamino, dimethylamino, ethylamino, diethylamino, 2-propylamino, 1-propylamino, di(n-propyl)amino, di(iso-propyl)amino, methyl-n-propylamino, tert-butylamino, and the like.

The term "halogen" refers to fluorine, chlorine, iodine or bromine.

The term "heterocyclic" refers to a saturated, partially unsaturated, or aromatic ring system containing from 3 to 24 carbon atoms (in some embodiments, 4 to 22 carbon atoms; in other embodiments 6 to 20 carbon atoms) and at least one heteroatom (in some embodiments 1 to 3 heteroatoms). The ring may optionally be substituted with one or more substituents. Moreover, the ring may be mono-, bi- or polycyclic. As used herein, the term "heterocyclic" subsumes the term "heteroaryl." Representative heteroatoms for inclusion in the ring include but are not limited to nitrogen, oxygen, and sulfur. Representative heterocyclic groups in accordance with the present teachings include but are not limited to aziridine, azirine, oxirane, oxirene, thiirane, thiirene, diazirine, oxaziridine, dioxirane, azetidine, azete, oxetane, oxete, thietane, thiete, diazetidine, dioxetane, dioxete, dithietane, dithiete, pyrrolidine, tetrahydrofuran, thiolane, imidazolidine, pyrazolidene, oxazolidine, isooxazolidine, thiazolidine, isothiazolidene, dioxolane, dithiolane, furazan, oxadiazole, dithiazole, tetrazole, piperidine, oxane, pyran, thiane, thiopyran, piperazine, diazines, morpholine, oxazine, thiomorpholine, thiazine, dioxane, dioxine, dithiane, dithiine, trioxane, trithiane, tetrazine, azepane, azepine, oxepane, oxepine, thiepane, thiepine, homopiperazine, diazepine, thiazepine, azocane, azocine, acridine, benzathiazoline, benzimidazole, benzofuran, benzothiapene, benzthiazole, benzothiophenyl, carbazole, cinnoline, furan, imidazole, 1H-indazole, indole, isoindole, isoquinoline, isothiazole, oxazole, isoxazole, oxadiazoles (e.g., 1,2,3-oxadiazole), phenazine, phenothiazine, phenoxazine, phthalazine, pteridine, purine, pyrazine, pyrazole, pyridazine, pyridine, pyrimidine, pyrrole, quinazoline, quinoline, quinoxaline, thiazole, thiadiazoles (e.g., 1,3,4-thiadiazole), thiophene, triazine (e.g., 1,3,5-triazine), triazoles (e.g., 1,2,3-triazole), and the like.

The term "substituted" refers to the optional attachment of one or more substituents onto a backbone structure (e.g., an alkyl backbone, an alkenyl backbone, a heterocyclic backbone, etc.). Representative substituents for use in accordance with the present teachings include but are not limited to hydroxyl, amino ($—NH_2$, $—NHR_a$, $—NR_aR_b$), oxy (—O—), carbonyl (—CO—), thiol, alkyl, alkenyl, alkynyl, alkoxy, halo, nitrile, nitro, aryl and heterocyclyl groups. These substituents may optionally be further substituted with 1-3 substituents. Examples of substituted substituents include but are not limited to carboxamide, alkylmercapto, alkylsulphonyl, alkylamino, dialkylamino, carboxylate, alkoxycarbonyl, alkylaryl, aralkyl, alkylheterocyclyl, heterocyclylaryl, haloalkyl, and the like. The substituent should not substantially interfere chemically with the reaction of the invention (e.g., cross react with reactants, terminate the reaction or the like).

The phrase "fuel cell" refers to any type of fuel cell, including but not limited to polymer electrolyte membrane (PEM) fuel cells, direct methanol fuel cells, alkaline fuel cells, phosphoric acid fuel cells, molten carbonate fuel cells, solid oxide fuel cells, and any combination thereof. In addition, as used herein, the phrase "fuel cell" encompasses one or multiple individual fuel cells, and one or multiple individual "stacks" (i.e., electrically coupled combinations) of fuel cells.

It is to be understood that elements and features of the various representative embodiments described below may be combined in different ways to produce new embodiments that likewise fall within the scope of the present teachings.

Unless otherwise explicitly noted, all percentages in this disclosure refer to a percent by weight.

DESCRIPTION OF THE DRAWINGS

The patent or application file contains at least one drawing executed as a photograph and in color. Copies of this patent or patent application with photographs and color drawings will be provided by the Office upon request and payment of the necessary fee.

The foregoing aspects and many of the attendant advantages of the present technology will become more readily appreciated by reference to the following Description, when taken in conjunction with the accompanying drawings.

The patent or application file contains at least one drawing executed in color. Copies of this patent or patent application publication with color drawing(s) will be provided by the Office upon request and payment of the necessary fee.

FIG. 1 is a product listing of alkoxylated alcohols available from TOMAH Products, Inc.

Figure 2A:
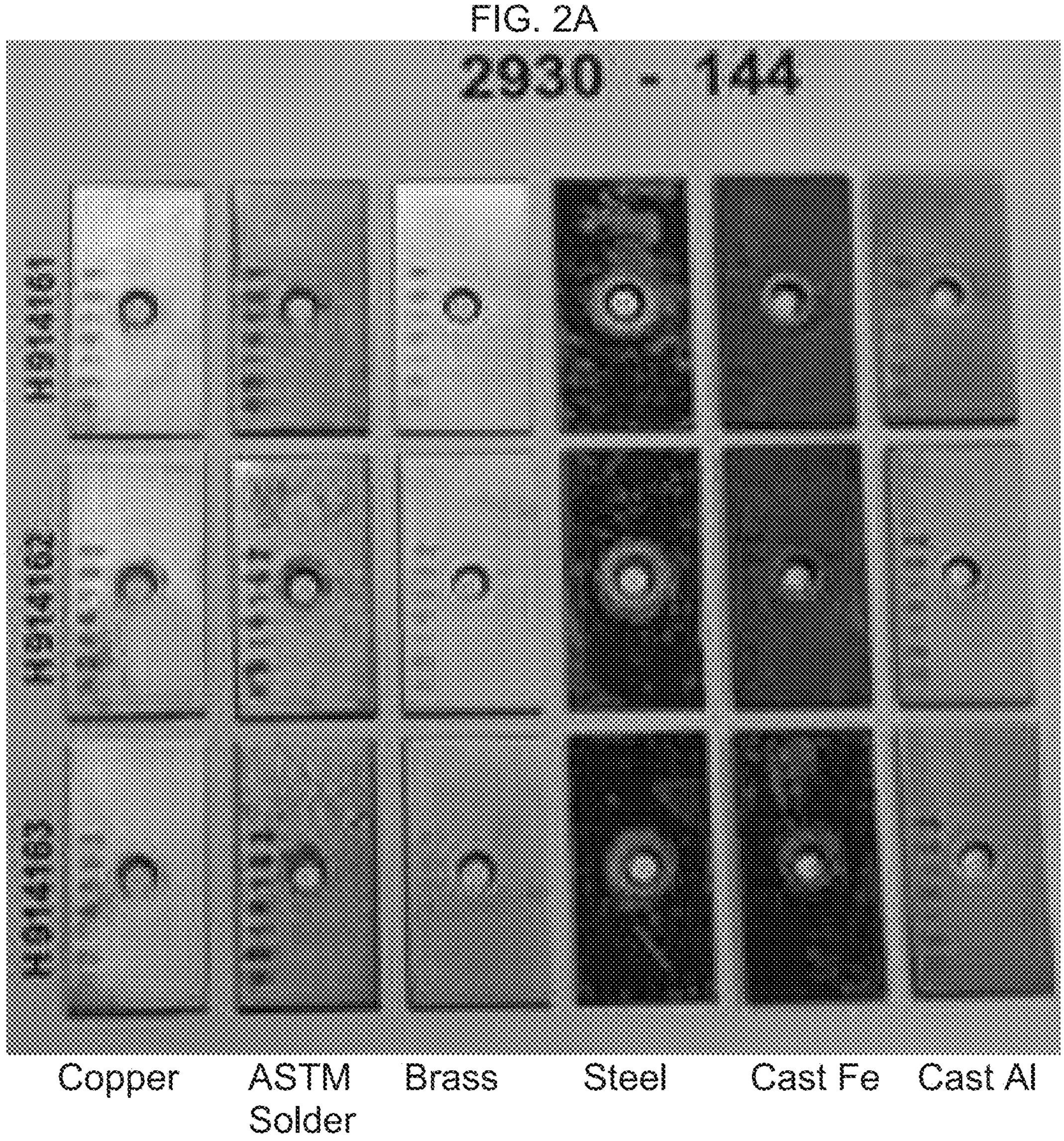

FIG. 2A shows a photo of the front side of five metal specimens (the front side being stamped with an identification number before the test) after being tested in a modified ASTM D1384-24 test (test duration: 336 hours at 88° C.) where the prediluted ready-to-use very low electrical conductivity original equipment (OE) BEV battery system thermal management fluid 1 (also may be referred to as OE BEV coolant 1) was used as the test solution without adding any corrosive salts and is further described as Comparative Example 6, below.

Figure 2B:
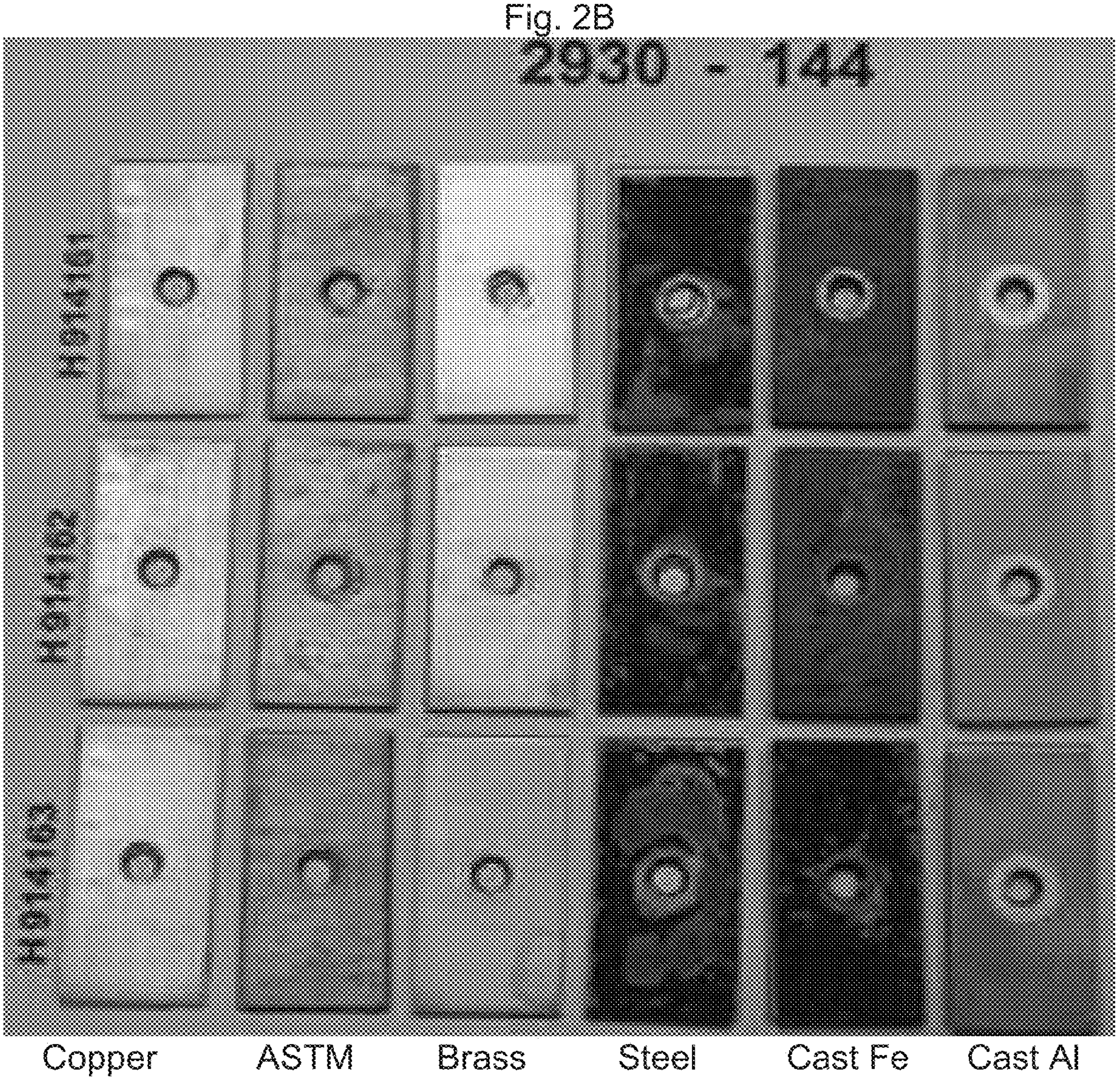

FIG. 2B shows a photo of the back side of the five metal specimens of FIG. 2A after being tested in a modified ASTM D1384-24 test (test duration: 336 hours at 88° C.) where the prediluted ready-to-use very low electrical conductivity OE BEV battery system thermal management fluid 1 (also may be referred to as OE BEV coolant 1) was used as the test solution without adding any corrosive salts and is further described as Comparative Example 6, below.

Figure 3A:
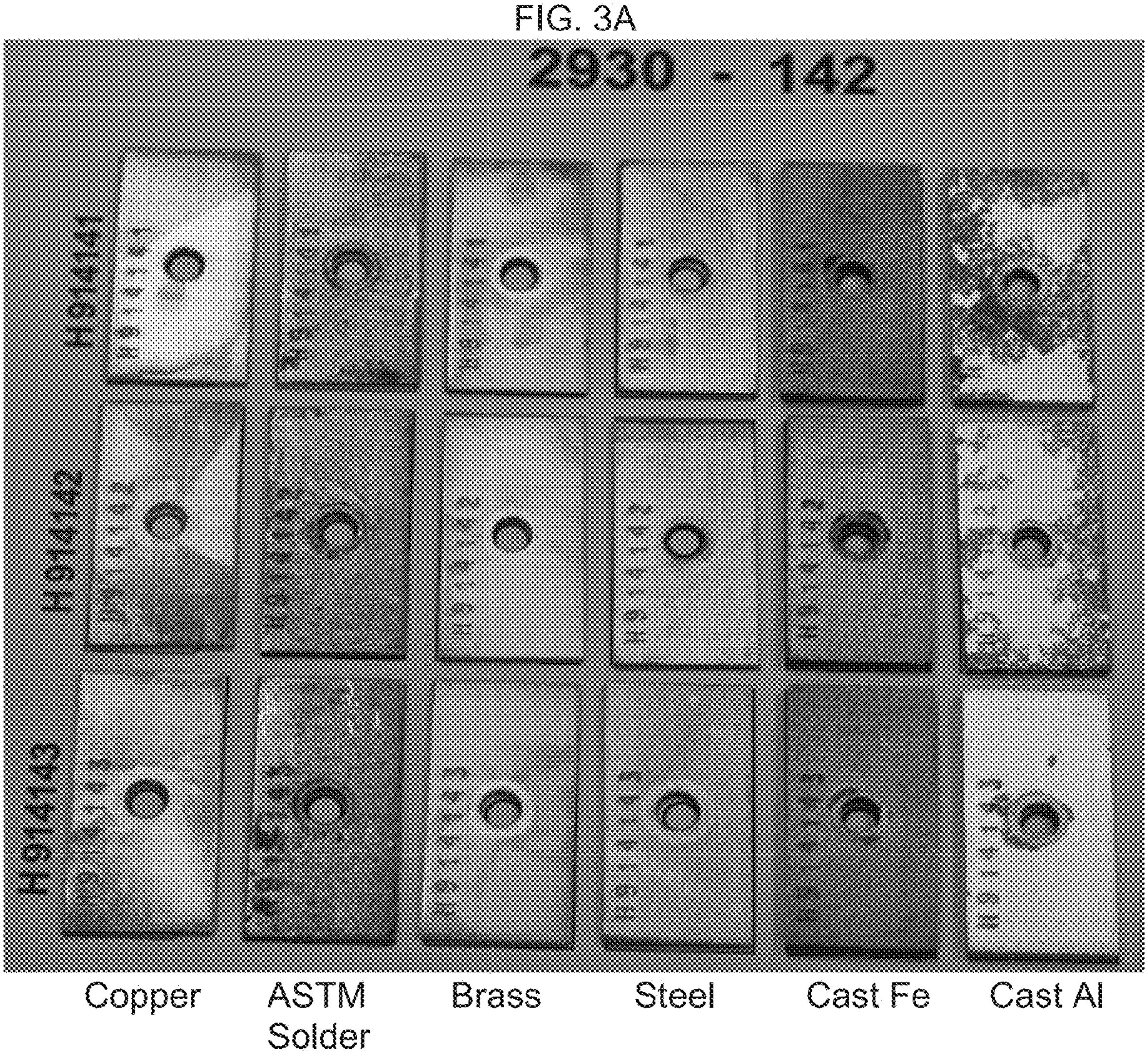

FIG. 3A shows a photo of the front side of five metal specimens after being tested in a modified ASTM D1384-24 test (test duration: 336 hours at 88° C.) where the prediluted ready-to-use low electrical conductivity OE BEV battery system (it is also specified for use in hybrid EV inverter system) thermal management fluid 2 (also may be referred to as OE BEV coolant 2) was used as the test solution without adding any corrosive salts and is further described as Comparative Example 7, below.

Figure 3B:
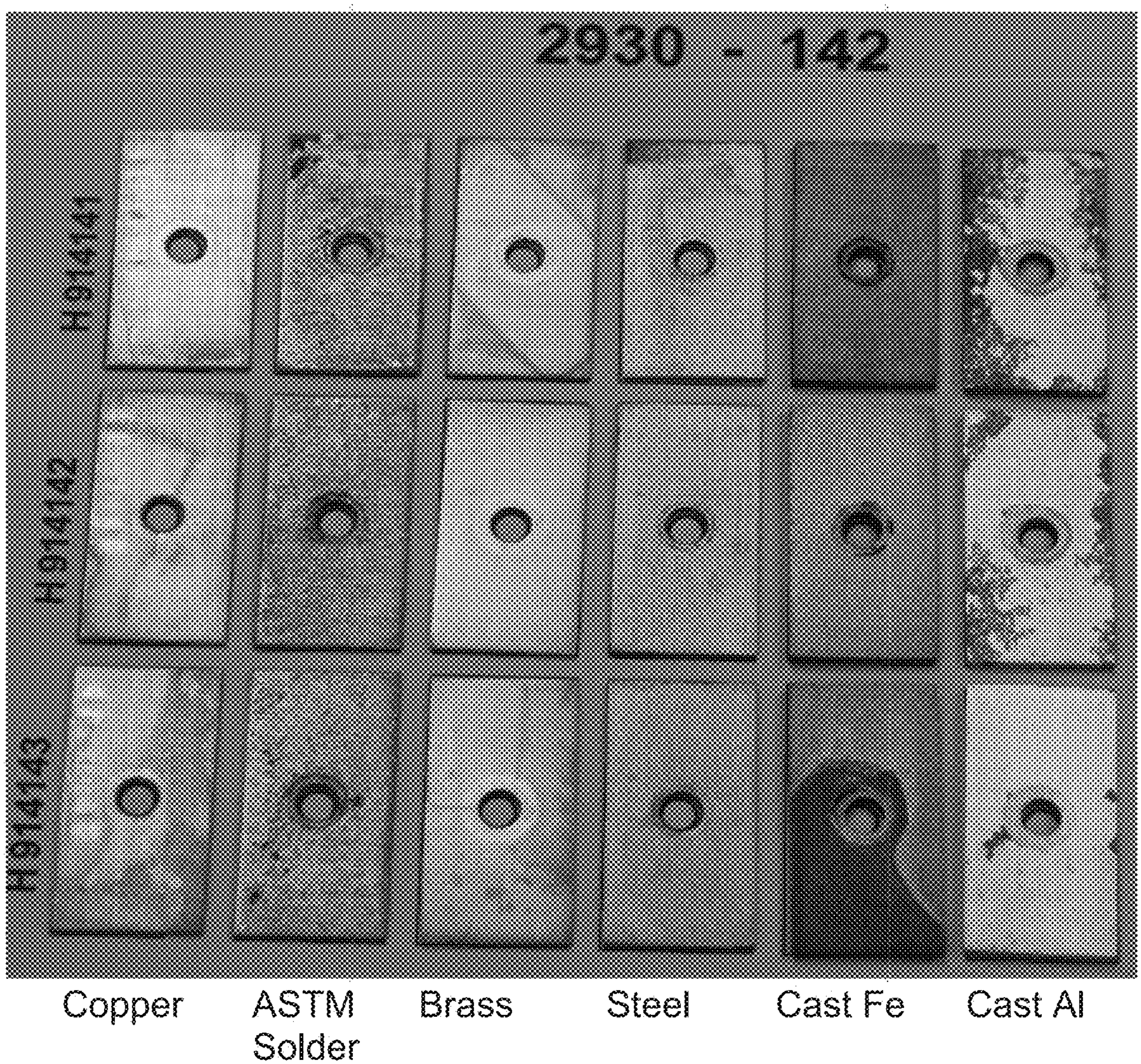

FIG. 3B shows a photo of the back side of the five metal specimens of FIG. 3A after being tested in a modified ASTM D1384-24 test (test duration: 336 hours at 88° C.) where the prediluted ready-to-use low electrical conductivity OE BEV battery system (it is also specified for use in hybrid EV inverter system) thermal management fluid 2 (also may be referred to as OE BEV coolant 2) was used as the test solution without adding any corrosive salts and is further described as Comparative Example 7, below.

Figure 4A:
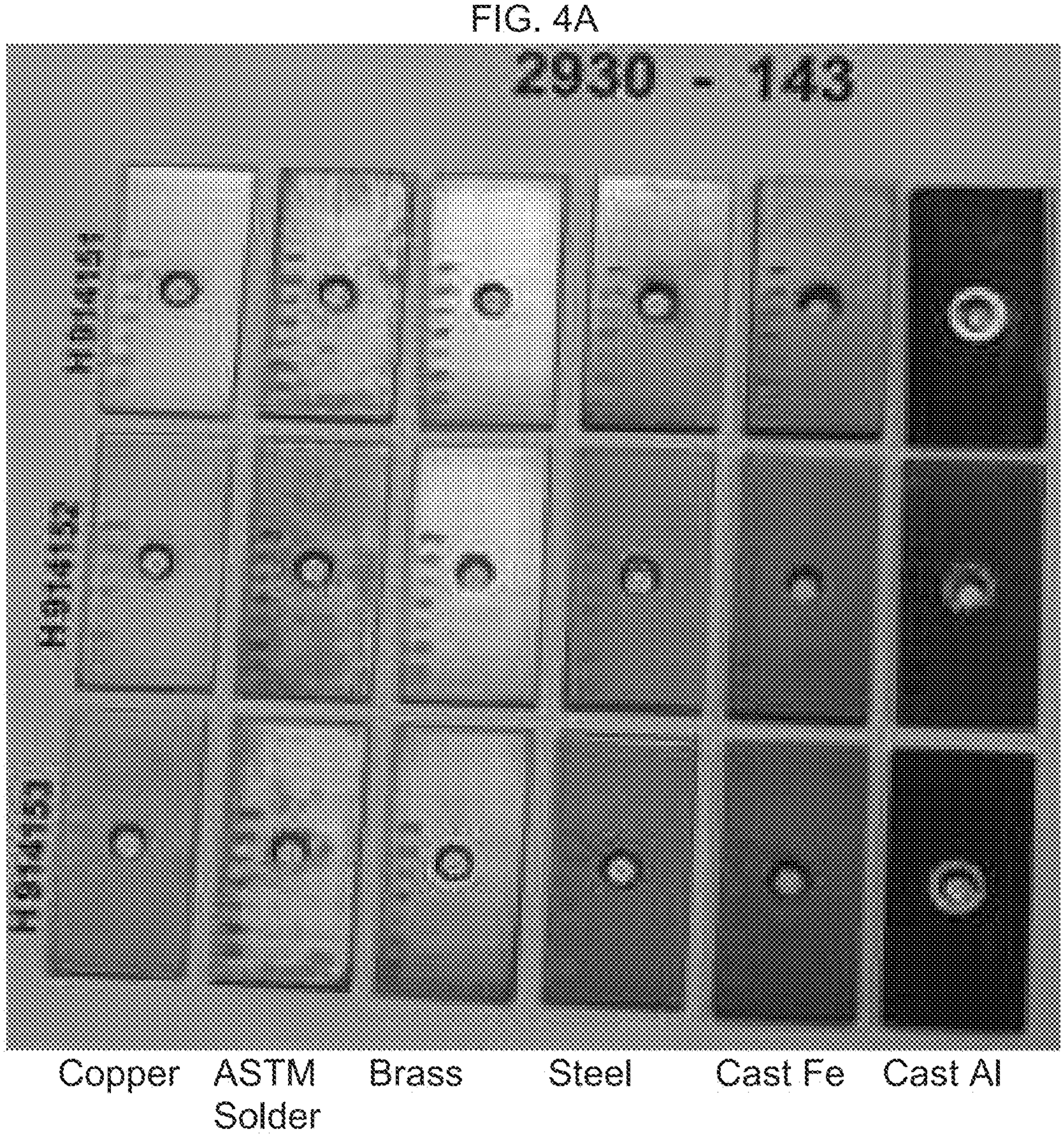

FIG. 4A shows a photo of the front side of the five metal specimens after being tested in a modified ASTM D1384-24 test (test duration: 336 hours at 88° C.) where the prediluted ready-to-use medium electrical conductivity battery system thermal management fluid (also may be referred to as Aftermarket EV coolant) was used as the test solution without adding any corrosive salt and is further described as Comparative Example 8, below.

Figure 4B:
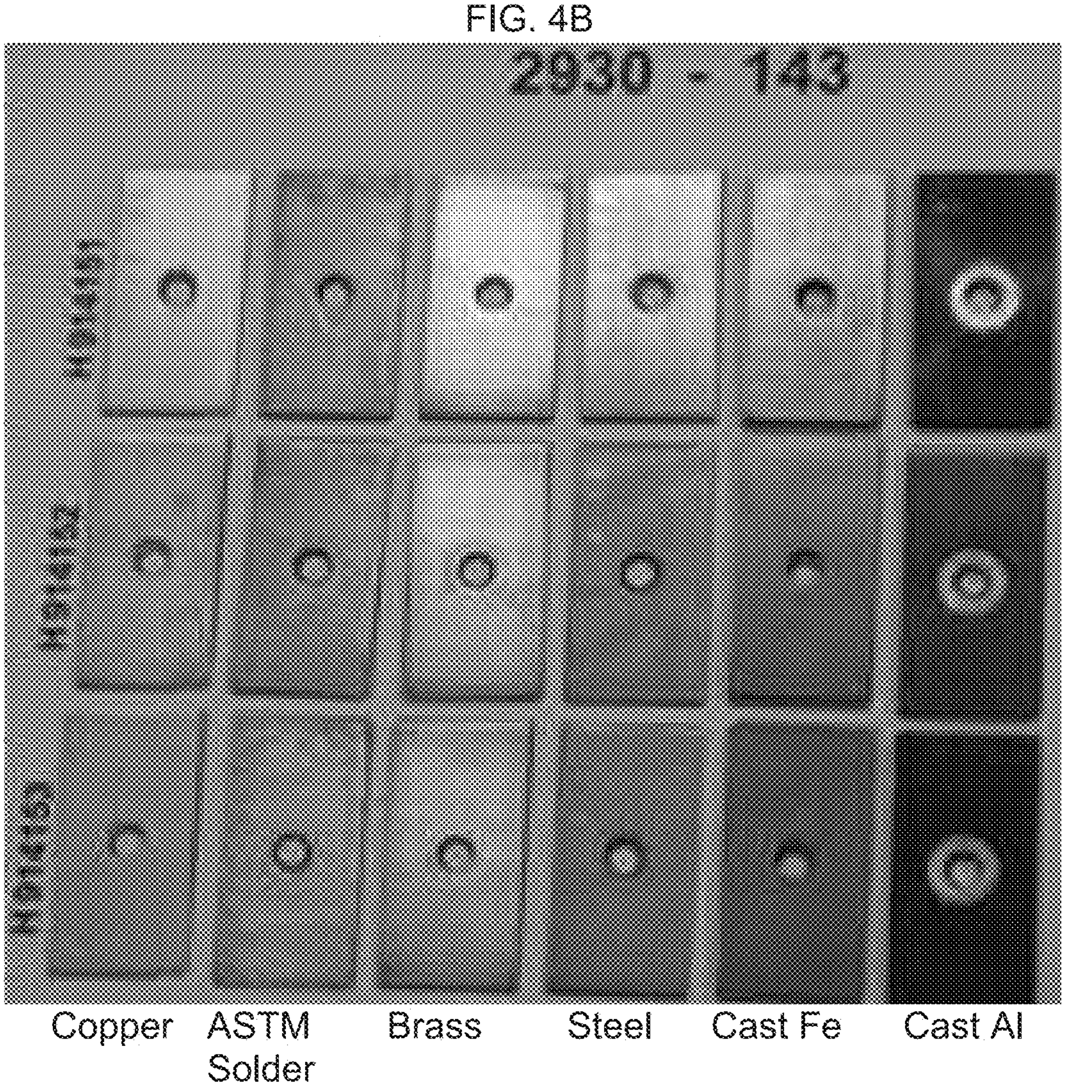

FIG. 4B shows a photo of the back side of the five metal specimens of FIG. 4A after being tested in a modified ASTM D1384-24 test (test duration: 336 hours at 88° C.) where the prediluted ready-to-use medium electrical conductivity battery system thermal management fluid (also may be referred to as Aftermarket EV coolant) was used as the test solution without adding any corrosive salt and is further described as Comparative Example 8, below.

Figure 5:
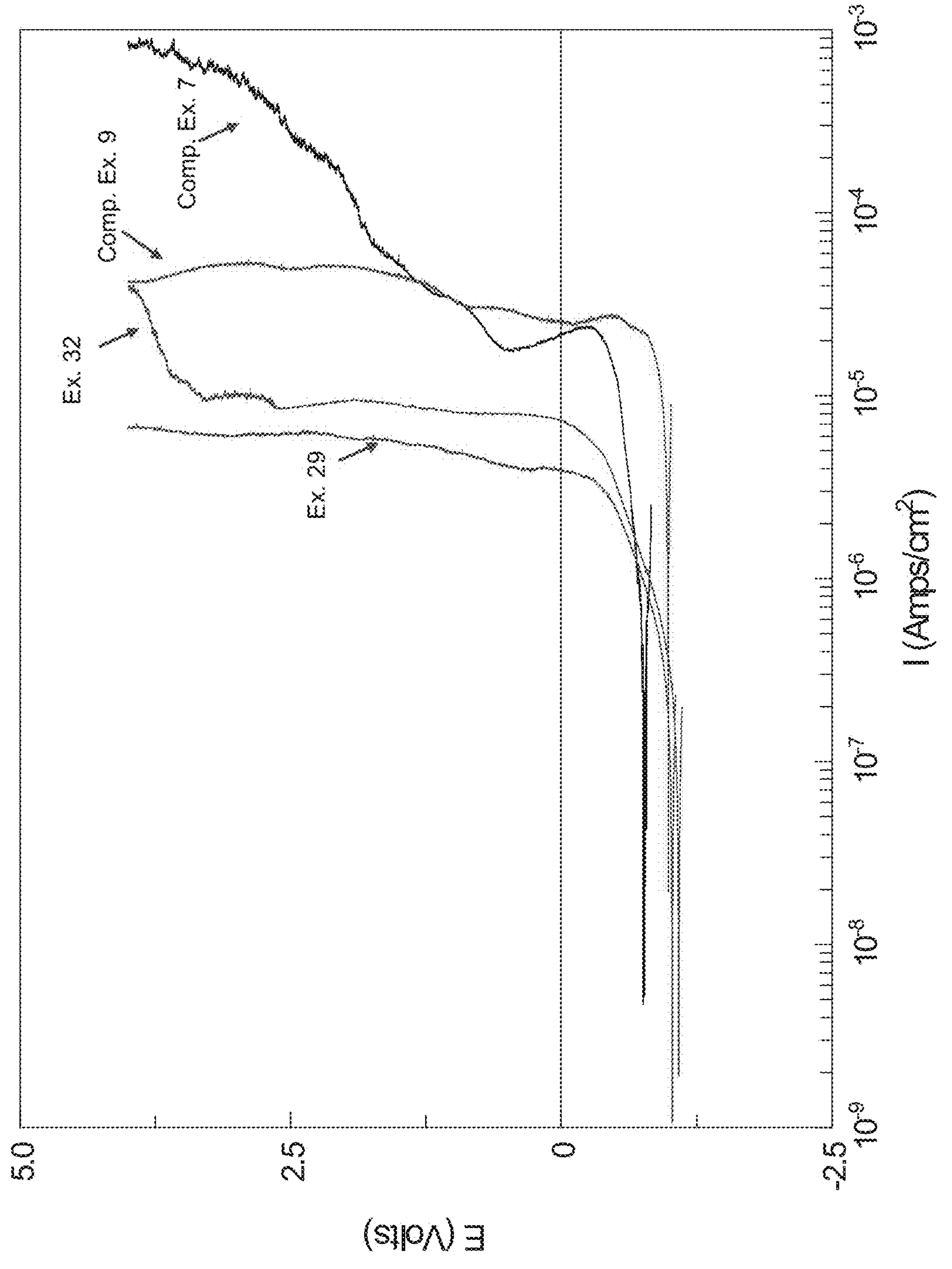

FIG. 5 shows the anodic polarization curve measurements obtained on a CAB heat exchanger surfaces covered by potassium fluoroaluminate flux residue using heat transfer fluid compositions described in Tables 1, 8, 12, and 131 below, with a scan rate of 1 mV/see using AgAgCl in 3M NaCl solution as a reference electrode.

Figure 6:
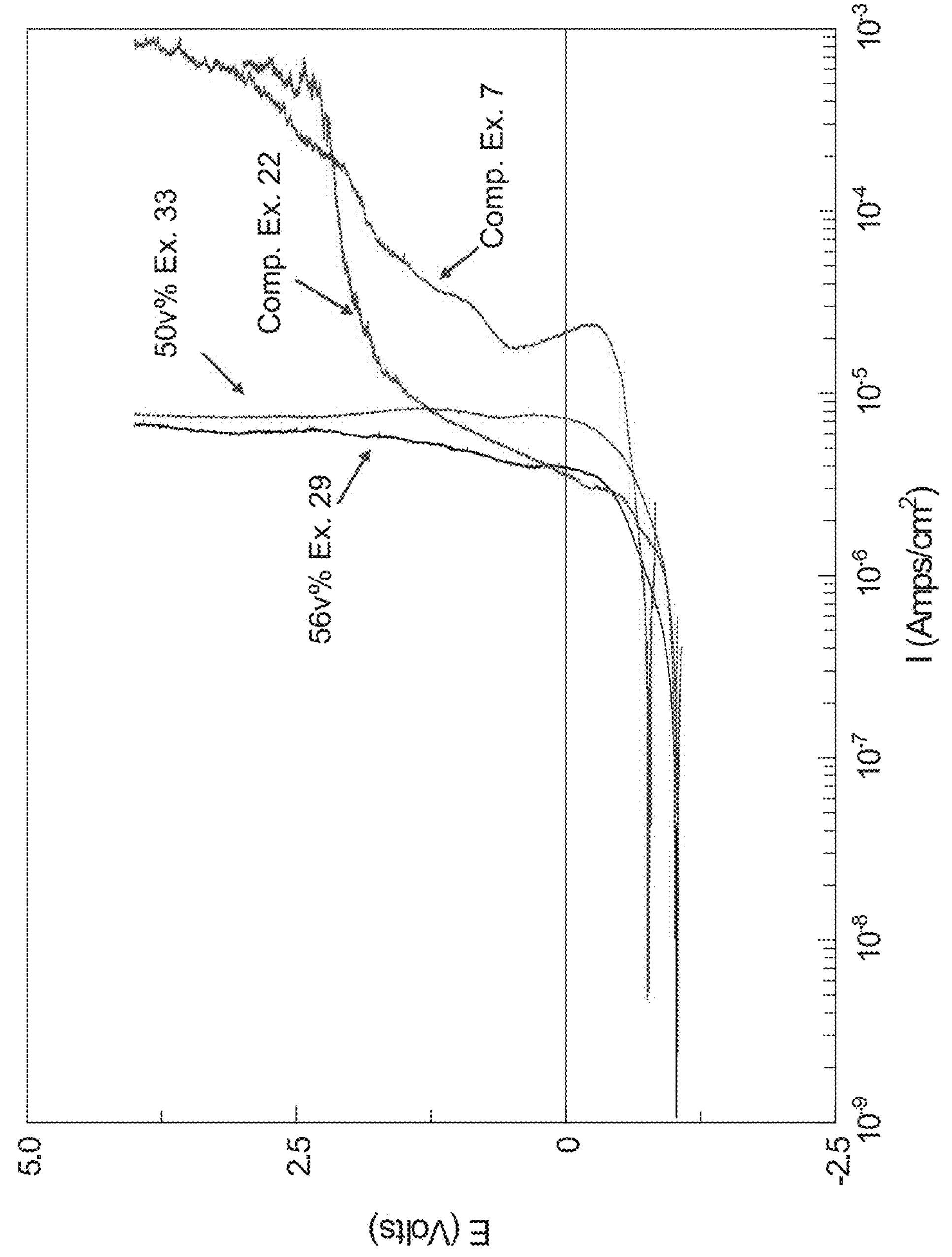

FIG. 6 shows the anodic polarization curve measurements obtained on a CAB heat exchanger surfaces covered by potassium fluoroaluminate flux residue using heat transfer fluid compositions described in Table 11 below, with a scan rate of 1 mV/see using AgAgCl in 3M NaCl solution as a reference electrode.

DESCRIPTION

According to one embodiment, a low electrical conductivity or electrically non-conductive heat transfer fluid, whether provided in the form of a concentrate or in the form of a prediluted ready-to-use heat transfer fluid, has an electrical conductivity less than about 500 μS/cm and may have a conductivity from about 1 μS/cm to about 500 μS/cm or from about 1 μS/cm to about 250 μS/cm or from about 1 μS/cm to about 100 μS/cm.

In some instances, the low electrical conductivity or electrically non-conductive heat transfer fluid comprises one or more freeze point depressing agents, de-ionized water, one or more neutral phosphate esters such as tris(2-butoxyethyl) phosphate or other trialkoxyalkyl phosphates, or trialkyl phosphate, and/or one or more neutral alkyl phosphonocarboxylates or alkoxyl phosphonocarboxylates, and other optional components that include but may not be limited to one or more azole compounds, polyethylene glycols, polypropylene glycols, sorbitan carboxylates where the carboxylates are $C_6$ to $C_{10}$ aliphatic carboxylates, triethanolamine, electrically non-conductive or low electrical conductivity antifoams, electrically non-conductive or low electrical conductivity colorants or dyes, other heat transfer fluid additives such as surfactants, dispersants, scale inhibitors, biocides, corrosion inhibitors, wetting agents, viscosity modifiers, and/or oxygen scavengers so long as these optional components do not increase the conductivity of the resulting fluids beyond the above-described conductivity limits.

In other embodiments, the low electrical conductivity or electrically non-conductive heat transfer fluid comprises of one or more freeze point depressing agents, water, one or more neutral phosphate esters, one or more neutral alkyl phosphonocarboxylates or alkoxyl phosphonocarboxylates, one or more alkaline earth metal cations, and one or more optional components selected from azole compounds such as benzotriazole, tolyltriazole, alkyl benzotriazole, tetrahydrobenzotriazole, and tetrahydrotolyltriazole, polyalkaline glycols, such as polyethylene glycols, and polypropylene glycols, sorbitan carboxylates, amine compounds such as ethanolamine, diethanolamine, triethanolamine, morpholine, cyclohexylamine, dicyclohexylamine, low electrical conductivity corrosion inhibitors, surfactants, electrically non-conductive or low electrical conductivity antifoams, electrically non-conductive or low electrical conductivity colorants or dyes, and other coolant additives.

In some embodiments, the low electrical conductivity or electrically non-conductive heat transfer fluid consists essentially of about 25 wt % to about 99.5 wt % of a freeze point depressing agent or a combination of freeze point depressing agents, about 0.05 wt % to about 80 wt % de-ionized water, one or more neutral phosphate esters, one or more neutral alkyl phosphonocarboxylates or alkoxyl phosphonocarboxylates, one or more polyethylene glycols, one or more polypropylene glycols, one or more azole compounds, and other optional components that may include but may not be limited to sorbitan carboxylates, electrically non-conductive or low electrical conductivity antifoams, electrically non-conductive or low electrical conductivity colorants or dyes, and/or non-ionic surfactants. The low electrical conductivity or electrically non-conductive heat transfer fluid has an electrical conductivity less than about 500 μS/cm and may have a conductivity from about 1 μS/cm to about 500 μS/cm or from about 1 μS/cm to about 250 μS/cm or from about 1 μS/cm to about 100 μS/cm In still other embodiments, the low electrical conductivity or electrically non-conductive heat transfer fluid consists of one or more freeze point depressing agents, de-ionized or low electrical conductivity water, one or more neutral phosphate esters, one or more neutral alkyl phosphonocarboxylates or alkoxyl phosphonocarboxylates, one or more alkaline earth metal carboxylates, one or more polyethylene glycols, one or more polypropylene glycols, one or more azole compounds, and other optional components selecting from sorbitan carboxylates, electrically non-conductive or low electrical conductivity antifoams, electrically non-conductive or low electrical conductivity colorants or dyes, and/or non-ionic surfactants.

Conductivity

As noted above the heat transfer fluid (whether provided as a concentrate or as a prediluted ready-to-use heat transfer fluid) should possess a low electrical conductivity. In that regard, in some embodiments, the conductivity of such heat transfer fluid should be no more than 500 μS/cm. In some instances, the conductivity should be less than 100 μS/cm, less than 50 μS/cm, or less than 10 μS/cm. In some embodiments, the conductivity of a heat transfer fluid concentrate and a ready-to-use heat transfer fluid derived from the heat transfer fluid concentrates (e.g., by dilution with water) in accordance with the present teachings may be one of several different values or fall within one of several different ranges. For example, it is within the scope of the present teachings for a heat transfer fluid concentrate or a ready-to-use heat transfer fluid derived therefrom to have a conductivity that is less than or equal to one of the following values: about 90 μS/cm, 89 μS/cm, 88 μS/cm, 87 μS/cm, 86 μS/cm, 85 μS/cm, 84 μS/cm, 83 μS/cm, 82 μS/cm, 81 μS/cm, 80 μS/cm, 79 μS/cm, 78 μS/cm, 77 μS/cm, 76 μS/cm, 75 μS/cm, 74 μS/cm, 73 μS/cm, 72 μS/cm, 71 μS/cm, 70 μS/cm, 69 μS/cm, 68 μS/cm, 67 μS/cm, 66 μS/cm, 65 μS/cm, 64 μS/cm, 63 μS/cm, 62 μS/cm, 61 μS/cm, 60 μS/cm, 59 μS/cm, 58 μS/cm, 57 μS/cm, 56 μS/cm, 55 μS/cm, 54 μS/cm, 53 μS/cm, 52 μS/cm, 51 μS/cm, 50 μS/cm, 49 μS/cm, 48 μS/cm, 47 μS/cm, 46 μS/cm, 45 μS/cm, 44 μS/cm, 43 μS/cm, 42 μS/cm, 41 μS/cm, 40 μS/cm, 39 μS/cm, 38 μS/cm, 37 μS/cm, 36 μS/cm, 35 μS/cm, 34 μS/cm, 33 μS/cm, 32 μS/cm, 31 μS/cm, 30 μS/cm, 29 μS/cm, 28 μS/cm, 27 μS/cm, 26 μS/cm, 25 μS/cm, 24 μS/cm, 23 μS/cm, 22 μS/cm, 21 μS/cm, 20 μS/cm, 19 μS/cm, 18 μS/cm, 17 μS/cm, 16 μS/cm, 15 μS/cm, 14 μS/cm, 13 μS/cm, 12 μS/cm, 11 μS/cm, 10 μS/cm, 9 μS/cm, 8 μS/cm, 7 μS/cm, 6 μS/cm, or 5 μS/cm.

It is also within the scope of the present teachings for the conductivity of a heat transfer fluid concentrate or a ready-to-use heat transfer fluid derived therefrom to fall within one of many ranges. In a first set of ranges, the conductivity of a heat transfer fluid concentrate and/or a ready-to-use heat transfer fluid derived therefrom is in one of the following ranges: about 1 μS/cm to 99 μS/cm, 2 μS/cm to 98 μS/cm, 3 μS/cm to 97 μS/cm, 4 μS/cm to 96 μS/cm, 5 μS/cm to 95 μS/cm, 6 μS/cm to 94 μS/cm, 7 μS/cm to 93 μS/cm, 8 μS/cm to 92 μS/cm, 9 μS/cm to 91 μS/cm, 10 μS/cm to 90 μS/cm, 11 μS/cm to 89 μS/cm, 12 μS/cm to 88 μS/cm, 13 μS/cm to 87 μS/cm, 14 μS/cm to 86 μS/cm, 15 μS/cm to 85 μS/cm, 16 μS/cm to 84 μS/cm, 17 μS/cm to 83 μS/cm, 18 μS/cm to 82 μS/cm, 19 μS/cm to 81 μS/cm, 20 μS/cm to 80 μS/cm, 21 μS/cm to 79 μS/cm, 22 μS/cm to 78 μS/cm, 23 μS/cm to 77 μS/cm, 24 μS/cm to 76 μS/cm, 25 μS/cm to 75 μS/cm, 26 μS/cm to 74 μS/cm, 27 μS/cm to 73 μS/cm, 28 μS/cm to 72 μS/cm, 29 μS/cm to 71 μS/cm, 30 μS/cm to 70 μS/cm, 31 μS/cm to 69 μS/cm, 32 μS/cm to 68 μS/cm, 33 μS/cm to 67 μS/cm, 34 μS/cm to 66 μS/cm, 35 μS/cm to 65 μS/cm, 36 μS/cm to 64 μS/cm, 37 μS/cm to 63 μS/cm, 38 μS/cm to 62 μS/cm, 39 μS/cm to 61 μS/cm, 40 μS/cm to 60 μS/cm, 41 μS/cm to 59 μS/cm, 42 μS/cm to 58 μS/cm, 43 μS/cm to 57 μS/cm, 44 μS/cm to 56 μS/cm, 45 μS/cm to 55 μS/cm, 46 μS/cm to 54 μS/cm, 47 μS/cm to 53 μS/cm, 48 μS/cm to 52 μS/cm, or 49 μS/cm to 51 μS/cm. In a second set of ranges, the conductivity of a heat transfer fluid concentrate and/or a ready-to-use heat transfer fluid derived therefrom is in one of the following ranges: about 1 μS/cm to 100 μS/cm, 2 μS/cm to 100 μS/cm, 3 μS/cm to 100 μS/cm, 4 μS/cm to 100 μS/cm, 5 μS/cm to 100 μS/cm, 6 μS/cm to 100 μS/cm, 7 μS/cm to 100 μS/cm, 8 μS/cm to 100 μS/cm, 9 μS/cm to 100 μS/cm, 10 μS/cm to 100 μS/cm, 11 μS/cm to 100 μS/cm, 12 μS/cm to 100 μS/cm, 13 μS/cm to 100 μS/cm, 14 μS/cm to 100 μS/cm, 15 μS/cm to 100 μS/cm, 16 μS/cm to 100 μS/cm, 17 μS/cm to 100 μS/cm, 18 μS/cm to 100 μS/cm, 19 μS/cm to 100 μS/cm, 20 μS/cm to 100 μS/cm, 21 μS/cm to 100 μS/cm, 22 μS/cm to 100 μS/cm, 23 μS/cm to 100 μS/cm, 24 μS/cm to 100 μS/cm, 25 μS/cm to 100 μS/cm, 26 μS/cm to 100 μS/cm, 27 μS/cm to 100 μS/cm, 28 μS/cm to 100 μS/cm, 29 μS/cm to 100 μS/cm, 30 μS/cm to 100 μS/cm, 31 μS/cm to 100 μS/cm, 32 μS/cm to 100 μS/cm, 33 μS/cm to 100 μS/cm, 34 μS/cm to 100 μS/cm, 35 μS/cm to 100 μS/cm, 36 μS/cm to 100 μS/cm, 37 μS/cm to 100 μS/cm, 38 μS/cm to 100 μS/cm, 39 μS/cm to 100 μS/cm, 40 μS/cm to 100 μS/cm, 41 μS/cm to 100 μS/cm, 42 μS/cm to 100 μS/cm, 43 μS/cm to 100 μS/cm, 44 μS/cm to 100 μS/cm, 45 μS/cm to 100 μS/cm, 46 μS/cm to 100 μS/cm, 47 μS/cm to 100 μS/cm, 48 μS/cm to 100 μS/cm, 49 μS/cm to 100 μS/cm, 50 μS/cm to 100 S/cm, 51 μS/cm to 100 μS/cm, 52 μS/cm to 100 μS/cm, 53 μS/cm to 100 μS/cm, 54 μS/cm to 100 μS/cm, 55 μS/cm to 100 μS/cm, 56 μS/cm to 100 μS/cm, 57 μS/cm to 100 μS/cm, 58 μS/cm to 100 μS/cm, 59 μS/cm to 100 μS/cm, 60 μS/cm to 100 μS/cm, 61 μS/cm to 100 μS/cm, 62 μS/cm to 100 μS/cm, 63 μS/cm to 100 μS/cm, 64 μS/cm to 100 μS/cm, 65 μS/cm to 100 μS/cm, 66 μS/cm to 100 μS/cm, 67 μS/cm to 100 μS/cm, 68 μS/cm to 100 μS/cm, 69 μS/cm to 100 μS/cm, 70 μS/cm to 100 μS/cm, 71 μS/cm to 100 μS/cm, 72 μS/cm to 100 μS/cm, 73 μS/cm to 100 μS/cm, 74 μS/cm to 100 μS/cm, 75 μS/cm to 100 μS/cm, 76 μS/cm to 100 μS/cm, 77 μS/cm to 100 μS/cm, 78 μS/cm to 100 μS/cm, 79 μS/cm to 100 μS/cm, 80 μS/cm to 100 μS/cm, 81 μS/cm to 100

μS/cm, 82 μS/cm to 100 μS/cm, 83 μS/cm to 100 μS/cm, 84 μS/cm to 100 μS/cm, 85 μS/cm to 100 μS/cm, 86 μS/cm to 100 μS/cm, 87 μS/cm to 100 μS/cm, 88 μS/cm to 100 μS/cm, 89 μS/cm to 100 μS/cm, 90 μS/cm to 100 μS/cm, 91 μS/cm to 100 μS/cm, 92 μS/cm to 100 μS/cm, 93 μS/cm to 100 μS/cm, 94 μS/cm to 100 μS/cm, 95 μS/cm to 100 μS/cm, 96 μS/cm to 100 μS/cm, 97 μS/cm to 100 μS/cm, 98 μS/cm to 100 μS/cm, or 99 μS/cm to 100 μS/cm. In a third set of ranges, the conductivity of a heat transfer fluid concentrate and/or a ready-to-use heat transfer fluid derived therefrom is in one of the following ranges: 1 μS/cm to 99 μS/cm, 1 μS/cm to 98 μS/cm, 1 μS/cm to 97 μS/cm, 1 μS/cm to 96 μS/cm, 1 μS/cm to 95 μS/cm, 1 μS/cm to 94 μS/cm, 1 μS/cm to 93 μS/cm, 1 μS/cm to 92 μS/cm, 1 μS/cm to 91 μS/cm, 1 μS/cm to 90 μS/cm, 1 μS/cm to 89 μS/cm, 1 μS/cm to 88 μS/cm, 1 μS/cm to 87 μS/cm, 1 μS/cm to 86 μS/cm, 1 μS/cm to 85 μS/cm, 1 μS/cm to 84 μS/cm, 1 μS/cm to 83 μS/cm, 1 μS/cm to 82 μS/cm, 1 μS/cm to 81 μS/cm, 1 μS/cm to 80 μS/cm, 1 μS/cm to 79 μS/cm, 1 μS/cm to 78 μS/cm, 1 μS/cm to 77 μS/cm, 1 μS/cm to 76 μS/cm, 1 μS/cm to 75 μS/cm, 1 μS/cm to 74 μS/cm, 1 μS/cm to 73 μS/cm, 1 μS/cm to 72 μS/cm, 1 μS/cm to 71 μS/cm, 1 μS/cm to 70 μS/cm, 1 μS/cm to 69 μS/cm, 1 μS/cm to 68 μS/cm, 1 μS/cm to 67 μS/cm, 1 μS/cm to 66 μS/cm, 1 μS/cm to 65 μS/cm, 1 μS/cm to 64 μS/cm, 1 μS/cm to 63 μS/cm, 1 μS/cm to 62 μS/cm, 1 μS/cm to 61 μS/cm, 1 μS/cm to 60 μS/cm, 1 μS/cm to 59 μS/cm, 1 μS/cm to 58 μS/cm, 1 μS/cm to 57 μS/cm, 1 μS/cm to 56 μS/cm, 1 μS/cm to 55 μS/cm, 1 μS/cm to 54 μS/cm, 1 μS/cm to 53 μS/cm, 1 μS/cm to 52 μS/cm, 1 μS/cm to 51 μS/cm, 1 μS/cm to 50 μS/cm, 1 μS/cm to 49 μS/cm, 1 μS/cm to 48 μS/cm, 1 μS/cm to 47 μS/cm, 1 μS/cm to 46 μS/cm, 1 μS/cm to 45 μS/cm, 1 μS/cm to 44 μS/cm, 1 μS/cm to 43 μS/cm, 1 μS/cm to 42 μS/cm, 1 μS/cm to 41 μS/cm, 1 μS/cm to 40 μS/cm, 1 μS/cm to 39 μS/cm, 1 μS/cm to 38 μS/cm, 1 μS/cm to 37 μS/cm, 1 μS/cm to 36 μS/cm, 1 μS/cm to 35 μS/cm, 1 μS/cm to 34 μS/cm, 1 μS/cm to 33 μS/cm, 1 μS/cm to 32 μS/cm, 1 μS/cm to 31 μS/cm, 1 μS/cm to 30 μS/cm, 1 μS/cm to 29 μS/cm, 1 μS/cm to 28 μS/cm, 1 μS/cm to 27 μS/cm, 1 μS/cm to 26 μS/cm, 1 μS/cm to 25 μS/cm, 1 μS/cm to 24 μS/cm, 1 μS/cm to 23 μS/cm, 1 μS/cm to 22 μS/cm, 1 μS/cm to 21 μS/cm, 1 μS/cm to 20 μS/cm, 1 μS/cm to 19 μS/cm, 1 μS/cm to 18 μS/cm, 1 μS/cm to 17 μS/cm, 1 μS/cm to 16 μS/cm, 1 μS/cm to 15 μS/cm, 1 μS/cm to 14 μS/cm, 1 μS/cm to 13 μS/cm, 1 μS/cm to 12 μS/cm, 1 μS/cm to 11 μS/cm, 1 μS/cm to 10 μS/cm, 1 μS/cm to 9 μS/cm, 1 μS/cm to 8 μS/cm, 1 μS/cm to 7 μS/cm, 1 μS/cm to 6 μS/cm, or 1 μS/cm to 5 μS/cm.

In some embodiments, during vehicle operation, pre-treated ion exchange resins may be used to keep the conductivity of the coolant within low levels, for example, within the levels noted above, while preventing the depletion of corrosion inhibitor from the heat transfer fluid and maintaining the color identification of the fluid.

Freezing Point Depressing Agent

The freezing point depressing agent suitable for use includes an alcohol or mixture of alcohols, such as monohydric or polyhydric alcohols and mixtures thereof. The alcohol may be selected from the group consisting of methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerine, glycerol-1,2-dimethyl ether, glycerol-1,3-dimethyl ether, monoethylether of glycerol, sorbitol, 1,2,6-hexanetriol, trimethylopropane, alkoxy alkanols such as methoxyethanol and mixtures thereof. It is contemplated that in some embodiments, the freezing point depressing agent may include one or more of the described alcohols such that the composition is free of or excludes other of the one or more of the described alcohols.

The freezing point depressing agent may be present in an amount from about 10% to 99.9% by weight or from about 15%, 20%, 30%, 40%, 50%, 55%, 60%, 65%, 70%, 75%, 80%, 85%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or about 99.9%. In some instances, the freezing point depressing agent may be present in a range where the lower limit may be from any one of about 15%, 20%, 30%, 40%, 50%, 55%, 60%, 65%, 70%, 75%, 80%, 85%, while the upper limit may be from anyone of about 90%, 91%, 92%, 93%, 94%, 95%, 96%, 97%, 98%, 99%, 99.1%, 99.2%, 99.3%, 99.4%, 99.5%, 99.6%, 99.7%, 99.8%, or about 99.9%.

Water

The water suitable for use in the described heat transfer fluids will have a low electrical conductivity, such as equal to or less than 5 μS/cm. in this regard, the heat transfer fluid may be provided by deionized water or de-mineralized water with low electrical conductivity, i.e., an electrical conductivity equal to or less than 5 μS/cm. In some instances, the water will have an electrical conductivity from about 0.01 μS/cm to 5 μS/cm or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.6, 4.8, 4.9, or about 5 μS/cm, or within any range that can be formed from the preceding values.

The water may be present in the heat transfer composition in an amount from about 0.1% to about 90% by weight, or from about 0.5% to 70%, or in an amount of about 1% to about 60% by weight. In some instances, the water is present in an amount from about 0.1%, 0.2%, 0.3%, 0.4%, 0.5%, 0.6%, 0.7%, 0.8%, 0.9%, 1%, 5%, 10%, 15%, 20%, 25%, 30%, 35%, 40%, 45%, 50%, 55%, 60%, 65%, 70%, 75%, 80%, 85%, 90%, 91%, 92%, 93%, 94%, 95%, or within any range that can be formed from the preceding values. The skilled artisan will appreciate that when the described heat transfer fluids are formulated as a concentrate the amount of water present will be significantly less than when formulated as a prediluted ready-to-use heat transfer fluid.

Corrosion Inhibitor Ingredients and Compositions

As pointed out above, fuel cell coolant systems have many metallic components for which corrosion inhibition is desired. At the same time, suitable corrosion inhibitors and compositions should possess a sufficiently low conductivity so that the conductivity of the described heat transfer fluid is within the described limits. To this end, the skilled artisan will appreciate that corrosion inhibitors that are electrically non-conductive or have low electrical conductivity may be useful in the described heat transfer fluids. Moreover, corrosion inhibitors that are conductive, i.e., possess either a positive (e.g., an acid) or negative charge (e.g., a base) may be provided at suitable concentrations so that the conductivity of the described heat transfer fluid is within the described limits. Additionally, or alternatively, corrosion inhibitors that are conductive, may be provided as an inhibitor composition containing two or more compounds such that inhibitor composition has a generally neutral pH and/or is electrically non-conductive or has a low electrical conductivity.

Suitable electrically non-conductive or low electrical conductivity corrosion inhibitors may include one or more neutral phosphate esters such as tris(2-butoxyethyl) phosphate, trialkoxyalkyl phosphates, trialkyl phosphates and mixtures thereof. one or more azole compounds, such as benzotriazole, tetrahydro tolyltriazole and tolyltriazole or mixtures thereof.

Other suitable neutral phospho-compounds that can be used with or without the above one or more neutral phosphate esters include, but are not limited to, neutral alkyl or alkoxyl phosphonocarboxylates in which the alkyl or alkoxy group may contain 1 to 5 carbon. Exemplary compounds include, but are not limited to, triethyl phosphonoformate, triethyl phosphonoacetate, trimethyl phosphonoactate, methyl diethylphosphonacetate, triethyl 2-phosphonopriopionate, triethyl-3-phosphonopropionate, trimethyl-3-phosphonopropionate, and mixtures thereof.

In general, one or more electrically non-conductive or low electrical conductivity corrosion inhibitors may be present in the heat transfer fluids in amounts from about 0.01% to about 10%, or about 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 3.0%, 4.0%, 5.0%, 6.0%, 7.0%, 8.0%, 9.0%, about 10.0%, or within any range that can be formed from the preceding values.

In some instances, the corrosion inhibitor compositions for use in the heat transfer (or thermal management system) fluids may contain one or more low concentrations of a soluble alkaline earth metal (selected from calcium, magnesium, or strontium) or zinc compound, or a mixture thereof. The soluble alkaline earth metal or zinc compound may include the oxides, hydroxides, nitrates, nitrites, or other soluble metal salts, or a mixture thereof. The low concentrations of such compounds may provide optimal corrosion protection performance for ferrous and aluminum alloys in the cooling systems or thermal management systems. The term "soluble" means that the compound is soluble in the freezing point-depressing agent/water heat transfer fluids at the level being used in the fluids, both in the fluid concentrate form or in the ready-to-use/prediluted with water form, and that the compound is able to ionize to generate the corresponding metal ion in the heat transfer fluid concentrate and/or ready-to-use (prediluted with deionized water) fluids.

Alternatively, the alkaline earth metal (Ca, Mg, Sr) or lithium oxides and hydroxides may be provided in combination with an acid to reduce the electrical conductivity of the mixture of the alkaline earth metal (Ca, Mg, Sr) or lithium oxides and hydroxides and acid. The skilled artisan would appreciate the suitable acids and an example of such includes, but is not limited to benzoic acid.

Other soluble alkaline earth or alkali metal compounds may include a calcium, magnesium, lithium salt formed between respective calcium, magnesium, lithium ions and a phosphonate or a phosphinate, such as calcium-PBTC salts (where PBTC is 2-phosphonobutane-1,2,4-tricarboxylic acid), calcium-HEDP salts (where HEDP is 1-hydroxethane-1,1-diphosphonic acid), calcium-HPA salts (where HPA is hydroxyphosphono-acetic acid or 2-hydroxy phosphono acetic acid), calcium phosphonosuccinic acid salts, calcium-PSO salts (where PSO is mono-, bis- and oligomeric phosphinosuccinic acid adduct mixtures, and/or the like, and combinations thereof.

The soluble alkaline earth metal (selected from calcium, magnesium, or strontium) or zinc compound, or a mixtures thereof may be present in the heat transfer fluids in low concentrations. For example, when included in the heat transfer fluids, the soluble alkaline earth metals may be present in amounts from about 0.001 wt. % to about 0.15 wt. %, or from 0.01 wt. % to about 0.05 wt. %, or within any range that can be formed from the preceding values.

Other optional corrosion inhibitors suitable for use in corrosion inhibitor compositions and thus the described heat transfer fluids may include siloxane based compounds. Exemplary suitable siloxane based compounds include Silwet siloxane surfactants from Momentive Performance Materials Inc. (Niskayuna, NY 12309) or other suppliers, such as Silwet L-77, Silwet L-7657, Silwet L-7650 Silwet L-7608, Silwet L-7210 and Silwet L-7220, as well other Silwet surfactants or other similar siloxane-polyether copolymers available from Dow Corning or other suppliers.

Other suitable siloxane compounds include non-conductive or nearly non-conductive organosilane-based compounds comprising one or more silicon-carbon bonds (i.e., compounds that are capable of hydrolyzing in the presence of water to form silanols (i.e., compounds with one or more Si—OH groups)), such as alkoxysilanes, e.g., Formasil 891, Formasil 593, Formasil 433, Silquest® Y-5560 silane (i.e., polyalkyleneoxidealkoxysilane), Silquest® A-186 [2-(3,4-epoxycyclohexyl)ethyltrimethoxysilane], Silquest® A-187 (3-glycidoxypropyltrimethoxysilane), 3-aminopropyltriethoxysilane, N-2-(aminoethyl)-3-aminopropyltrimethoxysilane, octyltriethoxysilane, vinyltriethoxylsilane, vinyltrimethoxylsilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, or other Silquest surfactants available from GE Silicones/OSI Specialties/Momentive Performance Materials or other suppliers. It is also contemplated that the heat transfer fluids may be free of siloxane based compounds including the specifically above-described compounds.

The siloxane based compounds and mixtures thereof may be present in the heat transfer fluid in an amount of from about 0.01% to about 10% by weight, and in some instances from about 0.02%, 0.03%, 0.04%, 0.05%, 0.06%, 0.07%, 0.08%, 0.09%, 1%, 2%, 3%, 4%, 5%, 6%, 7%, 8%, or about 9% or within any range that can be formed from the preceding values such as but not limited about 0.02% to about 2%.

In some embodiments, the corrosion inhibitor composition and thus the heat transfer fluid may include corrosion inhibitors for copper and copper alloys. Exemplary, but not limiting suitable copper and copper corrosion inhibitors include compounds containing 5- or 6-member heterocyclic ring as the active functional group, wherein the heterocyclic ring contains at least one nitrogen atom, for example, an azole compound. Particularly, benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles, tetrahydrotolyltriazole, and mixtures thereof can be used as copper and copper alloy corrosion inhibitors. It is also contemplated that the heat transfer fluids may be free of azole compounds including the specifically above-described compounds.

When present, the copper and copper alloy corrosion inhibitors may be present in the heat transfer fluid composition in an amount of about 0.01 to about 4% by weight. In some instances, the copper and copper alloy corrosion inhibitors may be present in an amount from about 0.02%, 0.03%, 0.04%, 0.05%, 0.06%, 0.07%, 0.08%, 0.09%, 1%, 2%, or about 3% or within any range that can be formed from the preceding values.

In some embodiments, the corrosion inhibitor composition and thus the heat transfer fluid (or thermal management system fluid) may include one or more optional corrosion inhibitors selected from polyethylene glycols, polypropylene glycols, sorbitan carboxylates where the carboxylates are $C_6$ to $C_{10}$ aliphatic carboxylates (such as sorbitan caprylate or sorbitan monooctanoate, sorbitan monoheptanoate, sorbitan monohexanoate, sorbitan monononanoate, sorbitan monodecanoate), triethanolamine, other amines, and mixtures thereof. It is also contemplated that the heat transfer fluid (or thermal management system fluid) may be free of these described optional corrosion inhibitors.

When present, the above optional corrosion inhibitors may be present in amounts ranging from about 0.05 wt. % to about 4.0 wt. %.

In some embodiments, the corrosion inhibitor composition and thus the heat transfer fluid may include non-ionic surfactants as corrosion inhibitors. Representative non-ionic surfactants suitable for use according to the present teachings include fatty acid esters, such as sorbitan fatty acid esters, alkoxylated alcohols, polyalkylene glycols, polyalkylene glycol esters, copolymers of ethylene oxide (EO) and propylene oxide (PO), polyoxyalkylene derivatives of a sorbitan fatty acid ester, and mixtures thereof. While neither desiring to be bound by any particular theory nor intending to limit in any measure the scope of the appended claims or their equivalents, it is presently believed that an alkoxylated alcohol used in accordance with the present teachings may remain in solution in a heat transfer fluid under operating conditions without being consumed or degraded, thus resulting in robust anti-foam properties for the heat transfer fluid. In some embodiments, the average molecular weight of the additional non-ionic surfactant for optional use in accordance with the present teachings is between about 55 and about 300,000 and, in some embodiments, between about 110 and about 10,000. It is also contemplated that any of the noted non-ionic surfactants including those specifically described below may be excluded from the heat transfer compositions, i.e., the heat transfer fluids are free of the noted non-ionic surfactants.

Representative sorbitan fatty acid esters include $C_5$ and $C_{10}$ aliphatic carboxylate, such as sorbitan caprylate or sorbitan monooctanoate, sorbitan monoheptanoate, sorbitan monohexanoate, sorbitan monononanoate. Suitable sorbitan fatty acid esters may also include sorbitan monolaurate (e.g., sold under tradename Span® 20, Arlacel® 20, S-MAZ® 20M1), sorbitan monopalmitate (e.g., Span® 40 or Arlacel® 40), sorbitan monostearate (e.g., Span®) 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90).

Representative alkoxylated alcohols suitable for optional use as an additional non-ionic surfactant in accordance with the present teachings include but are not limited to ethoxylated alcohols, propoxylated alcohols, and/or the like, and combinations thereof.

In some embodiments, the ethoxylated alcohol for optional use in accordance with the present teachings may be represented by the following formula:

$$RO(CH_2CH_2O)_nH \quad (I)$$

where R is the linear primary alcohol and n is the total number of moles of ethylene oxide.

In other embodiments, the propoxylated alcohol for optional use in accordance with the present teachings use may be represented by the following formula:

$$RO(CH_2CH_2CH_2O)_mH \quad (II)$$

where R is the linear primary alcohol and m is the total number of moles of propylene oxide.

In still other embodiments, alkoxylated alcohols for optional use in accordance with the present teachings may be represented by the following formula:

$$RO(CH_2CH_2O)_j(CH_2CH_2CH_2O)_kH \quad (III)$$

where R is the linear primary alcohol, j is the total number of moles of ethylene oxide and k is the total number of moles of propylene oxide.

In some embodiments, in each of formulas (I) to (III), the linear primary alcohol may contain 4 to 25 carbon atoms, or 6 to 15 carbon atoms, or 7 to 12 carbon atoms. Further, “n” and “m” are an integer having a value between 1 and 15 (inclusive). The values of j and k are integers between 0 and 15 (inclusive) and j+k is greater or equal to 1.

Representative commercially available alkoxylated alcohols can be obtained from many suppliers, e.g., The Dow Chemical Company (Midland, MI), BASF Corporation (Mount Olive, NJ or Florham Park, NJ), and Tomah Products, Inc. (Milton, WI). Examples of the alkoxylated alcohol products suitable for optional use as an additional non-ionic surfactant in accordance with the present teachings include TRITON™ EF-19 surfactant (>98% Alcohols, $C_8$-$C_{10}$, ethoxylated propoxylated. CAS #88603-25-8) available from Dow Chemical Co., MACOL® LF 110 surfactant (alkoxylated alcohol) and Plurafac* SLF 18 (100% Alcohols, $C_6$-$C_{10}$, ethoxylated propoxylated. CAS number: 68987-81-5). Other alkoxylated alcohols suitable for use available from TOMAH Products, Inc. are shown in FIG. 1. Additional examples of the alkoxylated alcohol products suitable for optional use as an additional non-ionic surfactant in accordance with the present teachings may include Plurafac® LF type low-foam nonionic surfactants available from BASF. The Plurafac® LF type surfactants consist of alkoxylated, predominantly unbranched fatty alcohols, and they contain higher alkene oxides alongside ethylene oxide. The Plurafac® LF type surfactants suitable for optional use may include Plurafac® LF 120, Plurafac® LF 131, Plurafac® LF 132, Plurafac® LF 220, Plurafac® LF 221, Plurafac® LF 223, Plurafac® LF 224, Plurafac® LF 231, Plurafac® LF 300, Plurafac® LF 301, Plurafac® LF 303, Plurafac® LF 305, Plurafac® LF 400, Plurafac® LF 401, Plurafac® LF 403, Plurafac® LF 404, Plurafac® LF 405, Plurafac® LF 431, Plurafac® LF 500, Plurafac® LF 600, Plurafac® LF 711, Plurafac® LF 7319, Plurafac® LF 900, Plurafac® LF 901, Plurafac® LF 1300, and Plurafac® LF 1433.

Suitable polyalkylene glycols include polyethylene glycols, polypropylene glycols, and mixtures thereof. Examples of polyethylene glycols suitable for use include CARBOWAX™ polyethylene glycols and methoxypolyethylene glycols from Dow Chemical Company, (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Suitable polyalkylene glycol esters include mono- and di-esters of various fatty acids, such as MAPEG® polyethylene glycol esters from BASF (e.g., MAPEG® 200 ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Suitable copolymers of ethylene oxide (EO) and propylene oxide (PO) include various Pluronic and Pluronic R block copolymer surfactants from BASF, DOWFAX non-ionic surfactants, UCON™ fluids and SYNALOX lubricants from DOW Chemical. Suitable polyoxyalkylene derivatives of a sorbitan fatty acid ester include polyoxyethylene 20 sorbitan monolaurate (e.g., products sold under trademarks TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitan monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K) and the like.

Representative copolymers of ethylene oxide (EO) and propylene oxide (PO) for optional use as an additional non-ionic surfactant in accordance with the present teachings include but are not limited to various Pluronic and Pluronic R block copolymer surfactants from BASF, DOWFAX non-ionic surfactants, UCON™ fluids and SYNALOX lubricants from DOW Chemical, and/or the like, and combinations thereof.

Representative polyoxyalkylene derivatives of a sorbitan fatty acid ester for optional use as an additional non-ionic surfactant in accordance with the present teachings include but are not limited to polyoxyethylene 20 sorbitan monolaurate (e.g., products sold under the tradenames TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitan monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K), and/or the like, and combinations thereof.

For embodiments of a heat transfer concentrate in which one or more additional non-ionic surfactants are present, the concentration of each of the one or more additional non-ionic surfactants may vary depending on the application. In some embodiments, each of the one or more additional non-ionic surfactants may be present in the composition in an amount of about 1 ppm to about 3 wt. % based on a total weight of the heat transfer fluid concentrate or from about 5 ppm to about 1.5%, or from about 10 ppm to about 1 wt. % based on a total weight of the heat transfer fluid concentrate. Within this range, the one or more additional non-ionic surfactants may be present in an amount less than or equal to about 0.9 wt. %, in some embodiments less than or equal to about 0.8 wt. %, in some embodiments less than or equal to about 0.7 wt. %, in some embodiments less than or equal to about 0.6 wt. %, and in some embodiments less than or equal to about 0.5 wt. % based on a total weight of the heat transfer fluid concentrate.

As noted above, it may be useful to provide a corrosion inhibitor composition that, in some instances, may include one or more organic acids and one or more organic bases such that the inhibitor composition has a generally neutral pH and/or is electrically non-conductive or has a low electrical conductivity.

With the above in mind, the corrosion inhibitor composition may include one or more of the following organic bases in combination with organic acids to provide neutral or near neutral pH compositions.

Organic bases suitable for use in the low electrical conductivity heat transfer fluid disclosed in the instant application are compounds that would yield a pH higher than 7 when dissolved in de-ionized water, i.e., yielding a pH of greater than 7.0 at room temperature. Generally, one or more organic base components are used in the low electrical heat transfer fluid disclosed in the instant application to increase the reserve alkalinity (determined per ASTM D1121) of the fluid. The $pK_b$ of the organic base (B) suitable for use in water is less than 7.0 at 25° C. The $pK_a$ of the corresponding conjugate acid ($BH^+$) is greater than 7.0 in water at room temperature.

The organic base may be used to neutralize acidic components such as carboxylic acids, phosphonic acids, phosphinic acids, and acidic non-neutral phosphate esters that may be included in the low electrical conductivity heat transfer fluids in the heat transfer fluid so that the resulting electrical conductivity will be maintained at a low level, i.e., within the described parameters. In some instances, one or more organic bases may be included in the low electrical conductivity heat transfer fluid to increase the reserve alkalinity level and to maintain the pH of the ready-to-use heat transfer fluid at the desired level, even in the absence of the acidic components in the fresh heat transfer fluid composition.

With the above in mind, in some embodiments, the representative organic base suitable for use in the instant application may include mono-, di-, and tri-alkanolamines (or hydroxyalkylamines) that contains 2 to 18 carbon atoms, such as ethanolamine, propanolamine, butanolamine (or 4-hydroxybutylamine), isobutanolamine (i.e., 2-amino,2-methyl, 1-propanol), diethanolamine, triethanolamine, mono-, di-, and tri-isopropanolamine, octyldiethanolamine, diethylethanolamine, dimethylisopropanolamine, and 5-aminopentanol. In some embodiments, the organic base suitable for use may include heterocyclic compounds, such as pyrrolidine, morpholine, imidazole, benzimidazole, 1,2,3-triazole, imidazoline, imidazolidine, and piperidine. In some embodiments, the representative organic base suitable for use may include aliphatic, cycloaliphathic or aromatic amines having 2 to 18 carbon atoms. In some embodiments, the representative organic base suitable for use may include amino acids, such as histidine, lysine, and arginine.

Other exemplary organic bases include amine salts of cyclohexenoic carboxylate compounds derived from tall oil fatty acids; Amine compounds, such as mono-, di- and triethanolamine, morpholine, benzylamine, cyclohexylamine, dicyclohexylamine, hexylamine, AMP (or 2-amino-2-methyl-1-propanol or isobutanolamine), DEAE (or diethylethanolamine), DEHA (or diethylhydroxylamine), DMAE (or 2-dimethylaminoethanol), DMAP (or dimethylamino-2-propanol), and MOPA (or 3-methoxypropylamine), triethanolamine, triisopropanolamine, and other amines. Other suitable amine compounds include, but are not limited, to ethanolamine, diethanolamine, morpholine, benzylamine, cyclohexylamine, dicyclohexylamine, hexylamine, AMP (2-amino-2-methyl-1-propanol or isobutanolamine), DEAE (diethylethanolamine), DEHA (diethylhydroxylamine), DMAE (2-dimethylaminoethanol), DMAP 65 (dimethyl-amino-2-propanol), MOPA (3-methoxypropy amine), and/or the like, and combinations thereof.

Yet other organic bases include amino acids, such as arginine, histidine, lysine. Alternatively, other organic bases include thiazoles and azoles, e.g. compounds containing 5- or 6-member heterocyclic ring as the active functional group, wherein the heterocyclic ring contains at least one nitrogen atom. Exemplary compounds include, benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles, tetrahydrotolyltriazole, and mixtures thereof.

It is also contemplated that the described heat transfer fluids exclude one or more of the organic bases such as amine compounds, amino acids, azole, and thiazole compounds including, but not limited to, those described.

Exemplary organic acids include, but are not limited to, octanoic acid, decanoic acid, non-neutral phosphate esters, phosphonates (such as 2-butane-1,2,4-tricarboxylic acid, and octylphosphonic acid) and phosphinates. Other suitable organic acids include $C_6$ to $C_{24}$ mono-, di- and tri-carboxylic acids, including aliphatic and aromatic mono-, di, and tri-carboxylic acids (both straight chains, and, in some instances, branched chains).

Yet other suitable organic acids may include organophosphates (a.k.a. phosphate esters). In some embodiments, an organophosphate for use in accordance with the present teachings has the following structure (1):

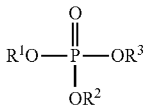

(1)

wherein $R^1$, $R^2$, and $R^3$ are each independently hydrogen, an optionally substituted heteroatom-containing alkyl, an optionally substituted heteroatom-containing alkenyl, an optionally substituted carbonyl-containing alkyl, an optionally substituted carbonyl-containing alkenyl, or an optionally substituted moiety selected from the group consisting of alkyl, alkenyl, aryl, phosphono, phosphino, alkylamino, amino, and combinations thereof. For some embodiments in which an R group of the organophosphate (i.e., $R^1$, Re, and/or $R^3$) contains one or more heteroatoms, the one or more heteroatoms may form an ether linkage (e.g., —C—O—C—), a sulfide linkage (—C—S—C—), an amino linkage (—C—N—C), or a combination thereof.

Representative organophosphates for use in accordance with the present teachings include but are not limited to ethylene glycol phosphate; 1,2,3-propanetriol phosphate (CAS #: 12040-65-2); a phosphate polyether ester; a $C_6$-$C_{12}$ alkyl alcohol ethoxylate phosphoric acid (CAS #: 68921-24-4); an alkali metal salt of phosphate ester of cresyl ethoxylate (CAS #: 66057-30-5); potassium cresyl phosphate also known as Poly(oxy-1,2-ethanediyl), α-(methylphenyl)-ω-hydroxy-, phosphate, potassium salt (CAS #: 37281-48-4); octylphenoxypolyethoxyethyl phosphate; octylphenoxy polyethyl phosphate; olyethylene glycol mono (octylphenyl) ether phosphate; alkali metal salts of alkylphenoxypolyethoxyethyl phosphoric acid having a formula R-phenyl $(CH_2CH_2O)_x$phosphate in which R is hydrogen or $C_1$-$C_{20}$ alkyl (in some embodiments, $C_1$-$C_e$) and x equals 1 to 30 (in some embodiments, 2 to 10); alkyl or aryl acid phosphates, such as isooctyl acid phosphate, 2-ethylhexyl acid phosphate, amyl acid phosphate, amyl dihydrogen phosphate, diamyl hydrogen phosphate, butyl acid phosphate, and/or the like; and combinations thereof.

In some embodiments, the organophosphate used in accordance with the present teachings may be selected from the group consisting of phosphate polyether esters or alcohol phosphate esters including but not limited to (a) Triton™ H-66, Triton™ H-55, Triton™ QS-44, and/or Triton™ XQS-20 surfactants from the Dow Chemical Company; (b) Rhodafac® H-66 or potassium salt of phosphate ester of cresyl ethoxylate (CAS no. 66057-30-5), Rhodafac H-66-E or potassium salt of aromatic ethoxylate phosphate esters, Rhodafac HA-70 or polyoxyethylene phenyl ester phosphate acid form (CAS no. 39464-70-5), Rhodafac PA 23 or ethoxylated fatty alcohol phosphate ester (CAS no. 68585-36-4), and/or Rhodafac LO/529-E or sodium salt of ethoxylated alkylphenol phosphate (CAS no. 68954-84-7) from Rhodia; (c) Cedephos FA-600 containing $C_6$-$C_e$ alkyl alcohol ethoxylate phosphoric acids (CAS. no. 68921-24-4, alt CAS no. 68130-47-2) and/or MERPOL A (alcohol phosphate) from Stepan Company; (d) Chemfac NF-100 (98% polyphosphoric acids, esters with ethylene glycol, CAS no. 68553-96-8) or ethylene glycol phosphate, Chemfac NA-350 or 1,2,3-propanetriol phosphate (CAS no. 12040-65-2, as the main component in Chemfac NA-350), Chemfac PB-106K (polyoxyethylene decyl phosphate, potassium salt, or poly(oxy-1,2-ethanediyl), alpha-isodecyl-omega-hydroxy-, phosphate, potassium salt, CAS. no. 68071-17-0), Chemfac PB-184 (POE Oleyl phosphate or poly(oxy-1,2-ethanediyl), alpha-9-octadecenyl-omega-hydroxy-(Z)-, phosphate, CAS no. 39464-69-2), Chemfac PF-636 (poly (oxy-1,2-ethanediyl), alpha-hydro-omega-hydroxy, phosphate, CAS no. 9056-42-2), Chemfac PB-264 (POE ether phosphate or poly(oxy-1,2-ethanediyl), alpha-hydro-omega-hydroxy-, mono-$C_{12}$-14-alkyl ethers, phosphates, CAS no. 68511-37-5), Chemfac NC-096 (POE (6) Nonyl Phenol phosphate, or poly(oxy-1,2-ethanediyl), alpha-(nonylphenyl)-omega-hydroxy, branched, phosphates, CAS no. 68412-53-3), Chemfac NB-041 (POE aliphatic phosphate ester), Chemfac NB-042 (POE aliphatic phosphate ester), Chemfac 126 (POE aliphatic phosphate ester), Chemfac NB-159 (POE aliphatic phosphate ester), Chemfac NC-006E (POE aliphatic phosphate ester), Chemfac NC-0910 (POE aliphatic phosphate ester), Chemfac PB-082 (POE aliphatic phosphate ester), Chemfac PB-104 (POE aliphatic phosphate ester), Chemfac PB-109, Chemfac PB-133, Chemfac PB-135, Chemfac PB-136, Chemfac PB-139, Chemfac PB-253, Chemfac PC-006, Chemfac PC-099, Chemfac PC-188, Chemfac PD-600, Chemfac PD-990, and/or Chemfac PF-623 from PCC Chemax Inc.; (e) phosphated alcohols, such as PA 100, PA 800, PA 800K, and PA 801 from Lakeland Laboratories Ltd.; (f) phosphated alcohol ethoxylates, such as PAE 802, PAE 106, PAE 126, PAE 136, PAE 147, PAE 176, PAE 185 and PAE 1780 from Lakeland Laboratories Ltd.; (g) phosphated phenol ethoxylates, such as PPE 604, PPE 604K, PPE 154, PPE 156, PPE 159 and PPE 1513 from Lakeland Laboratories Ltd.; (h) and/or the like; and (i) combinations thereof.

In some embodiments, the organophosphates for use in accordance with the present teachings include alkyl and aryl acid phosphates. Representative alkyl or aryl acid phosphates that may be used in accordance with the present teachings include but are not limited to amyl acid phosphate, n-butyl acid phosphate, methyl acid phosphate, phenyl acid phosphate, 2-ethylhexyl acid phosphate, dimethyl acid phosphate, isooctyl acid phosphate, and/or the like, and combinations thereof. Mono-alkyl/aryl acid phosphates, dialkyl/ aryl acid phosphates, or a combination thereof may be used in accordance with the present teachings.

The amount of organophosphate may vary depending on the application. By way of example, the concentration of the one or more organophosphates may range from about 0.0025 wt. % to about 10 wt. % based on the total weight of the heat transfer fluid concentrate (e.g., from about 0.005 wt. % to about 5 wt. %, from about 0.01 wt. % to about 3 wt. %, from about 0.05 wt. % to about 2 wt. %, or from about 0.05 wt. % to about 0.5 wt. %). Within this range, the amount may be greater than or equal to about 0.005 wt. %, and, in some embodiments, greater than or equal to about 0.01 wt. %. Also within this range, the amount may be less than or equal to about 1 wt. % and, in some embodiments, less than or equal to about 0.5 wt. %.

In some instances, the heat transfer ingredients and/or compositions may include phosphonates (e.g., AMP or aminotrimethylene phosphonic acid; HEDP or 1-hydroxy ethylidene-1,1-diphosphonic acid; HPA or hydroxyphosphonoacetic acid or 2-hydroxy phosphono acetic acid; PBTC or 2-butane phosphono-1,2,4-tricarboxylic acid; octylphosphonic acid, PCAM or phosphono carboxylate acid mixture; and/or Bricorr 288, which is a mixture of sodium salts of organophosphonic acid H—[CH(COONa)CH(COONa)]$_e$—$PO_3Na_2$, where n<5 and $n_{mean}$=1.4 and other phosphonates), phosphinates (e.g., PSO or phosphinic acid oligomers, which is a mixture of mono-, bis-, and oligomeric phosphinosuccinic acid adduct, and other phosphinates).

Other organic acids include carboxylic acids such as benzoic acid and/or its salts and n-alkyl monocarboxylic acids and/or their salts and other carboxylates). As used herein, the term "carboxylate" is inclusive of carboxylic acid, salts thereof, and combinations of one or more carboxylic acids and one or more carboxylic acid salts. The additional carboxylic acid salts suitable for use include alkali metal (such as lithium, sodium, and potassium, etc.) salts and alkaline earth metal (such as calcium, magnesium and strontium, etc.) salts. The additional carboxylate may include a single or multiple carboxyl groups and may be linear or branched. It is expressly contemplated that combinations of additional carboxylates may be used and such combinations are encompassed by the terms "carboxylate" and "carboxylic acid". In some embodiments, an additional carboxylate in accordance with the present teachings has from 4 to 24 carbon atoms (e.g., 6 to 24 carbon atoms). In other embodiments, an additional carboxylate in accordance with the present teachings has from 6 to 20 carbon atoms. The additional carboxylate may be aliphatic, aromatic, or a combination of both. In some embodiments, the additional carboxylic acid is a $C_6$ to $C_{20}$ mono- or di-basic aliphatic or aromatic carboxylic acid and/or an alkali metal salt thereof. In some embodiments, an additional carboxylate in accordance with the present teachings consists of carbon, hydrogen, and oxygen and is free of non-oxygen heteroatoms. Representative aliphatic carboxylates for use in accordance with the present teachings include but are not limited to 2-ethyl hexanoic acid, hexanoic acid, heptanoic acid, octanoic acid, neodecanoic acid, decanoic acid, nonanoic acid, isononanoic acid (e.g., 7-methyloctanoic acid, 6,6-dimethylheptonic acid, 3,5,5-trimethylhexanoic acid, 3,4,5-trimethylhexanoic acid, 2,5,5-trimethylhexanoic acid, 2,2,4,4-tetramethylpentanoic acid, and/or the like, and combinations thereof), isoheptanoic acid, dodecanoic acid, sebacic acid, adipic acid, pimelic acid, suberic acid, azelaic acid, dodecanedioic acid, and/or the like, and combinations thereof. Representative aromatic carboxylates include but are not limited to benzoic acid, toluic acid (methylbenzoic acid), tert-butyl benzoic acid, alkoxy benzoic acid (e.g., methoxybenzoic acid, such as o-, p-, or m-anisic acid), salicylic acid, phthalic acid, isophthalic acid, terephthalic acid, phenylacetic acid, mandelic acid, 1,2,4-benzenetricarboxylic acid (or trimellitic acid), 1,3,5-benzene tricarboxylic acid, 1,2,3-benzene tricarboxylic acid (or hemimellitic acid), and/or the like, and combinations thereof.

In some embodiments, the additional carboxylate used in a corrosion inhibitor composition in accordance with the present teachings includes a plurality of carboxylates. In some embodiments, the additional carboxylate includes an aliphatic mono-carboxylate, an aliphatic di-carboxylate, an aromatic mono-carboxylate, an aromatic di-carboxylate, or a combination thereof. In some embodiments, the additional carboxylate includes one or a plurality of C6-C20 carboxylates, and each of the one or the plurality of C6-C20 carboxylates is individually selected from the group consisting of an aliphatic mono-carboxylate, an aliphatic di-carboxylate, an aromatic mono-carboxylate, an aromatic di-carboxylate, and a combination thereof. In some embodiments, the additional carboxylate includes at least one additional C6 to C20 mono- or di-basic aliphatic or aromatic carboxylic acid and/or an alkali metal salt thereof. In some embodiments, the additional carboxylate includes 2-ethyl hexanoic acid, adipic acid, neodecanoic acid, sebacic acid, benzoic acid, p-toluic acid, t-butyl benzoic acid, an alkoxybenzoic acid, or a combination thereof.

The concentration of additional carboxylate may vary depending on the application. In some embodiments, the carboxylate is present in an amount from about 0.01 wt. % to about 5.0 wt. %, in some embodiments about 0.05 wt. % to about 1.5 wt. %, based on the total weight of the corrosion inhibitor formulation. Within these ranges, the carboxylate may be present in an amount from about 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, 1.00%, 1.10%, 1.20%, 1.30%, 1.40%, or about 1.50%.

In some embodiments, water-soluble polymers suitable for use in a corrosion inhibitor formulation in accordance with the present teachings include homopolymers, copolymers, terpolymers, and inter-polymers having (1) at least one monomeric unit containing a $C_3$ to $C_{16}$ monoethylenically unsaturated mono- or dicarboxylic acid or their alkali metal or ammonium salts; or (2) at least one monomeric unit containing a $C_3$ to $C_{16}$ monoethylenically unsaturated mono- or dicarboxylic acid derivative such as an amide, nitrile, carboxylate ester, acid halide (e.g., acid chloride), acid anhydride, and/or the like, and combinations thereof. In some embodiments, a water-soluble polymer suitable for use in accordance with the present teachings may include at least 5% mer units of (1) or (2) and, in some embodiments, at least 10% mer units of (1) or (2).

Representative monocarboxylic acids suitable for use in making water-soluble polymers that may be used in a corrosion inhibitor formulation in accordance with the present teachings include but are not limited to acrylic acid, methacrylic acid, ethyl acrylic acid, vinylacetic acid, allylacetic acid, and crotonic acid.

Representative monocarboxylic acid esters suitable for use in making water-soluble polymers that may be used in a corrosion inhibitor formulation in accordance with the present teachings include but are not limited to butyl acrylate, n-hexyl acrylate, tert-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, methyl acrylate, methyl methacrylate, tertiary butylacrylate, and vinyl acetate.

Representative dicarboxylic acids suitable for use in making water-soluble polymers that may be used in a corrosion inhibitor formulation in accordance with the present teachings include but are not limited to maleic acid, itaconic acid, fumaric acid, citaconic acid, mesaconic acid, and methylenemalonic acid.

Antifoam Ingredients and Compositions

The heat transfer fluid (or thermal management system fluid) may include electrically non-conductive or low electrical conductivity antifoam materials. Suitable antifoam ingredients may include (a) a silicone, for example, SAG 10, SAG 7133, SAG 831, Silbreak 320, Silbreak 321, Sibreak 322, Silbreak 329, Silbreak 638, products that contain octamethylcyclotetrasiloxane or similar products available from Momentive Performance Materials, Dow Corning or other suppliers; (b) ethylene oxide-propylene oxide (EO-PO) block copolymers, a propylene oxide-ethylene oxide-propylene oxide (PO-EP-PO) block copolymers (e.g., Pluronic L61, Pluronic L81, or other Pluronic and Pluronic C products); poly(ethylene oxide), poly(propylene oxide), e.g., PPG 2000 (i.e., polypropylene oxide with an average molecular weight of 2000); (c) hydrophobic amorphous silica; (d) polydiorganosiloxane based products (e.g., products containing polydimethylsiloxane (PDMS), and the like), organomodified polydimethylsiloxane based products, fatty acids, fatty acid esters (e.g., stearic acid, and the like); (e) fatty alcohols, alkoxylated alcohols, polyglycols; polyether polylol acetates, polyether ethoxylated sorbital hexaoleate, poly(ethylene oxide-propylene oxide) monoallyl ether acetate; (f) waxes, naphtha, kerosene, aromatic oils; and combinations of the above exemplary one or more of the foregoing antifoam agents. Examples of polydimethylsiloxane emulsion based antifoams include PC-5450NF from Performance Chemicals, LLC in Boscawen, NH; CNC antifoam XD-55 NF and XD-56 from CNC International in Woonsocket in RI.

The skilled artisan will appreciate that suitable antifoam ingredients may include one or more of the nonionic surfactants described above in connection the corrosion ingredients and compositions. To that end, suitable nonionic surfactants for use as an antifoam ingredient or in antifoam compositions may include, but are not limited to alkoxylated alcohols including ethoxylated alcohols, propoxylated alcohols, and/or the like, and combinations thereof.

In some embodiments, the ethoxylated alcohol for optional use in accordance with the present teachings may be represented by the following formula:

$$RO(CH_2CH_2O)_nH \quad \text{(I)}$$

where R is the linear primary alcohol and n is the total number of moles of ethylene oxide.

In other embodiments, the propoxylated alcohol for optional use in accordance with the present teachings use may be represented by the following formula:

$$RO(CH_2CH_2CH_2O)_mH \quad \text{(II)}$$

where R is the linear primary alcohol and m is the total number of moles of propylene oxide.

In still other embodiments, alkoxylated alcohols for optional use in accordance with the present teachings may be represented by the following formula:

$$RO(CH_2CH_2O)_j(CH_2CH_2CH_2O)_kH \quad \text{(III)}$$

where R is the linear primary alcohol, j is the total number of moles of ethylene oxide and k is the total number of moles of propylene oxide.

In some embodiments, in each of formulas (I) to (III), the linear primary alcohol may contain 4 to 25 carbon atoms, or 6 to 15 carbon atoms, or 7 to 12 carbon atoms. Further, “n” and “m” are an integer having a value between 1 and 15 (inclusive). The values of j and k are integers between 0 and 15 (inclusive) and j+k is greater or equal to 1.

Representative commercially available alkoxylated alcohols can be obtained from many suppliers, e.g., The Dow Chemical Company (Midland, MI), BASF Corporation (Mount Olive, NJ or Florham Park, NJ), and Tomah Products, Inc. (Milton, WI). Examples of the alkoxylated alcohol products in accordance with the present teachings include TERGITOL™ XD (an alkyl EO/PO copolymer having a molecular weight of 2990) and TRITON™ EF-19 surfactant (>98% Alcohols, $C_8$-$C_{10}$, ethoxylated propoxylated. CAS #88603-25-8) both available from available from Dow Chemical Co., MACOL® LF 110 surfactant (alkoxylated alcohol) and Plurafac® SLF 18 (100% Alcohols, $C_6$-$C_{10}$, ethoxylated propoxylated. CAS number: 68987-81-5). Other alkoxylated alcohols suitable for use available from TOMAH Products, Inc. are shown in FIG. 1. Additional examples of the alkoxylated alcohol products may include the Plurafac® LF type low-foam nonionic surfactants available from BASF. The Plurafac® LF type surfactants consist of alkoxylated, predominantly unbranched fatty alcohols, and they contain higher alkene oxides alongside ethylene oxide. The Plurafac® LF type surfactants may include Plurafac® LF 120, Plurafac® LF 131, Plurafac® LF 132, Plurafac® LF 220, Plurafac® LF 221, Plurafac® LF 223, Plurafac® LF 224, Plurafac® LF 231, Plurafac® LF 300, Plurafac® LF 301, Plurafac® LF 303, Plurafac® LF 305, Plurafac® LF 400, Plurafac® LF 401, Plurafac® LF 403, Plurafac® LF 404, Plurafac® LF 405, Plurafac® LF 431, Plurafac® LF 500, Plurafac® LF 600, Plurafac® LF 711, Plurafac® LF 7319, Plurafac® LF 900, Plurafac® LF 901, Plurafac® LF 1300, and Plurafac® LF 1433.

In some instances and antifoam composition may include a synergistic combination of an alcohol, a fatty alcohol alkoxylate as described above in connection with formula (III) and, optionally, an alkyl EO/PO copolymer. The antifoam composition may be present in the heat transfer fluid in amount from about 0.1%, 0.2%, 0.3%, 0.4%, 0.5%, 0.6%, 0.7%, 0.8%, 0.9%, or about 1.0%, or any range that may be created from these values.

In this combination the alcohol may, in general, be an alcohol having from 1 to 32 carbons and may be linear or branched. In some instances, the alcohol may be an aliphatic alcohol having from 2 to 10 carbon atoms such as ethanol, n-propanol, butanol, isobutanol, pentonal, isopentanol, neopentanol, hexanol and its isomers, hepatonal and its isomers, octonal and its isomers, nonanol and its isomers, decanol and its isomers. In this regard, an antifoam composition may include from about 70% to about 90% of an alcohol or about 70%, 71%, 72%, 73%, 74%, 75%, 76%, 77%, 78%, 79%, 80%, 81%, 82%, 83%, 84%, 85%, 86%, 87%, 88%, 89%, or about 90%, or any range that can be created from these values.

The fatty alcohol alkoxylate may be present in the antifoam composition in an amount from about 10% to about 30% or about 10%, 11%, 12%, 13%, 14%, 15%, 16%, 17%, 18%, 19%, 20%, 21%, 22%, 23%, 24%, 25%, 26%, 27%, 28%, 29%, or about 30%, or any range that can be created from these values.

The alkyl EO/PO copolymer, when present, may be present in the antifoam composition in an amount from about 0.1% to 2.0% or about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or about 2.0%, or any range that can be created from these values.

It is also contemplated that the described heat transfer fluid compositions specifically exclude the presence of any one of the antifoam agents described herein.

Optional Ingredients

The heat transfer fluid (or thermal management system fluid) may include one or more electrically non-conductive or low electrical conductivity coolant additives, such as colorants, dispersants and anti-scalants, wetting agents, and other additives etc. Optionally, a tetraalkylorthosilicate ester with the alkyl groups containing 1 to 20 carbon atoms (e.g., tetramethylorthosilicate, tetraethylorthosilicate, and the like) can also be included. When present, the tetralkylorthosilicate ester may be present (and may be excluded) in the heat transfer fluid formulation in an amount of 0.001% to about 5% by weight.

The heat transfer (or thermal management system) fluids may also contain one or more low concentrations of a soluble alkaline earth metal (such as those selected from calcium, magnesium, or strontium), or zinc compounds, and mixtures thereof alone or in combination with one or more acids such as but not limited to benzoic acid. The soluble alkaline earth metal or zinc compound may include the hydroxides, nitrates, nitrites, other soluble metal salts, or a mixture thereof. In some instances, such compounds are the metal salts selected from calcium, magnesium, strontium, or zinc carboxylates, or a mixtures thereof. The term "soluble" means that the compound is soluble in the freezing point-depressing agent/water heat transfer fluids at the level being used in the fluids, both in the fluid concentrate form or in the ready-to-use/prediluted with water form, and the compound is able to ionize to generate the corresponding metal ion in the heat transfer fluid concentrate and/or ready-to-use (pre-diluted with de-ionized water) fluids. In this regard, it is contemplated that the alkaline earth metal hydroxides may be used in combination with one of more acids such as, but not limited to benzoic acid, to provide a substantially neutral mixture having a low conductivity.

Optionally, other coolant additives, such as colorants, wetting agents, biocides, and non-ionic dispersants, etc. can also be added in the coolant formulations disclosed in the instant invention. The optional additives for use in the coolant should be non-conductive or have a very low electrical conductivity.

Optionally, non-conductive colorants and colorant treated ion exchange resins as described in U.S. Pat. Nos. 7,985,349, 7,611,787, 7,901,824, 2006/0051639, and 2006/0063050 may be used in the instant invention. Additional representative non-conductive colorants or dyes for optional use in in accordance with the present teachings include but are not limited to the various polymeric colorants from Milliken & Company of Spartanburg, S.C. and the colorants from Chromatech Inc. of Canton, MI, including but not limited to Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Blue EA, and Liquitint Red HN, and/or the like, and combinations thereof.

As used herein, the term "non-conductive" refers to a colorant that produces a conductivity increase of less than about 10 μS/cm when introduced into a standard solution of deionized water at a maximum concentration of no more than about 0.2% by weight based on the total weight of the standard solution. In some embodiments, suitable non-conductive colorants will possess good stability in a mixture of alcohol and water under fuel cell-operating conditions (e.g., typically temperatures of from about 40° C. to about 100° C.

In some embodiments, the optional non-conductive colorant is substantially free of functional groups that will form an ionic species due to hydrolysis in an aqueous alcohol or glycol solution. As used herein in the context of non-conductive colorants, the phrase "substantially free" refers to an amount that does not exceed an amount that will lead to the conductivity of the colored heat transfer fluid being higher than 10 S/cm. In some embodiments, the optional non-conductive colorant is substantially free of functional groups selected from the group consisting of carboxylate groups, sulfonate groups, phosphonate groups, quaternary ammonium cation groups, groups that carry a positive charge, groups that carry a negative charge, and combinations thereof. Illustrative examples of groups that carry a positive charge include but are not limited to $Na^+$, $Cu^{2+}$, $N^+R^3$ (wherein R is independently H, $C_1$ to $C_{20}$ alkyl or aromatic ring containing groups), $Fe^{3+}$, and/or the like, and combinations thereof. Illustrative examples of groups that carry a negative charge include but are not limited to $Cl^-$, $Br^-$, $I^-$, and/or the like, and combinations thereof.

In some embodiments, the optional non-conductive colorant may include at least one of the following chromophores: anthraquinone, triphenylmethane, diphenylmethane, triarylmethane, diarylmethane, azo-containing compounds, disazo-containing compounds, trisazo-containing compounds, diazo-containing compounds, xanthene, acridine, indene, thiazole, two or more conjugated aromatic groups, two or more conjugated heterocyclic groups (e.g. stilbene and/or pyrazoline and/or coumarine-type radicals or mixtures thereof), three or more conjugated carbon-carbon double bonds (e.g., carotene), and/or the like, and combinations thereof. In some embodiments, the chromophore may include one or more of the following: triphenylmethane, diphenylmethane, triarylmethane, diarylmethane, and an azo-containing radical.

In some embodiments, the optional non-conductive colorant may contain alkyleneoxy or alkoxy groups and at least one chromophore such as those described above. In some embodiments, the chromophore contained in the colorants may be selected from the group consisting of anthraquinone, triphenylmethane, diphenylmethane, triarylmethane, diarylmethane, azo-containing compounds, disazo-containing compounds, trisazo-containing compounds, diazo-containing compounds, two or more conjugated aromatic groups, two or more conjugated heterocyclic groups, and/or the like, and combinations thereof.

In alternative embodiments, suitable optional non-conductive colorants have the formula (IV):

$$R\{A_k[(B)_nR^1]_m\}_x \quad (IV)$$

wherein R is an organic chromophore selected from the group consisting of anthraquinone, triphenylmethane, diphenylmethane, triarylmethane, diarylmethane, azo-containing compounds, disazo-containing compounds, trisazo-containing compounds, diazo-containing compounds, xanthene, acridine, indene, thiazole, two or more conjugated aromatic groups, two or more conjugated heterocyclic groups, and combinations thereof; A is a linking moiety in the chromophore and is selected from the group consisting of O, N and S; k is 0 or 1; B is selected from the group consisting of one or more alkyleneoxy or alkoxy groups containing from 1 to 8 carbon atoms; n is an integer of from 1 to 100; m is 1 or 2; x is an integer from 1 to 5; and $R^1$ is selected from the group consisting of H, $C_1$-$C_6$ alkyl groups or alkoxy groups containing from 1 to 8 carbon atoms, and combinations thereof.

In some embodiments, suitable optional non-conductive colorants are those colorants of formula (IV) shown above in which A is N or O; B is selected from the group consisting of one or more alkyleneoxy constituents containing from 2 to 4 carbon atoms, n is from 1 to 30, m is 1 or 2, X is 1 or 2, and $R^1$ is H or a $C_1$-$C_4$ alkyl groups or alkoxy groups containing from 1 to 6 carbon atoms.

In some embodiments, the optional non-conductive colorants may be prepared by various known methods including but not limited to those described in U.S. Pat. Nos. 4,284,729, 6,528,564, or other patents issued to Milliken & Company of Spartanburg, SC. For example, suitable optional colorants may be prepared by converting a dyestuff intermediate containing a primary amino group into the corresponding polymeric compound and employing the resulting compound to produce a compound having a chromophoric group in the molecule. In the case of azo dyestuffs, this may be accomplished by reacting a primary aromatic amine with an appropriate amount of an alkylene oxide or mixtures of alkylene oxides (e.g., ethylene oxide and the like) according to known procedures, and then coupling the resulting compound with a diazonium salt of an aromatic amine. In order to prepare liquid colorants of the triarylmethane class, aromatic amines that have been reacted as stated above with an alkylene oxide may be condensed with aromatic aldehydes and the resulting condensation products oxidized to form the triarylmethane liquid colorants. Other suitable optional colorants may also be prepared by these and other known procedures.

In one embodiment, the optional colorants containing ionic species may be used if purification methods are employed. Illustrative purification and chemical separation techniques include, treatment with ion exchange resins, reversed osmosis, extraction, absorption, distillation, filtration, etc. and similar processes used to remove the ionic species in order to obtain a purified colorant that is electrically non-conductive and suitable for use herein.

For embodiments in which the heat transfer fluid includes one or more additional optional components, the total amount of the one or more additional optional components may be greater than about 0.001 wt. % based on the total weight of the heat transfer fluid. Within this range, the amount of one or more additional optional components may be less than about 20 wt. %, less than about 19 wt. %, less than about 18 wt. %, less than about 17 wt. %, less than about 16 wt. %, less than about 15 wt. %, less than about 14 wt. %, less than about 13 wt. %, or less than about 12 wt. %, less than about 11 wt. %, less than about 10 wt. %, less than about 9 wt. %, less than about 8 wt. %, less than about 7 wt. %, less than about 6 wt. %, less than about 5 wt. %, less than about 4 wt. %, less than about 3 wt. %, or less than about 2 wt. % based on the total weight of the heat transfer fluid.

The pH of the heat transfer fluid, whether formulated as a concentrate or as a prediluted ready-to-use heat transfer fluid, may be between about 4.5 and about 10.0 at room temperature. Within this range, the pH may be greater than or equal to about 5.0 or, in some embodiments, greater than or equal to about 6.5. Also within this range, the pH may be less than or equal to about 9.0 or, in some embodiments, less than or equal to about 7.5.

A method of preventing corrosion in a heat transfer system in accordance with the present teachings includes contacting at least a portion of the heat transfer system with a heat transfer fluid of a type described herein. The heat transfer system may include one or a plurality of components containing carbon steel, aluminum, aluminum alloy, magnesium, magnesium alloy, yellow metal, or a combination thereof. In some embodiments, the heat transfer system may include magnesium and/or magnesium alloy. In some embodiments, the heat transfer system includes a fuel cell.

Ion Exchange Resins

According to some embodiments for use in the described vehicles, it is contemplated to use an ion exchange resin pre-treated a desirable corrosion inhibitor composition to provide the required corrosion protection. For example, ion exchange resins (e.g., mixed bed resins or anion exchange resins) may be first pre-treated with a corrosion inhibitor containing 5- or 6-member heterocyclic ring as the active functional group, wherein the heterocyclic ring contains at least one nitrogen atom, for example, an azole compound. Then, the ion exchange resins are packaged into a filter installed in a side-stream of the vehicle's cooling system. Some of the ionic species present in the coolant or being generated during cooling system operation will exchange with the corrosion inhibitor attached to the exchangeable sites on the ion exchange resins. This leads to the release of the corrosion inhibitor from the resin and removal of the ionic species from the coolant.

In those instances when the resin is first pre-treated with a corrosion inhibitor containing a 5- or 6-member N-heterocyclic compounds, because such compounds are weakly ionic compounds, their release at the typical use concentration ranges, e.g., less than a few thousand milligrams per liter in the coolant will not result in an unacceptable increase in conductivity. One advantage of each of the use of the described ion exchange resin is that the amount of corrosion inhibitor release from the resin depends on the corrosion protection need of the coolant. An increase in corrosivity in the coolant will produce more ionic species, which in turn will trigger an increase in the amount of the corrosion inhibitor from the resin due to the ion exchange mechanism. The increased corrosion inhibitor concentration in the coolant will lead to a reduction in corrosion rate. Another advantage of the use of the described ion exchange resins is that the presence of mixed bed ion exchange resins will maintain low conductivity in the coolants (heat transfer fluids or thermal management fluid compositions) in the system. When ion exchange resins are used and/or present, it is contemplated to also use one or more filters and/or strainers to inhibit or prevent the leakage of ion exchange resin beads into the system.

Ion exchange resins loaded with corrosion inhibitors can be prepared by contacting the ion exchange resin with aqueous solutions containing the corrosion inhibitors for a sufficiently long contact time period so that the corrosion inhibitors have exchanged 15% or more of the total exchangeable groups in the resins. In another words, the corrosion inhibitor loading should reach 15% or more of the exchange capacity of the resin, or more than 50% of the exchange capacity of the resins or more than 75% of the exchange capacity of the resin. The ion exchange resins loaded with corrosion inhibitors are then packaged into a filter and placed in the cooling system to provide the desired corrosion protection. Before installing in the cooling system, the ion exchange resins loaded with corrosion inhibitors may be cleaned with de-ionized water and/or cleaned coolant to minimize the possibility of accidental introduction of impurities into the system.

The corrosion inhibitors that may be used to treat the ion exchange resins generally will have a pKa value of equal to or greater than 5 if it is an acid in an aqueous solution at 25° C. If a treatment inhibitor is a base, the pKb value of suitable treatment inhibitors should be equal or greater than 5 in an aqueous solution at 25° C. Suitable examples of the ion exchange resin treatment inhibitors may include compounds containing 5- or 6-member heterocyclic ring as the active functional group, wherein the heterocyclic ring contains at least one nitrogen atom, for example, an azole compound. Particularly, benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles, and mixtures thereof can be used as corrosion inhibitors. Other compounds may also be used to treat the ion exchange resins. They include amine salts of cyclohexenoic carboxylate compounds derived from tall oil fatty acids and amine compounds, such as mono-, di- and triethanolamine, morpholine, benzylamine, cyclohexylamine, dicyclohexylamine, hexylamine, AMP (or 2-amino-2-methyl-1-propanol or isobutanolamine), DEAE (or diethylethanolamine), DEHA (or diethylhydroxylamine), DMAE (or 2-dimethylaminoethanol), DMAP (or dimethylamino-2-propanol), and MOPA (or 3-methoxypropylamine). In addition, other corrosion inhibitors, such as carboxylates, carboxylate esters, amides, etc. can also be used. It is also contemplated that any one or more of the above-described compounds that may be used to treat the ion exchange resins may be excluded from the described heat transfer fluids.

The ion exchange resins that may be used depend on the nature of the corrosion inhibitors to be used. If N-heterocyclic compounds are used as the corrosion inhibitors, the ion exchange resin may be a regenerable mixed-bed resin or anion exchange resin. If the corrosion inhibitors may become positively charged species in solutions, then regenerable mixed-bed resins or cation exchange resins can be used. A mixed bed resin may be a mixture of a cation ion exchange resin and an anion exchange resin. Representative cation exchange resins may be in $H^+$ form and the anion exchange resin may be in OH form.

Ion exchange resin typically are formed from a polymer matrix and functional groups that interact with the ions. The ion exchanger matrix may be polystyrene, including polystyrene and styrene copolymers, polyacrylic, phenol-formaldehyde, and polyalkylamine. The cation ion exchange resin functional groups may be sulfonic acid groups ($—SO_3H$), phosphonic acid groups ($—PO_3H$), phosphinic acid groups ($—PO_2H$), or carboxylic acid groups (—COOH or $—C(CH_3)—COOH$). The anion ion exchange resin functional groups may be quaternary ammonium groups, e.g., benzyltrimethylammonium groups or benzyldimethylethanolammonium groups; or tertiary amine functional groups. Commercially available ion exchange resins are sold be and may be obtained from Rohm and Haas (e.g., Amberlite, Amberjet and Duolite, Imac resins), Bayer (Lewatit), Dow (Dowex), Mitsubishi (Diaion), Purolite, Sybron (lonac), Resintech and others.

Examples

Heat transfer fluids in accordance with the present teachings are further demonstrated by the following non-limiting examples. The following examples illustrate features in accordance with the present teachings, and are provided solely by way of illustration. They are not intended to limit the scope of the appended claims or their equivalents.

Corrosion Screening Test Examples

ASTM D1384-24 (published February 2024) is a test method that uses a simple beaker-type procedure for evaluating the effects of engine coolants on metal specimens under controlled laboratory conditions. In the following examples a modified ASTM D1384-24 test procedure was used (referred to as a corrosion screening test). In this procedure, metal or metal alloy coupons were exposed to diluted heat transfer fluid compositions (diluted by adding fresh de-ionized water to provide a 50 vol % composition) represented by Examples 1-7 and Comparative Examples 1-5, as further identified in Table 1. In Comparative Examples 6-8, the pre-diluted ready-to-use commercial coolant solutions were used without change (i.e., no dilution with de-ionized water) in the modified ASTM D1384-24 test. No corrosive salts were added into the test solutions in the modified ASTM D1384-24 test. The coupons were exposed to each test solution for 336 hours with the test solution temperature controlled at 88° C. per ASTM D1384-24 specification and the mass loss for each coupon was obtained. The mass loss of each coupon is given as in (mg specimen)/336 hours.

Table 1 shows the test results obtained from the above corrosion screening test. The results demonstrate that the described heat transfer fluids provide excellent corrosion protection to various metals.

Fresh de-ionized water in the examples used in Table 1 means that the de-ionized water is freshly prepared by the Reverse Osmosis equipment without having the chance to adsorb carbon dioxide from the air. The fresh de-ionized water used in the examples of the instant invention typically had an electrical conductivity less than 1 μS/cm.

TABLE 1

Low Electrical Conductivity Electrical Vehicle Thermal Management Fluid Formulations and Test Results - including modified ASTM D1384-24 results

| | Example ID | | | | | | | |
|---|---|---|---|---|---|---|---|---|
| | Comp. Ex. 1 | Ex. 1 | Ex. 2 | Ex. 3 | Ex. 4 | Ex. 5 | Ex. 6 | Ex. 7 |
| | ID | | | | | | | |
| Ingredient | C4 wt % | D1 wt % | D2 wt % | D3 wt % | D4 wt % | D5 wt % | D6 wt % | D7 wt % |
| Ethylene Glycol | 99.2487 | 99.0596 | 99.0099 | 98.9488 | 98.9221 | 98.6097 | 98.6221 | 98.9227 |
| Fresh de-ionized water | | | | | | | | |
| Tolytriazole (solid) (TTZ) | 0.2003 | 0.2 | 0.2 | 0.2 | 0.2001 | 0.2001 | 0.2001 | |
| Benzotriazole (solid) (BZT) | 0.2002 | 0.1999 | 0.2 | 0.2 | 0.2002 | 0.2399 | 0.2001 | 0.4001 |

TABLE 1-continued

Low Electrical Conductivity Electrical Vehicle Thermal Management Fluid Formulations and Test Results - including modified ASTM D1384-24 results

| | | | | | | | | |
|---|---|---|---|---|---|---|---|---|
| Carbowax 400 | 0.2403 | 0.24 | 0.24 | 0.24 | 0.2401 | 0.2398 | 0.2401 | 0.24 |
| Tris (2-butoxyethyl) phosphate, 95% | | 0.0501 | 0.1 | 0.2001 | 0.2001 | 0.5 | 0.5 | 0.2 |
| AR-940, Sodium polyacrylate (MW = 2600) provided as 40% solid aqueous solution with pH of 8.3 | | | | | | | | |
| Fresh DI $H_2O$ | | | | | | | | |
| Calcium Acetate monohydrate, CaAc2*H20 | | | | | 0.005 | | 0.005 | 0.005 |
| Magnesium Acetate tetrahydrate, MgAc2*4H2O | | | | | 0.022 | | 0.022 | 0.022 |
| Liquitint Blue RE | 0.0103 | 0.0107 | 0.0104 | 0.011 | 0.0105 | 0.0104 | 0.0105 | 0.0102 |
| PM5150 antifoam (contains polypropylene glycol) | 0.1002 | 0.2397 | 0.2398 | 0.2002 | 0.2 | 0.2003 | 0.2 | 0.2 |
| Total | 100 | 100 | 100 | 100 | 100 | 100 | 100 | 100 |
| Observation on fluid prepared | Clear, single phase liquid | Clear, single phase liquid | Clear, single phase liquid | Clear, single phase liquid | Clear, single phase liquid | Clear, single phase liquid | Clear, single phase liquid | Clear, single phase liquid |
| Observation on 50 v % solution after adding deionized water | Clear, single phase liquid | Clear, single phase liquid | Clear, single phase liquid | Clear, single phase liquid | Clear, single phase liquid | Clear, single phase liquid | Clear, single phase liquid | Clear, single phase liquid |
| Electrical Conductivity, µS/cm, 50 v % @ 25° C. | 2.44 | 3.44 | 2.98 | 3.71 | 35.75 | 6.6 | 35.9 | 36.9 |

Modified ASTM D1384-24 Results - Average Coupon Weight Loss, Standard Bundle, Galvanically coupled per D1384-24, 50 v %, no salt, 88° C., 2 weeks, mg/336 hr.

| | | | | | | | | |
|---|---|---|---|---|---|---|---|---|
| Copper | 0.5 | 0.3 | 0 | 0 | −0.2 | 0.4 | 0.2 | 0.5 |
| ASTM Solder | 3.3 | 1.8 | 5.5 | 8.6 | 4.4 | 19.3 | 15.4 | 9.7 |
| Brass | 1.4 | 0.6 | 0.5 | 0.3 | 0.2 | 0.1 | 0.1 | 0.1 |
| Mild Steel | 106.3 | 95.8 | 0.9 | 30 | 0.7 | 24.4 | 12.4 | 0.1 |
| Cast iron | 190.6 | 330.9 | 23.2 | 95.1 | 1.4 | 125.3 | 37.6 | 0.6 |
| Cast Aluminum | 1 | 2.1 | 15.2 | 14.1 | 1.4 | 9.85 | 2.85 | −1.4 |

| | Example ID | | | | | | |
|---|---|---|---|---|---|---|---|
| | Comp. Ex. 2 | Comp. Ex. 3 | Comp. Ex. 4 | Comp. Ex. 5 | Comp. Ex. 6 | Comp. Ex. 7 | Comp. Ex. 8 |
| | ID | | | | | | |
| Ingredient | D8 wt % | D9 wt %% | D10 wt % | D11 wt % | OE BEV Coolant 1 wt % | OE BEV Coolant 2 wt % | Aftermarket Coolant 1 wt % |
| Ethylene Glycol | 98.863 | 98.624 | 48.863 | 98.363 | Present | Present | Present |
| Fresh de-ionized water | | | 50 | 0.44 | | | |
| TTZ solid | | | | | | | |
| BZT solid | 0.4 | 0.4 | 0.4 | 0.4 | | | |
| Carbowax 400 | 0.24 | 0.24 | 0.24 | 0.24 | | | |
| Tris (2-butoxyethyl) phosphate, 95% | 0.2 | 0.5 | 0.2 | 0.2 | | | |
| AR-940, Sodium polyacrylate (MW = 2600) provided as 40% solid aqueous solution with pH of 8.3 | 0.06 | | 0.06 | 0.06 | | | |
| Fresh DI $H_2O$ | | | | 0.06 | | | |
| Calcium Acetate monohydrate, CaAc2*H2O | 0.005 | 0.004 | 0.005 | 0.005 | | | |
| Magnesium Acetate tetrahydrate, MgAc2*4H2O | 0.022 | 0.02 | 0.022 | 0.022 | | | |
| Liquitint Blue RE | 0.01 | 0.01 | 0.01 | 0.01 | | | |
| PM5150 antifoam (contains polypropylene glycol) | 0.2 | 0.2 | 0.2 | 0.2 | | | |
| Total | 100 | 100 | 100 | 100 | | | |
| Observation on fluid prepared | Turbid | Clear, single phase liquid | Turbid | Turbid | | | |
| Observation on 50 v % solution after adding deionized water | ND | Upon dilution to 50 v % solution, it separates into two phases. | ND | ND | | | |

TABLE 1-continued

| Low Electrical Conductivity Electrical Vehicle Thermal Management Fluid Formulations and Test Results - including modified ASTM D1384-24 results | | | | | | | |
|---|---|---|---|---|---|---|---|
| Electrical Conductivity, µS/cm, as is @ 25° C. | ND | ND | ND | ND | 3.6 | 97 | 381.6 |
| Comments | | | | | Very low electrical conductivity BEV Coolant | Low electrical conductivity BEV Coolant | Medium electrical conductivity EV Coolant |
| Modified ASTM D1384-24 Results - Average Coupon Weight Loss, Standard Bundle, Galvanically coupled per D1384-24, 50 v %, no salt, 88° C., 2 weeks, mg/336 hr. | | | | | | | |
| Copper | — | — | — | — | 1 | 3.2 | 2.1 |
| ASTM Solder | — | — | — | — | 4.7 | 15 | 52.2 |
| Brass | — | — | — | — | 0.9 | 6.7 | 6.3 |
| Mild Steel | — | — | — | — | 60 | −0.1 | 1 |
| Cast iron | — | — | — | — | 133.5 | 16.3 | −1 |
| Cast Aluminum | — | — | — | — | 1.1 | 10.8 | 1.6 |

*Comp. Ex. 6 = Prediluted Ready-to-Use OE BEV coolant 1
Comp. Ex. 7 = Prediluted Ready-to-Use OE BEV coolant 2
Comp. Ex. 8 = Prediluted Ready-to-Use Aftermarket EV coolant 1

In addition, it can be seen that the low electrical conductivity thermal management fluid formulations of Examples #2, #4, and #7 yielded low corrosion rates (in terms of metal sample weight loss) for the various test metal coupons. The coupon mass loss results are well within the specification limits of ASTM D3306, which relates to the requirements for ethylene glycol or propylene glycol or ethylene glycol containing glycerin base engine coolants used in automobiles or other light-duty service cooling systems.

Among the test results shown in Table 1, Examples #4 and #7 yielded the best overall corrosion weight loss results. They demonstrate that the corrosion protection performance of the tested exemplary fluids is much better than the comparative commercial EV thermal management fluids (see Comparative Examples #6, #7, and #8).

FIG. 2A shows a photo of the front (i.e., the side of the coupons was stamped with identification numbers before test) side of the five metal specimens after being tested in the above-described modified ASTM D1384-24 test (test duration: 336 hours, test solution temperature: 88° C.) where the prediluted ready-to-use very low electrical conductivity OE BEV battery system thermal management system fluid 1 (or OE BEV coolant 1, containing ~52.8 vol % ethylene glycol and other additives including corrosion inhibitors) was used as the test solution without adding any corrosive salts and without being diluted by adding additional de-ionized water and is further described as Comparative Example 6, above. FIG. 2B shows a photo of back side of the five metal specimens of FIG. 2A after being tested in the above-described modified ASTM D1384-24 test (see description given above for FIG. 2A) and is further described as Comparative Example 6, above.

FIG. 3A shows a photo of the front side of the five metal specimens after being tested in the above-described modified ASTM D1384-24 test (test duration: 336 hours at 88° C.) where a prediluted ready-to-use low electrical conductivity OE BEV battery system thermal management fluid 2 (or OE BEV coolant 2, containing ~58.9 vol % ethylene glycol and other additives including corrosion inhibitors) was used as the test solution without adding any corrosive salts and without being diluted by adding additional de-ionized water and is further described as Comparative Example 7, above. FIG. 3B shows a photo of the back side of the five metal specimens shown in FIG. 3A after conducting the above-described corrosion screening test (see the description above in FIG. 3A for the test conditions) and is further described as Comparative Example 7, above.

FIG. 4A shows a photo of the front side of the five metal specimens after being tested in the above-described modified ASTM D1384-24 test (test duration: 336 hours at 88° C.) where a prediluted ready-to-use medium electrical conductivity aftermarket commercial battery system thermal management fluid (or Aftermarket EV coolant, containing ~54.2 vol. % ethylene glycol and other additives including corrosion inhibitors) was used as the test solution without adding any corrosive salt and without being diluted by adding additional de-ionized water and is further described as Comparative Example 8, above. FIG. 4B shows a photo of the back side of the five metal specimens shown in FIG. 4A after conducting the above-described corrosion screening test (see the description above in FIG. 4A for the test conditions) and is further described as Comparative Example 8, above.

It will be appreciated from a comparison of the photos in the figures showing the post-corrosion screening test that intense localized corrosion attack damage was observed on cast aluminum, ASTM solder, and one cast iron sample with respect to those tests conducted in the ready-to-use Comp. Ex. #7 (a commercial low electrical conductivity OE BEV coolant/thermal management fluid or OE BEV coolant 2).

It will also be appreciated that Example #2 shows much better corrosion protection of the metal coupon samples than the ready-to-use Comp. Ex. #6 (a commercial OE BEV coolant/thermal management fluid containing) having a similarly very low electrical conductivity (The electrical conductivity of the two fluids (i.e., less than 5 µS/cm at 25° C.) meet the electrical conductivity design requirement for coolants specified for use as a fuel cell stack coolant in the fuel cell powered electric vehicles).

It should be noted that with respect to the cast aluminum coupon, the relatively low weight loss results obtained in the corrosion screening test for the ready-to-use Comp. Ex. 8 fluid were somewhat misleading. As seen in FIGS. 4A and 4B, the cast aluminum coupon samples were all completely blackened, indicating high aluminum corrosion occurred on the test coupons during the test. In fact, it will be appreciated that the ASTM solder sample corrosion weight loss results exceeded the ASTM D3306 specified limits. Hence, if black corrosion products were removed completely from the cast aluminum coupons used in the test of Comp. Ex. 8 fluid, the cast aluminum coupon corrosion rates would be much higher than shown in Table 1.

In comparison, cast aluminum coupons that were tested in Ex. #7 fluid were not blackened (as compared to Comp. Ex. 8) and with few signs of corrosion attack, in agreement with the weight loss results obtained in the tests and presented in Table 1.

It should be noted that the results shown in Table 1 clearly demonstrated the unexpected synergistic effect of corrosion inhibitor combinations disclosed in the instant invention. The presence of the alkaline earth metal ions (in the form of calcium acetate and magnesium acetate salts) in the presence of tris(2-butoxyethyl) phosphate yielded excellent corrosion protection of the various metal samples used in the corrosion screening tests (modified ASTM D1384-24 tests), e.g., as shown the comparison test results in Ex. 3 vs. Ex. 4 and Ex. 5 vs. Ex. 6. The results in Table 1 (see Ex. 1, Ex. 2, Ex. 3 and Ex. 5 vs. Comp. Ex. 1) also demonstrate that in the absence of the alkaline earth metal ions, the presence of certain ranges of concentrations of tris(2-butoxyethyl) phosphate may provide acceptable corrosion protection to mild steel and cast iron coupons while not increasing the corrosion of cast aluminum coupon to an unacceptable level as demonstrated in the corrosion screening test (i.e., the modified ASTM D1384-24 test).

The results in Comp. Ex. 2, Comp. Ex. 4, and Comp. Ex. 5 indicates that adding polyacrylate in the thermal management fluid formulations would lead to unexpected (and harmful) precipitate formation (or phase separation) in the disclosed heat transfer fluids (or electric vehicle thermal management fluids) disclosed in the instant invention.

Stagnation Test Examples

In the following examples, automotive radiator cubes were tested according to the test conditions described in Yang, B., Woyciesjes, P., and Gershun, A., "Comparison of Extended Life Coolant Protection Performance," SAE Technical Paper 2017-01-0627, doi:10.4271/2017-01-0627 and US2019/0225855A1. Briefly, sample Ford Fusion automotive radiator cubes were placed into polypropylene bottles containing 50v % or ready-to-use commercial coolant products and then placed into test ovens controlled at 100° C., 140° F., and 100° F. for two weeks. After two weeks, the test coolant (or heat transfer fluid) solutions were sampled and submitted for analysis.

Table 2 shows that the described heat transfer fluid formulations provide excellent corrosion protection of aluminum alloy surfaces of the automotive heat exchangers manufactured by the controlled atmosphere brazing process commonly used in the thermal management systems of vehicles (including electric vehicles).

The analytical results of the post-test heat transfer fluid solutions are shown in Table 2.

TABLE 2

Radiator Cube Stagnation Test Results at 100° C., 140° F. and 100° F.

| | Test Fluid | | | | | | | |
|---|---|---|---|---|---|---|---|---|
| | 50 v % Ex. 3 | | | | 50 v % Ex. 4 | | | |
| | Stagnation Test Temperature | | | | | | | |
| | Fresh Coolant | 100° C. | 140° F. | 100° F. | Fresh Coolant | 100° C. | 140° F. | 100° F. |
| pH (as is) | 0 7 | 7.9 | 7.88 | 7.77 | 6.04 | 8.04 | 6.81 | 6.84 |
| Ethylene Glycol v % by Refractive Index | 51.4 | 53.4 | 51.5 | 51.4 | 51.6 | 53.5 | 51.5 | 51.5 |
| Refractive Index | 1.38639 | 1.38841 | 1.38656 | 1.38639 | 1.38656 | 1.38851 | 1.38653 | 1.38647 |
| Nitrite/Nitrate, mg/L | ND/ND | ND/ND | ND/ND | ND/ND | ND/ND | ND/ND | ND/ND | ND/ND |
| Fluoride, mg/L | ND | 21 | 44 | 35 | ND | 30 | 9 | 8 |
| Glycolate, mg/L | 12 | 108 | 47 | 13 | 12 | 121 | 16 | 12 |
| Formate, mg/L | <10 | 21 | 23 | <10 | <10 | 33 | 11 | <10 |
| Acetate, mg/L | <10 | <10 | <10 | <10 | 77 | 94 | 76 | 72 |
| ICP, filtered, mg/L | | | | | | | | |
| Al | <2 | <2 | 3.4 | 2.1 | <2 | 2.1 | <2 | <2 |
| K | <2 | 297.2 | 259.5 | 181.9 | <2 | 420.6 | 68.5 | 54.7 |
| Si | <2 | <2 | <2 | <2 | <2 | <2 | <2 | <2 |

| | Test Fluid | | | | | | | |
|---|---|---|---|---|---|---|---|---|
| | 50 v % Ex. 6 | | | | 50 v % Ex. 7 | | | |
| | Stagnation Test Temperature | | | | | | | |
| | Fresh Coolant | 100° C. | 140° F. | 100° F. | Fresh Coolant | 100° C. | 140° F. | 100° F. |
| pH (as is) | 5.95 | 6.42 | 6.89 | 6.81 | 5.99 | 7.65 | 6.82 | 6.81 |
| Ethylene Glycol v % by Refractive Index | 51.4 | 53.3 | 51.4 | 51.3 | 51.4 | 53.3 | 51.4 | 51.4 |
| Refractive Index | 1.3864 | 1.38832 | 1.3864 | 1.38631 | 1.38639 | 1.38826 | 1.38644 | 1.38636 |
| Nitrite/Nitrate, mg/L | ND/ND | ND/ND | ND/ND | ND/ND | ND/ND | ND/ND | ND/ND | ND/ND |
| Fluoride, mg/L | ND | 7 | 10 | 9 | ND | 17 | 9 | 9 |
| Glycolate, mg/L | 12 | 98 | 18 | 13 | 12 | 120 | 18 | 13 |
| Formate, mg/L | <10 | 26 | 12 | 12 | <10 | 28 | 11 | 11 |
| Acetate, mg/L | 72 | 81 | 72 | 75 | 75 | 92 | 76 | 77 |
| ICP, filtered, mg/L | | | | | | | | |
| Al | <2 | <2 | <2 | <2 | <2 | <2 | <2 | <2 |
| K | <2 | 262.5 | 82.4 | 55.3 | <2 | 313 | 69.9 | 63.8 |
| Si | <2 | <2 | <2 | <2 | <2 | <2 | <2 | <2 |

TABLE 2-continued

Radiator Cube Stagnation Test Results at 100° C., 140° F. and 100° F.

| | Test Fluid | | | | | | | |
|---|---|---|---|---|---|---|---|---|
| | 50 v % Comp. Ex. 9 (OE BEV Coolant 3) | | | | Comp. Ex. 10 (Ready-to-use After Market EV Coolant 2) | | | |
| | Stagnation Test Temperature | | | | | | | |
| | Fresh Coolant | 100° C. | 140° F. | 100° F. | Fresh Coolant | 100° C. | 140° F. | 100° F. |
| pH (as is) | 8.85 | 7.93 | 8.19 | 8.56 | 8.53 | 8.15 | 8.28 | 8.36 |
| Ethylene Glycol v % by Refractive Index | 52.1 | 53.9 | 52.2 | 52.1 | 56.1 | 58.2 | 56.2 | 56.2 |
| Refractive Index | 1.38714 | 1.38888 | 1.38716 | 1.3871 | 1.39113 | 1.39317 | 1.39122 | 1.39115 |
| Nitrite/Nitrate, mg/L | ND/ND | ND/ND | ND/ND | ND/ND | 93/2355 | 86/2452 | 88/2228 | 87/2180 |
| Fluoride, mg/L | ND | 23 | 19 | 24 | ND | 73 | 46 | 24 |
| Glycolate, mg/L | 16 | 128 | 29 | 16 | 13 | 47 | 15 | 14 |
| Formate, mg/L | <10 | 22 | 17 | 11 | <10 | 13 | <10 | <10 |
| Acetate, mg/L | <10 | 10 | <10 | <10 | <10 | <10 | <10 | <10 |
| ICP, filtered, mg/L | | | | | | | | |
| Al | <2 | 2.3 | <2 | <2 | <2 | 11.9 | 11.2 | 8.3 |
| K | 12.9 | 437.9 | 205.8 | 108.3 | 101.4 | 239.4 | 177.6 | 140.9 |
| Si | <2 | <2 | <2 | <2 | 128.8 | 107.8 | 121.6 | 127.3 |
| Note | High electrical conductivity organic acid based coolant for BEVs, Hybrid EVs, and ICE vehicles | | | | Very high electrical conductivity silicate and nitrate containing hybrid organic acid based coolant for BEVs, Hybrid EVs, and ICE vehicles | | | |

One can see from Table 2 that the described low electrical conductivity heat transfer fluids show excellent corrosion protection of the aluminum surfaces of the automotive radiator cubes (heat exchangers) covered with potassium fluoroaluminate flux residues. In particular, the corrosion protection performance of Exs. #4, #6, and #7 was superior than that provided by commercial coolants, i.e., 50v % Comp. Ex. 9 (OE BEV coolant 3), Comp. Ex. #10 (i.e., Ready-to-use Aftermarket EV coolant 2). Both of these two Comp. Ex coolant solutions have high electrical conductivities (i.e., greater than 2000 μS/cm at 50v % concentration) and contain high concentrations of known highly effective corrosion aliphatic carboxylate corrosion inhibitors, and nitrate, silicates and azole compounds.

The corrosion product aluminum cation, Al, concentration and highly corrosive fluoride ions, in some cases, glycol degradation acid concentrations (such as glycolate, and formate) are much lower (or absent) in the post radiator cube stagnation test solutions of 50v % Ex. #4, #6 and #7 than the ones detected in Comp. Ex. 9 and Comp. Ex. 10 commercial EV coolant product solutions (the two comp. Ex. coolant products are approved by OEMs and are also intended for use in internal combustion engine (ICE) vehicle engine cooling systems) under comparable test conditions.

The test results clearly demonstrate that the described heat transfer fluids provide superior excellent protection for automotive heat exchanger manufactured by the controlled atmosphere brazing process under electric vehicle thermal management system operating conditions. As shown in the results in Ex. 3, Ex. 4, and Ex. 7, unexpected synergistic effect of corrosion protection of the corrosion inhibitor combinations disclosed in the instant invention is demonstrated. The greater concentration of tris(2-butoxyethyl) phosphate used in Ex. 6 as compared to that used in Ex. 4 appears to indicate that the corrosion protection of the potassium fluoroaluminate flux residue may improve with increasing neutral phosphate concentration in the heat transfer fluid formulation.

Referring now to Table 3, it shows the results of testing where the above-described modified ASTM D1384-24 test was used to test several comparative compositions (Comp. Ex. 11-15) and one composition according to the above-described heat transfer fluids (Ex. 8).

TABLE 3

Additional Low Electrical Conductivity Electrical Vehicle Thermal Management Fluid Formulations and Test Results

| | Example ID | | | | | |
|---|---|---|---|---|---|---|
| Ingredient | Comp. Ex. 11 wt % | Comp. Ex. 12 wt % | Comp. Ex. 13 wt % | Comp. Ex. 14 wt % | Comp. Ex. 15 wt % | Ex. 8 wt % |
| Ethylene Glycol | 98.7601 | 98.5605 | 98.5604 | 98.5601 | 99.1497 | 98.5600 |
| Fresh de-ionized water | 0.2501 | 0.2500 | 0.2500 | 0.2500 | | 0.2501 |
| Benzotriazole in solid form, Purity: >98% | 0.4001 | 0.4000 | 0.4000 | 0.4002 | 0.4001 | 0.4000 |
| Carbowax 400 | 0.2400 | 0.2400 | 0.2400 | 0.2400 | 0.2400 | 0.2401 |
| Tris(2-butoxyethyl) phosphate, 95% | | | 0.1999 | 0.1000 | | 0.3001 |

TABLE 3-continued

Additional Low Electrical Conductivity Electrical Vehicle Thermal Management Fluid Formulations and Test Results

| Ingredient | Comp. Ex. 11 wt % | Comp. Ex. 12 wt % | Comp. Ex. 13 wt % | Comp. Ex. 14 wt % | Comp. Ex. 15 wt % | Ex. 8 wt % |
|---|---|---|---|---|---|---|
| | Example ID | | | | | |
| Triethyl Phosphate, >99% | 0.1000 | 0.3000 | 0.1000 | 0.2000 | | |
| Calcium Acetate monohydrate, CaAc2*H2O | 0.0065 | 0.0065 | 0.0065 | 0.0065 | | 0.0065 |
| Magnesium Acetate tetrahydrate, MgAc2*4H2O | 0.0330 | 0.0330 | 0.0330 | 0.0330 | | 0.0330 |
| Liquitint Blue RE | 0.0102 | 0.0100 | 0.0100 | 0.0101 | 0.0100 | 0.0102 |
| PM5150 | 0.2000 | 0.2000 | 0.2001 | 0.2000 | 0.2001 | 0.2000 |
| Total | 100.0000 | 100.0000 | 100.0000 | 100.0000 | 100.0000 | 100.0000 |
| Observation on fluid prepared | Clear, single phase liquid | Precipitate observed | Clear, single phase liquid | Clear, single phase liquid | Clear, single phase liquid | Clear, single phase liquid |
| Observation on 50 v % solution after adding deionized water | Clear, single phase liquid | Not determined | Clear, single phase liquid | Clear, single phase liquid | Clear, single phase liquid | Clear, single phase liquid |
| Electrical Conductivity, µS/cm, 50 v % after dilution by adding fresh deionized water, @ 25° C. | 49.7 | ND | 49.9 | 49.7 | 1.9 | 49.8 |
| Mod. ASTM D1384-24, Std Bundle, Galvanically coupled per ASTM D1384-24, 50 v %, no salt, 88° C., 2 weeks, mg/336 hr, triplicate tests | | | | | | |
| Copper | 2.2 | — | 2.4 | 3.5 | 0.7 | 2.2 |
| ASTM Solder | 10.8 | — | 15.3 | 32.9 | 4.0 | 12.4 |
| Brass | 2.5 | — | 2.6 | 2.9 | 0.4 | 2.0 |
| Mild Steel | 140.8 | — | 133.1 | 191.6 | 54.9 | 1.4 |
| Cast iron | 293.8 | — | 281.3 | 730.9 | 156.7 | 0.5 |
| Cast Aluminum | −1.1 | — | −0.3 | −0.2 | 0.1 | 3.1 |

As shown in Table 3, use of triethyl phosphate as a partial or complete replacement for tris(2-butoxyethyl) phosphate in the described heat transfer fluid formulations led to a dramatic reduction in corrosion protection performance of the heat transfer fluids in the ready-to-use 50 vol. % solution, particularly with regard to the corrosion protection of mild steel (or carbon steel) and cast iron under the described test conditions. Comparing the electrical conductivity results shown in Table 1 and Table 3, the skilled artisan would appreciate that the electrical conductivity of the ready-to-use 50 vol. % solution tends to increase with increasing concentrations of the alkaline earth metal acetate salts (i.e., calcium acetate monohydrate and magnesium acetate tetrahydrate) used in the formulations. Hence, use of high concentration of the alkaline earth metal carboxylate salts in the formulations may be limited by the desired electrical conductivity requirements of the heat transfer fluids for use in the thermal management systems of the electric vehicles. The results in Table 1 and Table 3 clearly demonstrate the unexpected synergistic effect of the disclosed heat transfer fluid compositions in providing excellent corrosion protection to various metals under the above-described test conditions. Particularly, the presence of the disclosed amounts of tris(2-butoxyethyl) phosphate and alkaline earth metal carboxylate salts in the heat transfer fluid compositions led to the excellent corrosion protection of the various metals under the above-described test conditions are clearly unexpected, since the skilled artisan would not expect a significant chemical interaction between the uncharged tris(2-butoxyethyl) phosphate molecule and the positively charged alkaline earth metal ions in the ethylene glycol-water test heat transfer fluid solutions used in the modified ASTM D1384-24 test conditions.

Anti-Foam Evaluation

As noted above, the ability of the heat transfer fluids to resist foaming during operation is an important consideration in heat transfer fluid compositions since air has much lower cooling and protective properties compared to a liquid coolant. Accordingly, as noted above, the described heat transfer fluids include antifoam ingredients or an antifoam composition. In this regard, a modified test based on ASTM D1881-17, which describes a test method for Foaming Tendencies of Engine Coolants in Glassware (published December 2017) was used to evaluate heat transfer fluids that included antifoam compositions and ingredients.

Briefly, in the modified test a 56% by volume solution of the heat transfer fluid, which includes an antifoam ingredient or composition as noted in Table 4, below, is blown with air (about 1000 ml/min) for five minutes while maintained at a constant temperature (in one instance at about 88° C. and in another instance at about 23° C.). The volume of foam created after five minutes and the time for such foam to break are measured. An acceptable foam volume is less than or equal to 150 ml and an acceptable break time is less than or equal to five second.

Referring to the following Table 4, the results of the described modified ASTM D1881-17 test is shown for seven exemplary heat transfer fluids according to the present invention and for four comparative heat transfer fluids.

TABLE 4

Antifoam Evaluation

| Ingredient | Ex. 9 wt % | Ex. 10 wt % | Ex. 11 wt % | Ex. 12 wt % | Ex. 13 wt % | Ex. 14 wt % | Ex. 15 wt % |
|---|---|---|---|---|---|---|---|
| Ethylene Glycol | 98.5986 | 98.5986 | 98.6180 | 98.618 | 98.8683 | 98.7432 | 98.6180 |
| Benzotriazole, solid | 0.4001 | 0.4001 | 0.4001 | 0.400 | 0.4001 | 0.4002 | 0.4001 |
| Carbowax 400 | 0.2400 | 0.2400 | 0.2402 | 0.240 | 0.2401 | 0.2401 | 0.2400 |
| Tris(2-butoxyethyl) phosphate, 95% | 0.2200 | 0.2200 | 0.2001 | 0.200 | 0.2000 | 0.2000 | 0.2002 |
| Ca Acetate monohydrate | 0.0050 | 0.0050 | 0.0052 | 0.005 | 0.0052 | 0.0051 | 0.0052 |
| Mg Acetate tetrahydrate | 0.0220 | 0.0220 | 0.0221 | 0.022 | 0.0220 | 0.0221 | 0.0220 |
| Antifoam Composition | | | | | | | |
| 1-propanol | 0.4001 | 0.4001 | 0.4001 | 0.400 | 0.2000 | 0.3000 | 0.4001 |
| BASF Plurafac LF-403 | 0.0950 | 0.0950 | 0.0950 | 0.095 | 0.0488 | 0.0731 | 0.0975 |
| Dow Tergitol XD | 0.0050 | 0.0050 | 0.0050 | 0.005 | 0.0013 | 0.0019 | 0.0025 |
| Antifoam Ingredient - Plurafac LF-224 antifoam | | | | | | | |
| Chromatint Red 1690 | 0.0040 | 0.0040 | 0.0040 | 0.004 | 0.0040 | 0.0041 | 0.0041 |
| Chromatint Red 3382 | 0.0100 | 0.0100 | 0.0102 | 0.010 | 0.0101 | 0.0101 | 0.0102 |
| Total | 100.000 | 100.000 | 100.000 | 100.000 | 100.0000 | 100.0000 | 100.0000 |
| Modified ASTM D1881 foam test results, test as is @ 56 vol % | | | | | | | |
| Foam volume @ 88° C., ml | 65 | 65 | 60 | 60 | 85 | 78 | 65 |
| Break time @ 88° C., s | 1.70 | 1.71 | 1.77 | 2.44 | 3.28 | 2.6 | 2.39 |
| Foam volume @ 23° C., ml | 55 | 55 | 60 | | 60 | 50 | 50 |
| Break time @ 23° C., s | 2.95 | 3.00 | 3.25 | | 3.63 | 2.77 | 3.58 |

| Ingredient | Comp. Ex. 16 wt % | Comp. Ex. 17 wt % | Comp. Ex. 18 wt % | Comp. Ex. 19 wt % |
|---|---|---|---|---|
| Ethylene Glycol | 98.8680 | 98.7431 | 98.6181 | 99.0476 |
| Benzotriazole, solid | 0.4000 | 0.4001 | 0.4001 | 0.4005 |
| Carbowax 400 | 0.2400 | 0.2401 | 0.2401 | 0.2403 |
| Tris(2-butoxyethyl) phosphate, 95% | 0.2002 | 0.2001 | 0.2000 | 0.2003 |
| Ca Acetate monohydrate | 0.0052 | 0.0051 | 0.0051 | 0.0050 |
| Mg Acetate tetrahydrate | 0.0221 | 0.0222 | 0.0221 | 0.0220 |
| Antifoam Composition | | | | |
| 1-propanol | 0.2002 | 0.3001 | 0.4001 | |
| BASF Plurafac LF-403 | 0.0500 | 0.0750 | 0.1000 | |
| Dow Tergitol XD | | | | |
| Antifoam Ingredient - Plurafac LF-224 antifoam | | | | 0.0702 |
| Chromaint Red 1690 | 0.0041 | 0.0042 | 0.0042 | 0.0040 |
| Chromatint Red 3382 | 0.0102 | 0.0101 | 0.0101 | 0.0100 |
| Total | 100.0000 | 100.0000 | 100.0000 | 100.0000 |
| Modified ASTM D1881 Foam Test Results, as is @ 56% vol % | | | | |
| Foam volume @ 88° C., ml | 203 | 105 | 135 | 255 |
| Break time @ 88° C., s | 10.58 | 5.67 | 6.04 | 14.47 |
| Foam volume @ 23° C., ml | 50 | 50 | 40 | |
| Break time @ 23° C., s | 3.66 | 3.46 | 2.82 | |

Additional Corrosion Screening Test Examples

As noted above ASTM D1384-24 (published February 2024) is a test method that uses a simple beaker-type procedure for evaluating the effects of engine coolants on metal specimens under controlled laboratory conditions. Exemplary heat transfer fluids were prepared with corrosion inhibitor ingredients and/or compositions as noted in Table 5 and that included certain combinations of Tris(2-butoxyethyl) phosphate, Triethanolamine, L-Arginine, octylphosphonate, and Calcium Acetate and Magnesium Acetate. The corrosion inhibition of the heat transfer fluids were evaluated using the modified ASTM D1384-24 test procedure described above where the coupons were exposed to each test solution for 336 hours with the test solution temperature controlled at 88° C. per ASTM D1384-24 specification and the mass loss for each coupon was obtained. The mass loss of each coupon is given as in (mg specimen)/336 hours.

Fresh de-ionized water in the examples used in Table 5 means that the de-ionized water is freshly prepared by reverse osmosis equipment without having the chance to adsorb carbon dioxide from the air. The fresh de-ionized water used in the described examples typically had an electrical conductivity less than 1 μS/cm.

Table 6 shows the test results obtained from the above described modified ASTM D1384-24 corrosion screening test and demonstrate that the described anti corrosion compositions included in the described heat transfer fluids provide excellent corrosion protection to various metals.

TABLE 5

Low Electrical Conductivity Ethylene Glycol based BEV Coolant Candidate Formulations Effect of Tris(2-butoxyethyl) phosphate, Triethanolamine, L-Arginine, octylphosphonate, CaAc2 and MgAc2

| | Example ID | | | | | | | | |
|---|---|---|---|---|---|---|---|---|---|
| | Ex. 16 | Ex. 17 | Ex. 18 | Ex. 19 | Ex. 20 | Ex. 21 | Ex. 22 | Comp. Ex. 20 | Comp. Ex. 21 |
| | Reference ID | | | | | | | | |
| Ingredient | H1 wt % | H2 wt % | H3a wt % | H3b wt % | H5 wt % | H5 wt % | H6 wt % | H7 wt % | H3c wt % |
| Ethylene Glycol | 98.8229 | 98.6229 | 98.1602 | 98.0620 | 98.8328 | 98.8333 | 98.6045 | 98.4815 | 98.0819 |
| BZT solid | 0.4000 | 0.4000 | 0.4001 | 0.3997 | 0.3999 | 0.3998 | 0.40074 | 0.4001 | 0.4001 |
| Carbowax 400 | 0.2400 | 0.2400 | 0.2399 | 0.2398 | 0.2400 | 0.2401 | 0.24045 | 0.2402 | 0.2402 |
| Tris(2-butoxyethyl) phosphate, 95% | 0.2000 | 0.2000 | 0.1002 | 0.1998 | 0.3001 | 0.2997 | 0.40073 | 0.3002 | 0.2000 |
| Triethanolamine, 99+% | 0.1000 | 0.3000 | 0.5000 | 0.4994 | | | 0.30061 | | 0.5001 |
| L-Arginine | | | | | 0.0501 | 0.0500 | | 0.0502 | |
| Hostaphat OPS, Clariant octylphosphonic acid, ~40% | | | 0.0999 | 0.0999 | | | | 0.1002 | 0.1000 |
| Fresh DI H2O | 0.0500 | 0.0500 | 0.3997 | 0.3995 | 0.0500 | 0.0501 | 0.0502 | 0.4006 | 0.4504 |
| Calcium Acetate monohydrate, CaAc2*H2O | 0.0050 | 0.0050 | | | 0.0050 | 0.0050 | 0.00051 | 0.0220 | 0.0050 |
| Magnesium Acetate tetrahydrate, MgAc2*4H2O | 0.0220 | 0.0220 | | | 0.0220 | 0.0220 | 0.00227 | 0.0050 | 0.0221 |
| Liquitint Blue RE | 0.0100 | 0.0100 | | | | | | | |
| Plurafac LF-403 | 0.1500 | 0.1500 | 0.1000 | 0.0999 | 0.1000 | 0.0999 | | | |
| Total | 100.0000 | 100.0000 | 100.0000 | 100.0000 | 100.0000 | 100.0000 | 100.0000 | 100.0000 | 100.0000 |
| Electrical Conductivity @50 v % (Small sample diluted by fresh DI H2O from tap) | 74.3 | 100.8 | 98.7 | 98 | 55.1 | 60 | 73.9 | | |
| pH, 50 v % | 7.53 | 7.92 | 8.00 | 8.00 | 7.38 | 7.35 | 7.9 | | |
| Observation | No ppt | No ppt | No ppt | No ppt | No ppt | No ppt | No ppt | Cloudy, ppt formed | Cloudy, ppt formed |

TABLE 6

Modified ASTM D1384-24 Results - Average Coupon Weight Loss, Standard Bundle, Galvanically coupled per D1384-24, 50 v % test solution diluted with deionized water, no corrosive salt, 88° C., 2 weeks, mg/336 hr triplicate tests

| | Example ID | | |
|---|---|---|---|
| | Ex. 16 | Ex. 17 | Ex. 20 |
| | Reference ID | | |
| | H1 | H2 | H5 |
| Copper | 1.4 | 1.4 | 1.2 |
| ASTM Solder | 38.8 | 36.4 | 20.3 |
| Brass | 0.8 | 2.5 | 3.5 |
| Mild Steel | −0.6 | −0.5 | −0.3 |
| Cast iron | −1.2 | −0.9 | −1.3 |
| Cast Aluminum | −1.3 | −1.2 | −1.0 |

The composition according to Example 16 (Table 5) was further evaluated using a modified ASTM D4340-19 (published June 2019) test. ASTM D4340-19 is a screening procedure for evaluating the effectiveness of engine coolants in combating corrosion of aluminum casting alloys under heat transfer conditions that may be present in aluminum cylinder head engines. In this test, heat flux is established through a cast aluminum alloy typical of that used for engine cylinder heads while exposed to an engine coolant under a pressure of 193 kPa (28 psi). The temperature of the aluminum specimen is maintained at 135° C. (275° F.) and the test is continued for 1 week (168 h). The effectiveness of the coolant for preventing corrosion of the aluminum under heat-transfer conditions (hereafter referred to as heat-transfer corrosion) is evaluated on the basis of the weight change of the test specimen. In the modified ASTM D4340-19 test, a 50% by volume solution of the heat transfer fluid of Example 16 was created by adding a deionized water and no corrosive salt was added to replicate the conditions that might be expected in the described heat transfer systems and components.

In addition, in one instance, the tested specimen was washed in water prior to measuring and in another instance, the tested specimen was acid washed prior to measuring. The results of each are show in Table 7 and are reported as weight change per 168 hours.

TABLE 7

Modified D4340 Results - 50 vol % solution, diluted by adding deionized water, no Corrosive Salt added

| | Example ID Ex. 16 Reference ID H1 |
|---|---|
| Water Washed Average Corr. Rate | −0.02 |
| Run #1 | −0.04 |
| Run #2 | 0.01 |
| Acid Cleaned Average Corr. Rate | 0.03 |
| Run #1 | 0.03 |
| Run #2 | 0.03 |

Exemplary heat transfer fluids were prepared with corrosion inhibitor ingredients and/or compositions as noted in Table 8 and that included certain combinations of Tris(2-butoxyethyl) phosphate, Triethanolamine, 2-Phosphonobutane-1,2,4-tricarboxylic acid (PBTC), Octanoic acid, Decanoic acid, Phosphate esters H-66 or Chemfac NF100, Calcium Acetate, Magnesium Acetate, and strontium nitrate. The corrosion inhibition of the heat transfer fluids were evaluated using the modified ASTM D1384-24 test procedure described above where the coupons were exposed to each test solution for 336 hours with the test solution temperature controlled at 88° C. per ASTM D1384-24 specification and the mass loss for each coupon was obtained. The mass loss of each coupon is given as in (mg specimen)/336 hours.

Fresh de-ionized water in the examples used in Table 8 means that the de-ionized water is freshly prepared by reverse osmosis equipment without having the chance to adsorb carbon dioxide from the air. The fresh de-ionized water used in the described examples typically had an electrical conductivity less than 1 µS/cm.

Table 9 shows the test results obtained from the above described modified ASTM D1384-24 corrosion screening test and demonstrate that the described anti corrosion compositions included in the described heat transfer fluids provide excellent corrosion protection to various metals.

TABLE 8

Low Electrical Conductivity Ethylene Glycol based BEV Coolant Candidate Formulations - Effect of Tris(2-butoxyethyl) phosphate, Triethanolamine, PBTC, Octanoic acid, Decanoic acid, Phosphate esters H-66 or Chemfac NF100, and Ca/MgAc$_2$ or Sr(NO$_3$)$_2$

| | Example ID | | | | | | | |
|---|---|---|---|---|---|---|---|---|
| | Ex. 23 | Ex. 24 | Ex. 25 | Ex. 26 | Ex. 27 | Ex. 28 | Ex. 29 | Ex. 30 |
| | Reference ID | | | | | | | |
| Ingredient | I2<br>wt % | I3<br>wt % | I4<br>wt % | I5<br>wt % | I6<br>wt % | I7<br>wt % | I8<br>wt % | I10<br>wt % |
| Ethylene Glycol | 97.1768 | 97.1749 | 97.1459 | 97.1474 | 97.1457 | 97.1312 | 95.4492 | 97.1649 |
| Fresh de-ionized water | 1.3006 | 1.3014 | 1.3012 | 1.3003 | 1.3005 | 1.3005 | 2.5896 | 1.3002 |
| Tolyltriazole solid | | | | | | | | 0.2002 |
| Benzotriazole solid | 0.2000 | 0.2005 | 0.2001 | 0.2002 | 0.2003 | 0.2002 | 0.1993 | |
| Carbowax 400 | 0.2402 | 0.2402 | 0.2401 | 0.2401 | 0.2403 | 0.2402 | 0.2394 | 0.2401 |
| Tris(2-butoxyethyl) phosphate, 95% | 0.2000 | 0.2003 | 0.2005 | 0.2002 | 0.2003 | 0.2003 | 0.1995 | 0.2003 |
| 2-phosphonobutane-1,2,4-tricarboxylic acid (PBTC), sodium salt, Wincom product | | | 0.0060 | | | | | |
| Fresh DI H2O (used to make a pre-mix with 2-phosphonobutane-1,2,4-tricarboxylic acid, sodium salt, 20 wt % solution | | | 0.0240 | | | | | |
| 50 v % PBTC, 2-Phosphonobutane-1,2,4-tricarboxylic acid | | | | | | | | 0.0092 |
| Triethanolamine, 99+%, Sigma Aldrich | 0.4703 | 0.4701 | 0.4700 | 0.4700 | 0.4702 | 0.4701 | 0.4685 | 0.4703 |
| Octanoic Acid | 0.1002 | | 0.1002 | 0.1000 | 0.1003 | 0.1000 | 0.0997 | 0.1001 |
| Decanoic Acid | | 0.1004 | | | | | | |
| Dow Triton H-66, phosphate ester | | | | 0.0300 | | 0.0304 | | |
| Chemfac NF-100, Ethylene glycol phosphate | | | | | 0.0302 | | 0.0302 | |
| Calcium Acetate monohydrate, CaAc2*H2O | 0.0117 | 0.0117 | 0.0117 | 0.0117 | 0.0118 | 0.0050 | 0.0050 | |
| Magnesium Acetate tetrahydrate, MgAc$_2$*4H$_2$O | | | | | | 0.0220 | 0.0220 | |
| Strontium nitrate, Sr(NO$_3$)$_2$ | | | | | | | | 0.0144 |
| Fresh de-ionized water (to dissolve Ca/MgAc$_2$) | 0.2002 | 0.2003 | 0.2002 | 0.2000 | 0.2000 | 0.2000 | 0.1992 | 0.2000 |
| Liquitint Blue RE | | | | | | | | |

TABLE 8-continued

Low Electrical Conductivity Ethylene Glycol based BEV Coolant Candidate Formulations - Effect of Tris(2-butoxyethyl) phosphate, Triethanolamine, PBTC, Octanoic acid, Decanoic acid, Phosphate esters H-66 or Chemfac NF100, and Ca/MgAc$_2$ or Sr(NO$_3$)$_2$

| | Example ID | | | | | | | |
|---|---|---|---|---|---|---|---|---|
| | Ex. 23 | Ex. 24 | Ex. 25 | Ex. 26 | Ex. 27 | Ex. 28 | Ex. 29 | Ex. 30 |
| | Reference ID | | | | | | | |
| Ingredient | I2 wt % | I3 wt % | I4 wt % | I5 wt % | I6 wt % | I7 wt % | I8 wt % | I10 wt % |
| Plurafac LF-403 | 0.1000 | 0.1002 | 0.1002 | 0.1000 | 0.1003 | 0.1002 | | 0.1003 |
| Antifoam Composition | | | | | | | | |
| 1-propanol | | | | | | | 0.3987 | |
| Plurafac LF-403 | | | | | | | 0.0948 | |
| Tergitol XD | | | | | | | 0.0050 | |
| Total | 100.0000 | 100.0000 | 100.0000 | 100.0000 | 100.0000 | 100.0000 | 100.0000 | 100.0000 |
| 50 v % Solution Electrical Conductivity @ 25° C., µS/cm | 109.1 | 101.9 | 113.1 | 118.5 | 123.4 | 138.5 | 137.5 | 120.3 |
| pH, 50 v % | 7.99 | 8.04 | 7.97 | 7.98 | 7.87 | 7.98 | 7.88 | 7.94 |
| Observation | No ppt | No ppt | No ppt | No ppt | No ppt | No ppt | No ppt | No ppt |

TABLE 9

Modified ASTM D1384-24 Results - Average Coupon Weight Loss, Standard Bundle, Galvanically coupled per D1384-24, 50 v % test solution diluted with deionized water, no corrosive salt, 88° C., 2 weeks, mg/336 hr triplicate tests

| | Example ID | | | | | | | |
|---|---|---|---|---|---|---|---|---|
| | Ex. 23 | Ex. 24 | Ex. 25 | Ex. 26 | Ex. 27 | Ex. 28 | Ex. 29 | Ex. 30 |
| | Reference ID | | | | | | | |
| | I2 | I3 | I4 | I5 | I6 | I7 | I8 | I10 |
| Copper | 1.1 | 1.6 | 2.0 | 0.3 | 0.7 | 0.9 | 0.9 | 0.7 |
| ASTM Solder | 19.9 | 13.1 | 10.2 | 11.7 | 9.2 | 15.0 | 6.6 | 16.3 |
| Brass | 1.9 | 3.0 | 3.1 | 3.5 | 3.4 | 3.8 | 2.4 | 3.3 |
| Mild Steel | −0.3 | −0.3 | −0.4 | −0.3 | −0.3 | −0.4 | −0.5 | −0.2 |
| Cast iron | −0.8 | −1.0 | −0.7 | −2.6 | −2.1 | −2.8 | −3.3 | −1.6 |
| Cast Aluminum | −0.5 | −1.3 | −1.2 | −1.2 | −0.9 | −1.3 | −1.0 | −0.7 |

The compositions according to Examples 23 and 26 (Table 8) were further evaluated using the modified ASTM D4340-19 test described above. 50% by volume solutions of the heat transfer fluids of Examples 23 and 26 were created by adding a deionized water and no corrosive salt was added to replicate the conditions that might be expected in the described heat transfer systems and components. In addition, in one instance, the tested specimen was washed in water prior to measuring and in another instance, the tested specimen was acid washed prior to measuring. The results of each are show in Table 10 and are reported as weight change per 168 hours.

TABLE 10

Modified D4340 Results - 50 vol % solution, diluted by adding deionized water, no Corrosive Salt added

| | Example ID | |
|---|---|---|
| | Ex. 23 | Ex. 26 |
| | Reference ID | |
| | I2 | I5 |
| Water Washed Average Corr. Rate | −0.05 | −0.13 |
| Run #1 | −0.06 | −0.18 |
| Run #2 | −0.04 | −0.09 |
| Acid Cleaned Average Corr. Rate | 0.02 | 0.05 |
| Run #1 | 0.02 | 0.06 |
| Run #2 | 0.01 | 0.03 |

Controlled Atmospheric Brazing Test Examples

As is known, heat transfer systems may include one or a plurality of components manufactured by controlled atmosphere brazing (i.e., CAB). In some embodiments, the heat transfer system may include aluminum. In these instances, it has been found that changes to heat transfer fluids may be more pronounced after contact with the aluminum surfaces of heat exchangers manufactured by a controlled atmosphere brazing (CAB) technique under engine cooling system operating conditions. The potassium fluoroaluminate flux residue left on aluminum surfaces after the CAB process may play a key role in changing the chemical properties and protection performance of engine coolants.

The following Example describes three heat transfer fluids according to the present invention in which the corrosion inhibitor composition includes a neutral phosphate and, in particular a phosphate ester which in some instances may be a phosphate polyether esters or alcohol phosphate ester (e.g.,) Triton™ H-66 or Triton™ H-55).

TABLE 11

Heat Transfer Fluids with a Corrosion Inhibitor that includes Neutral Phosphates

| | Example ID | | |
|---|---|---|---|
| Ingredient | Ex. 30 wt % | Ex. 31 wt % | Ex. 32 wt % |
| Ethylene Glycol | 98.5983 | 98.5293 | 98.4998 |
| Benzotriazole solid | 0.4001 | 0.3998 | 0.3997 |
| Carbowax 400 (Polyethylene glycol, avg. molecular weight of 380-420) | 0.2400 | 0.2398 | 0.2398 |
| Tris(2-butoxyethyl) phosphate, 95% | 0.2201 | 0.2199 | 0.2199 |
| Ca Acetate monohydrate | 0.0050 | 0.0050 | 0.0050 |
| Mg Acetate tetrahydrate | 0.0220 | 0.0220 | 0.0220 |
| Dow Triton H-55, phosphate ester | | 0.0700 | |
| Dow Triton H-66, phosphate ester | | | 0.0999 |
| Antifoam mixture | | | |
| 1-propanol | 0.4004 | 0.4001 | 0.4000 |
| BASF Plurafac LF-403 | 0.0951 | 0.0950 | 0.0950 |
| Tergitol XD | 0.0050 | 0.0050 | 0.0050 |
| Chromaint Red 1690 | 0.0040 | 0.0040 | 0.0040 |
| Chromatint Red 3382 | 0.0100 | 0.0100 | 0.0100 |
| Total | 100.0000 | 100.0000 | 100.0000 |
| 50 v % Solution Electrical Conductivity @ 25° C., μS/cm | 37 | 93.5 | 95.7 |
| pH, 50 v % | 6.2 | 6.9 | 7.0 |
| Observation | No ppt | No ppt | No ppt |

Anodic polarization curve measurements under modified GM9066P test conditions were used to measure and compare the performance of the heat transfer fluids identified in Table 12 with respect to the protection of cast aluminum from high temperature corrosion under heat rejecting heat transfer conditions, typically encountered in engine blocks and cylinder heads. The test set-up used in the anodic polarization measurements was the same as the one specified in GM9066P. The test solutions contained an amount of coolant noted in Table 12 (diluted by deionized water). The working electrode was a potassium fluoroaluminum flux residue radiator tube end section cut from a new North American car radiator (welded tube radiator). The radiator tube section size used as the working electrode was approximately 26 mm×26 mm×26 mm. The solution temperature was controlled at 88° C. with the electrode surface temperature being about 15° C. higher than the solution temperature. The solution did not contain any corrosive salts.

The corrosion rate was determined by the method described in the General Motors Engineering Standards document GM9066P issued April 1989. Briefly, in this method an anodic polarization curve was obtained after the solution temperature reached steady state values (i.e., 88°

C.) for 5 to 6 hours using a scan rate of 1 mV/sec where the reference electrode was AgAgcl, 3M NaCl. The results are shown in Table 12 and FIGS. 5 and 6.

TABLE 12

Corrosion rate (μm/y) measured on a potassium fluoroaluminate flux residue covered weld radiator tube section measured by polarization resistance method (GM9066P)

| | Test Fluid | | | | | | | |
|---|---|---|---|---|---|---|---|---|
| Exposure Time at 88° C. - Solution Temperature, hours | Ready-to-Use OE BEV Coolant 3, Comp. Ex. 9 Corrosion Rate (μm/y) | 50/50 Ready-to-Use OE BEV Coolant 2, Comp. Ex. 7 Corrosion Rate (μm/y) | 56 vol. % Ex. 29 (Ref. ID 18) Corrosion Rate (μm/y) | 56 vol. % Ex. 30 Corrosion Rate (μm/y) | 56 vol. % Ex. 31 Corrosion Rate (μm/y) | 56 vol. % Ex. 32 Corrosion Rate (μm/y) | Ready-to-Use After Market ICE and Hybrid EV Coolant 1, Comp. Ex. 22 Corrosion Rate (μm/y) | 50 vol. % Ex. 33 (K9) Corrosion Rate (μm/y) |
| 0.5 | N.A. | 189.2 | 3.3 | 40.6 | 3.9 | 2.8 | 8.41 | 2.54 |
| 1.5 | 528.5 | 95.3 | 2.8 | 27.5 | 4.0 | 2.8 | 8.82 | 3.49 |
| 3 | 252.9 | 69.0 | 3.3 | 27.6 | 3.2 | 2.4 | 9.31 | 4.17 |
| 4.5 | 122.4 | 43.5 | 3.2 | 21.0 | 2.8 | 2.3 | 7.97 | 5.12 |
| 6 | 104.1 | 23.3 | 2.7 | 20.2 | 2.6 | 2.4 | 7.89 | 5.43 |

*Comp. Ex. 22 is a Ready-to-Use Aftermarket ICE and Hybrid EV Coolant 1 is a high electrical conductivity coolant (~3600 μS/cm) with a very long service life, i.e., Guaranteed protection for 15 years/400,000 miles.
The formula for Ex. 33 is provided in Table 13.

It will be appreciated from Table 12 and FIGS. 5 and 6 that the corrosion protection performance of exemplary composition according to the present invention greatly exceeded that provided by comparison original equipment BEV coolants. In addition, it is evident that the shown in Table 12 and FIGS. 5 and 6 indicate that the exemplary low electrical conductivity heat transfer fluids of the present invention provide much better corrosion protection to potassium fluoroaluminate flux residue covered aluminum radiator tube surface as compared to Comparative Example 22 and Example 33. Specifically reviewing FIGS. 5 and 6, it will be understood that the exemplary low electrical conductivity heat transfer fluids according to the present invention provide a much better corrosion protection to the flux residue cover aluminum radiator tube surface than the comparative example OE and aftermarket coolant products under the test conditions used, especially under stray current corrosion conditions.

The following Example describes three heat transfer fluids according to the present invention in which the corrosion inhibitor composition includes an amine, and, in particular, triethanolamine or triisopropanolamine.

TABLE 13

Heat Transfer Fluids with a corrosion inhibitor that includes amines

| | Example ID | | |
|---|---|---|---|
| | 33 | 34 | 35 |
| | Reference ID | | |
| Ingredient | K9 wt % | K1 wt % | K7 wt % |
| Ethylene Glycol | 96.1101 | 96.5149 | 96.3841 |
| Fresh de-ionized water | 1.7940 | 1.5006 | 1.5003 |
| Benzoic acid | 0.0200 | 0.0161 | 0.0101 |
| Calcium hydroxide | 0.0051 | 0.0085 | 0.0053 |
| Magnesium hydroxide | 0.0052 | | |
| 50 v % PBTC, 2-Phosphonobutane-1,2,4-tricarboxylic acid | 0.0081 | 0.0084 | 0.0085 |
| Benzotriazole, solid | 0.4002 | 0.4002 | 0.4001 |
| Carbowax 400 | 0.2401 | 0.2404 | 0.2401 |
| Tris(2-butoxyethyl) phosphate, 95% | 0.2001 | 0.2001 | 0.2004 |
| Triethanolamine, 99+%, MW = 149.188 | | 0.5001 | |
| Triisopropanolamine, 98%, MW = 191.271 | 0.6400 | | 0.6400 |
| Nonionic Acid | 0.0501 | 0.0505 | 0.0501 |
| Decanoic Acid | 0.0502 | 0.0500 | 0.0504 |
| Dow Triton H-66 | | | |
| Chemfac NF-100, Ethylene glycol phosphate | 0.0600 | | |
| Antifoam mixture | | | |
| n-propanol | 0.4002 | 0.4000 | 0.4000 |
| BASF Plurafac LF-403 | 0.0975 | 0.0975 | 0.0975 |
| Dow Tergitol XD | 0.0025 | 0.0025 | 0.0025 |
| Chromatint Red 1690 | | | |
| Chromatint Red 3382 | 0.0102 | 0.0103 | 0.0105 |
| Total | 100.0936 | 100.0000 | 100.0000 |

TABLE 13-continued

Heat Transfer Fluids with a corrosion inhibitor that includes amines

| | Example ID | | |
|---|---|---|---|
| | 33 | 34 | 35 |
| | Reference ID | | |
| Ingredient | K9 wt % | K1 wt % | K7 wt % |
| Electrical Conductivity @50 v % (diluted by adding deionized water) | 144.1 | 128.7 | 108.8 |
| pH, 50 v % | 7.54 | 7.88 | 7.58 |
| Observation | No ppt | No ppt | No ppt |

The skilled artisan will appreciate that Exs. 33-35 identify suitable heat transfer fluid compositions according to the present invention.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described as comprising some element or group of elements, additional embodiments can consist essentially of or consist of the element or group of elements. Also, although the open-ended term “comprises” is generally used herein, additional embodiments can be formed by substituting the terms “consisting essentially of” or “consisting of.”

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles “a” and “an” in reference to an element (e.g., “a freezing point depressant,” “a non-ionic surfactant,” “a polyalkylene glycol,” etc.) does not exclude the presence, in some embodiments, of a plurality of such elements.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A heat transfer or thermal management system fluid comprising:

a freezing point depressant;

water having an electrical conductivity less than 5 μS/cm; and a corrosion inhibitor composition that includes one or more electrically non-conductive, low electrical conductivity corrosion inhibitors, or a combination of one or more organic acids and one or more organic bases and the corrosion inhibitor composition further comprises one or more neutral phosphate esters selected from tris(2-butoxyethyl) phosphate, trialkoxyalkyl phosphates, alkyl phosphonocarboxylates, alkoxyl phosphonocarboxylates, and mixtures thereof;

wherein a conductivity of the heat transfer or thermal management system fluid is less than or equal to about 500 μS/cm.

2. The heat transfer or thermal management system fluid of claim 1 wherein the conductivity of the heat transfer fluid is less than or equal to about 25 μS/cm or less than or equal to about 10 μS/cm.

3. The heat transfer or thermal management system fluid of claim 1 wherein the freezing point depressant comprises glycerol, an alcohol, ethylene glycol, 1,2-propylene glycol, 1,3-propanediol, or a combination thereof.

4. The heat transfer or thermal management system fluid of claim 1 wherein the freezing point depressant is present in an amount of about 10 wt. % to about 99.85 wt. % or about 30 wt. % to about 99.5 wt. %, or about 40 wt. % to about 99 wt. %, based on a total weight of the heat transfer fluid.

5. The heat transfer or thermal management system fluid of claim 1 wherein the water is present in an amount from about 0.05 wt. % to about 80 wt. %, based on a total weight of the heat transfer fluid.

6. The heat transfer or thermal management system fluid of claim 1 wherein the alkyl phosphonocarboxylates and alkoxyl phosphonocarboxylates are selected from triethyl phosphonoformate, triethyl phosphonoacetate, trimethyl phosphonoactate, methyl diethylphosphonacetate, triethyl 2-phosphonopriopionate, triethyl-3-phosphonopropionate, trimethyl-3-phosphonopropionate, and mixtures thereof.

7. The heat transfer or thermal management system fluid of claim 1 wherein the combination of the one or more organic acids and the one or more organic bases exhibits a substantially neutral pH combination and the one or more organic acids comprises a carboxylic acid, an organophosphate, phosphonate, phosphinate, and wherein the one or more organic base includes an amine compound, amino acids, azoles, and thiazoles.

8. The heat transfer or thermal management system fluid of claim 7 wherein the azole is selected from the group consisting of an optionally substituted benzotriazole, an optionally substituted tolyltriazole, an optionally substituted $C_2$-$C_{20}$ alkyl benzotriazole, an optionally substituted mercaptobenzothiazole, an optionally substituted thiazole, an optionally substituted imidazole, an optionally substituted benzimidazole, an optionally substituted indazole, an optionally substituted tetrazole, tetrahydrobenzotriazole, tetrahydrotolyltriazole, and a combination thereof.

9. The heat transfer or thermal management system fluid of claim 8 wherein the optionally substituted $C_2$-$C_{20}$ alkyl benzotriazole comprises a methyl benzotriazole, a butyl benzotriazole, or a combination thereof.

10. The heat transfer or thermal management system fluid of claim 1 wherein the corrosion inhibitor is present in an amount of about 0.01% wt. % to about 10 wt. % based on a total weight of the heat transfer fluid.

11. The heat transfer or thermal management system fluid of claim 1 further comprising one or more soluble alkaline earth metal ions.

12. The heat transfer or thermal management system fluid of claim 11 wherein the one or more soluble alkaline earth metal ions are selected from beryllium acetate, magnesium acetate, calcium acetate, strontium acetate, or mixtures thereof.

13. The heat transfer or thermal management system fluid of claim 11 wherein the one or more soluble alkaline earth metal ions include (a) alkaline earth metal oxides or alkaline earth metal hydroxides in combination with (b) an acid.

14. The heat transfer or thermal management system fluid of claim 11 wherein the one or more soluble alkaline earth metal ions are present in an amount from about 0.001 wt. % to about 0.15 wt. %.

15. The heat transfer or thermal management system fluid of claim 1 further comprising an non-ionic surfactant.

16. The heat transfer or thermal management system fluid of claim 15 wherein the non-ionic surfactant is present in an amount of about 0.01 wt. % to about 0.5 wt. % based on a total weight of the heat transfer fluid.

17. The heat transfer or thermal management system fluid of claim 15 wherein the non-ionic surfactant is selected from the group consisting of a sorbitan fatty acid ester, an alkoxylated alcohol, a polyalkylene glycol ester, a copolymer of ethylene oxide and propylene oxide, a polyoxyalkylene derivative of a sorbitan fatty acid ester, and a combination thereof.

18. The heat transfer or thermal management system fluid of claim 17 wherein the alkoxylated alcohol comprises an ethoxylated alcohol, a propoxylated alcohol, or a combination thereof.

19. The heat transfer or thermal management system fluid of claim 18 wherein the alkoxylated alcohol has:

(a) a formula:

$$RO(CH_2CH_2O)_j(CH_2CH_2CH_2O)_kH,$$

wherein R is a $C_4$-$C_{25}$, or a $C_6$-$C_{15}$ linear primary alcohol, j is an integer from 0 to 15, k is an integer from 0 to 15, and j+k is an integer greater than or equal to 1; or (b) a formula:

$$RO(CH_2CH_2O)_nH,$$

wherein R is a $C_4$-$C_{25}$ or a $C_6$-$C_{15}$ linear primary alcohol, and n is an integer from 1 to 15; or (c) a formula:

$$RO(CH_2CH_2CH_2O)_mH$$

wherein R is a $C_4$-$C_{25}$ or a $C_6$-$C_{15}$ linear primary alcohol, and m is an integer from 1 to 15.

20. The heat transfer or thermal management system fluid of claim 18 wherein the alkoxylated alcohol is present in an amount of about 0.001 wt. % to about 1 wt. % based on a total weight of the heat transfer fluid.

21. The heat transfer or thermal management system fluid of claim 1 wherein the low-conductivity corrosion inhibitor is selected from the group consisting of a siloxane compound, colloidal silica, an amine salt of a cyclohexenic carboxylate, an amine compound, and a combination thereof.

22. The heat transfer or thermal management system fluid of claim 1 further comprising an additive selected from the group consisting of a $C_1$-$C_{20}$ tetraalkylorthosilicate ester, a colorant, a wetting agent, a biocide, a surfactant, an additional corrosion inhibitor, a non-ionic dispersant, and a combination thereof.

23. The heat transfer or thermal management system fluid of claim 1 further comprising an antifoaming agent.

24. The heat transfer or thermal management system fluid of claim 23 wherein the antifoaming agent comprises a composition comprising an alcohol, a fatty alcohol alkoxylate and optionally an alkyl ethylene oxide-propylene oxide copolymer.

25. A method of preventing corrosion in a heat transfer system, the method comprising contacting at least a portion of the heat transfer system with a heat transfer fluid that comprises a freezing point depressant; water having an electrical conductivity less than 5 μS/cm; and a corrosion inhibitor composition that includes one or more electrically non-conductive, low electrical conductivity corrosion inhibitors, or a combination of one or more organic acids and one or more organic bases and the corrosion inhibitor composition further comprises one or more neutral phosphate esters selected from tris (2-butoxyethyl)phosphate, trialkoxyalkyl phosphates, alkyl phosphonocarboxylates, alkoxyl phosphonocarboxylates, and mixtures thereof; wherein a conductivity of the heat transfer fluid is less than or equal to about 500 μS/cm.

26. The method of claim 25 wherein the heat transfer system comprises a component comprising carbon steel, aluminum, aluminum alloy, magnesium, magnesium alloy, yellow metal, or a combination thereof.

27. The method of claim 25 wherein the heat transfer system comprises a fuel cell.

28. The method of claim 25 wherein the heat transfer system comprises a thermal management system of an electric vehicle that includes a battery electric vehicle, a hybrid electric vehicle, a plug-in hybrid electric vehicle, a fuel cell electric vehicle, or a range extender electric drive vehicle.

* * * * *